US012600844B2

(12) United States Patent
Xie et al.

(10) Patent No.: US 12,600,844 B2
(45) Date of Patent: Apr. 14, 2026

(54) LINEAR LOW DENSITY POLYETHYLENE FOR FILM APPLICATIONS

(71) Applicant: ExxonMobil Chemical Patents Inc., Baytown, TX (US)

(72) Inventors: Ru Xie, Baytown, TX (US); Matthew W. Holtcamp, Huffman, TX (US); David M. Fiscus, Houston, TX (US); Dongming Li, Houston, TX (US); Laughlin G. McCullough, League City, TX (US); Matthew S. Bedoya, Humble, TX (US); Kevin A. Stevens, Houston, TX (US); Yan Jiang, Houston, TX (US); Joseph A. Moebus, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 662 days.

(21) Appl. No.: 17/997,119

(22) PCT Filed: Apr. 27, 2021

(86) PCT No.: PCT/US2021/029438
§ 371 (c)(1),
(2) Date: Oct. 25, 2022

(87) PCT Pub. No.: WO2021/222280
PCT Pub. Date: Nov. 4, 2021

(65) Prior Publication Data

US 2023/0174757 A1 Jun. 8, 2023

Related U.S. Application Data

(60) Provisional application No. 63/018,648, filed on May 1, 2020.

(51) Int. Cl.
*C08L 23/08* (2025.01)
*C08F 2/34* (2006.01)
(Continued)

(52) U.S. Cl.
CPC ............ *C08L 23/0815* (2013.01); *C08F 2/34* (2013.01); *C08F 4/65925* (2013.01);
(Continued)

(58) Field of Classification Search
CPC ............. C08L 23/0815; C08L 2314/06; C08L 2314/08; C08F 210/16; C08F 4/65925;
(Continued)

(56) References Cited

U.S. PATENT DOCUMENTS

| | | | | |
|---|---|---|---|---|
| 5,041,584 | A | 8/1991 | Crapo et al. | 556/179 |
| 5,153,157 | A | 10/1992 | Hlatky et al. | 502/117 |

(Continued)

FOREIGN PATENT DOCUMENTS

| | | | |
|---|---|---|---|
| EP | 0573120 | 11/1998 | C08F 10/00 |
| EP | 2003166 | 12/2008 | C08F 10/02 |

(Continued)

OTHER PUBLICATIONS

Girolami, G. S. (1994) "A Simple "Back of the Envelope" Method for Estimating the Densities and Molecular Volumes of Liquids and Solids," *Jrnl. of Chem. Ed.*, v.71(11), pp. 962-964.

(Continued)

*Primary Examiner* — Mark S Kaucher
(74) *Attorney, Agent, or Firm* — C. Tumey Law Group PLLC

(57) ABSTRACT

The present disclosure generally relates to catalyst systems, polyethylene compositions, and uses of such compositions in, e.g., films. In an embodiment is provided a film that includes a polyethylene composition, comprising: ethylene and a $C_3$-$C_{40}$ olefin comonomer, the polyethylene compo- (Continued)

sition having at least 75 wt % ethylene content and from 0 wt % to 25 wt % of a $C_3$-$C_{40}$ olefin comonomer content based upon the total weight of the composition as determined by GPC-IR5-LS-VIS, the film having: an average of MD and TD 1% secant modulus of 42,000 psi or greater as determined by ASTM D-882, and a Dart Drop Impact of greater than 400 g/mil, as determined by ASTM D1709. In another embodiment is provided a process for producing a polyethylene composition, comprising: introducing, under first polymerization conditions, ethylene and a $C_3$-$C_{40}$ alpha-olefin to a catalyst system in a reactor, the catalyst system comprising a first catalyst compound, a second catalyst compound, and an activator; and forming a polyethylene composition.

14 Claims, 19 Drawing Sheets

(51) Int. Cl.

| | |
|---|---|
| ***C08F 4/6592*** | (2006.01) |
| ***C08F 4/70*** | (2006.01) |
| ***C08F 210/16*** | (2006.01) |
| ***C08J 5/18*** | (2006.01) |
| ***C08L 23/0807*** | (2025.01) |

(52) U.S. Cl.
CPC .......... *C08F 4/7042* (2013.01); *C08F 210/16* (2013.01); *C08J 5/18* (2013.01); *C08F 2500/27* (2021.01); *C08F 2500/31* (2021.01); *C08F 2500/38* (2021.01); *C08J 2323/08* (2013.01); *C08L 2203/16* (2013.01); *C08L 2207/066* (2013.01); *C08L 2314/06* (2013.01); *C08L 2314/08* (2013.01)

(58) Field of Classification Search
CPC ........ C08F 4/7042; C08F 2/34; C08F 210/14; C08F 2500/05; C08F 2500/04; C08F 2500/09; C08F 2500/31
See application file for complete search history.

(56) References Cited

U.S. PATENT DOCUMENTS

| | | | | |
|---|---|---|---|---|
| 5,241,025 | A | 8/1993 | Hlatky et al. | 526/129 |
| 5,447,895 | A | 9/1995 | Marks et al. | 502/117 |
| 5,453,410 | A | 9/1995 | Kolthammer et al. | 502/155 |
| 6,211,105 | B1 | 4/2001 | Holtcamp | 502/103 |
| 8,404,880 | B2 | 3/2013 | Kaji et al. | 556/179 |
| 8,658,556 | B2 | 2/2014 | Stewart | 502/202 |
| 8,975,209 | B2 | 3/2015 | Kaji et al. | 502/439 |
| 9,340,630 | B2 | 5/2016 | Kaji et al. | C08F 110/02 |
| 10,926,250 | B2 * | 2/2021 | Holtcamp | B01J 31/143 |
| 11,712,687 | B2 * | 8/2023 | Holtcamp | C08F 210/14 502/155 |
| 2011/0223406 | A1 | 9/2011 | Fantinel et al. | 428/220 |
| 2016/0298795 | A1 * | 10/2016 | Vogt | C08F 210/16 |
| 2018/0155474 | A1 | 6/2018 | Holtcamp et al. | C08F 210/02 |
| 2019/0144576 | A1 | 5/2019 | Lue et al. | C08F 210/16 |
| 2019/0168203 | A1 * | 6/2019 | Holtcamp | C08F 4/653 |

FOREIGN PATENT DOCUMENTS

| | | | |
|---|---|---|---|
| WO | WO1991/009882 | 7/1991 | C08F 4/76 |
| WO | WO1993/014132 | 7/1993 | C08F 10/00 |
| WO | WO1994/003506 | 2/1994 | C08F 4/64 |
| WO | WO1994/007928 | 4/1994 | C08F 10/02 |
| WO | WO1995/014044 | 5/1995 | C08F 4/02 |
| WO | WO2004/022646 | 3/2004 | C08L 23/06 |
| WO | WO2004/026921 | 4/2004 | C08F 10/06 |
| WO | WO2004/046214 | 6/2004 | C08F 210/06 |
| WO | WO2015/123164 | 8/2015 | C08F 210/02 |
| WO | WO-2016094870 A1 * | 6/2016 | B01D 69/107 |
| WO | WO2019/027587 | 2/2019 | C08F 210/16 |
| WO | WO2019/027605 | 2/2019 | C08F 210/16 |
| WO | WO2019/094132 | 5/2019 | C08F 210/16 |
| WO | WO2019/108327 | 6/2019 | C08J 5/18 |
| WO | WO2019/108977 | 6/2019 | C08F 4/619 |
| WO | WO2021/126448 | 6/2021 | C08F 210/16 |

OTHER PUBLICATIONS

Monrabal, B.; del Hierro, P. (2011) "Characterization of polypropylene-polyethylene blends by temperature rising elution and crystallization analysis fractionation," *Anal. Bioanal. Chem.*, v.399(4), pp. 1557-1561.

Sun, T. et al. (2001) "Effect of Short Chain Branching on the Coil Dimensions of Polyolefins in Dilute Solution," *Macromolecules*, v.34, pp. 6812-6820.

* cited by examiner

LINEAR LOW DENSITY POLYETHYLENE FOR FILM APPLICATIONS

CROSS REFERENCE TO RELATED APPLICATIONS

This application is a national stage filing of Patent Cooperation Treaty Application No. PCT/US2021/029438 filed Apr. 27, 2021, which claims the benefit of and priority to U.S. Provisional Application No. 63/018,648 filed May 1, 2020, the disclosure of U.S. Provisional Application No. 63/018,648 is incorporated herein by reference.

FIELD

The present disclosure generally relates to catalyst systems, polyethylenes, processes for producing polyethylenes, and uses of such compositions in, e.g., films.

BACKGROUND

Olefin polymerization catalysts are of great use in industry to produce polyolefin compositions suitable for, e.g., film applications. Despite efforts in developing olefin polymerization catalysts for the production of polyethylene compositions, such as linear low density polyethylene (LLDPE), the production of polyethylene compositions and films having improved performance properties such as processability, stiffness, and toughness remains elusive. Achieving such performance properties is challenging because a trade-off exists among such properties. For example, improving a LLDPE composition's stiffness and processability often reduces its toughness.

Therefore, there remains a need for new and improved catalyst systems and polymerization processes useful to produce LLDPE compositions having improved processability, stiffness, and toughness.

References for citing in an Information Disclosure Statement (37 C.F.R. 1.97(h)): US Pat. Pub. No. 2011/0223406, US Pat. Pub. No. 2019/0144576, US Pat. Pub. No. 2016/632177, WO 2019/094132, WO 2019/027587, WO 2019/108327, and European Pat. Pub. No. EP 2003166.

SUMMARY

The present disclosure generally relates to catalyst systems, polyethylene compositions, and uses of such compositions in, e.g., films.

In an embodiment, the present disclosure provides a process for producing a polyethylene composition that includes introducing, under first polymerization conditions, ethylene and a $C_3$-$C_{40}$ alpha-olefin to a catalyst system in a reactor, the catalyst system comprising a first catalyst compound, a second catalyst compound, and an activator; and forming a polyethylene composition, the first catalyst compound being represented by Formula (I)

(I)

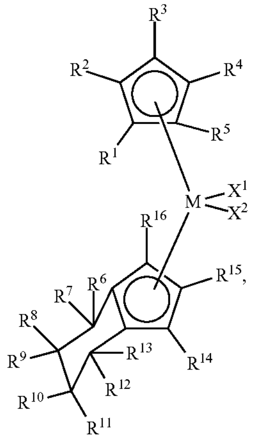

wherein:

M is Ti, Hf, or Zr;

each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;

each of $R^1$, $R^2$, $R^3$, $R^4$, $R^5$, $R^6$, $R^{14}$, $R^{15}$ and $R^{16}$ is independently selected from hydrogen, halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ join together to form a $C_4$ to $C_{62}$ cyclic or polycyclic ring structure;

each of $R^7$, $R^8$, $R^9$, $R^{10}$, $R^{11}$, $R^{12}$, $R^{13}$ is independently selected from hydrogen, halogen, $C_1$-$C_{40}$ hydrocarbyl, substituted $C_1$-$C_{40}$ hydrocarbyl, aryl, substituted aryl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^7$ and $R^8$, $R^8$ and $R^{10}$, and $R^{10}$ and $R^{12}$ are joined to form a saturated ring, unsaturated ring, substituted saturated ring, or substituted unsaturated ring;

and the second catalyst compound being represented by Formula (IIa) or Formula (IIb):

(IIa)

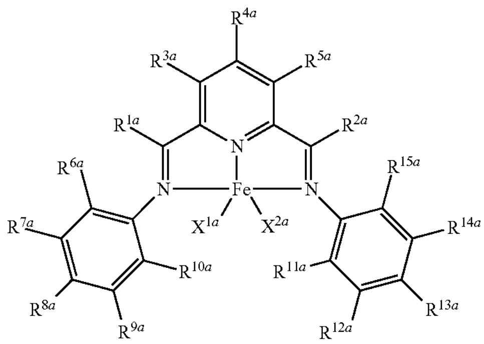

or

-continued (IIb)

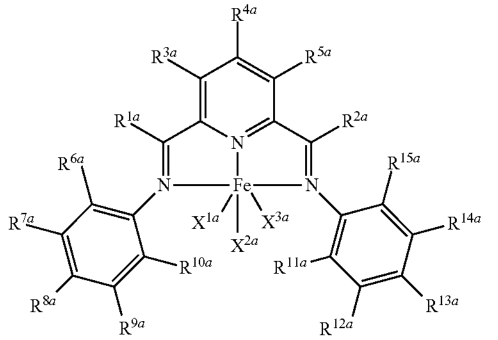

wherein:

each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), $NR'_2$, —OR', —$SiR''_3$ or five-, six- or seven-membered heterocyclyl comprising at least one atom selected from N, P, O and S;

each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —$NR'_2$, —OR' or —$SiR''_3$, wherein $R^{1a}$ optionally bonds with $R^{3a}$, and $R^{2a}$ optionally bonds with $R^{5a}$, in each case to independently form a five-, six- or seven-membered ring;

each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —$NR'_2$, —OR', —$SiR''_3$ or five-, six- or seven-membered heterocyclyl comprising at least one atom selected from N, P, O and S; and each of $X^{1a}$ and $X^{2a}$ is independently hydrogen, halogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —$NR'_2$, —OR', —SR', —$SO_3R'$, —OC(O)R', —CN, —SCN, β-diketonate, —CO, —$BF_4$, —$PF_6$ or bulky non-coordinating anion, or $X^{1a}$ and $X^{2a}$ optionally bond to form a five- or six-membered ring.

In another embodiment, the present disclosure provides a film that includes a polyethylene composition, comprising ethylene and a $C_3$-$C_{40}$ olefin comonomer, the polyethylene composition having at least 75 wt % ethylene content and from 0 wt % to 25 wt % of a $C_3$-$C_{40}$ olefin comonomer content based upon the total weight of the composition as determined by GPC-IR5-LS-VIS, the film having: an average of MD and TD 1% secant modulus of 42,000 psi or greater as determined by ASTM D-882, and a Dart Drop Impact of greater than 400 g/mil, as determined by ASTM D1709.

In another embodiment, the present disclosure provides a film that includes a polyethylene composition, comprising: ethylene and a $C_3$-$C_{40}$ olefin comonomer, the polyethylene composition having at least 75 wt % ethylene content and from 0 wt % to 25 wt % of a $C_3$-$C_{40}$ olefin comonomer content based upon the total weight of the composition as determined by GPC-IR5-LS-VIS, the film having: an average of MD and TD 1% secant modulus of 42,000 psi to 65,000 psi as determined by ASTM D-882, a Dart Drop Impact of greater than 400 g/mil, as determined by ASTM D1709, a haze of from 7% to 30%, as determined by ASTM D1003, an Elmendorf Tear value (MD) of from 100 g/mil to 300 g/mil, as determined by ASTM D-1922 (with conditioning for 40 hours at 23° C.±2° C. and 50%±10% relative humidity), and an Elmendorf Tear value (TD) of from 360 g/mil to 700 g/mil, as determined by ASTM D-1922 (with conditioning for 40 hours at 23° C.±2° C. and 50%±10% relative humidity).

DETAILED DESCRIPTION

Figure 1A:
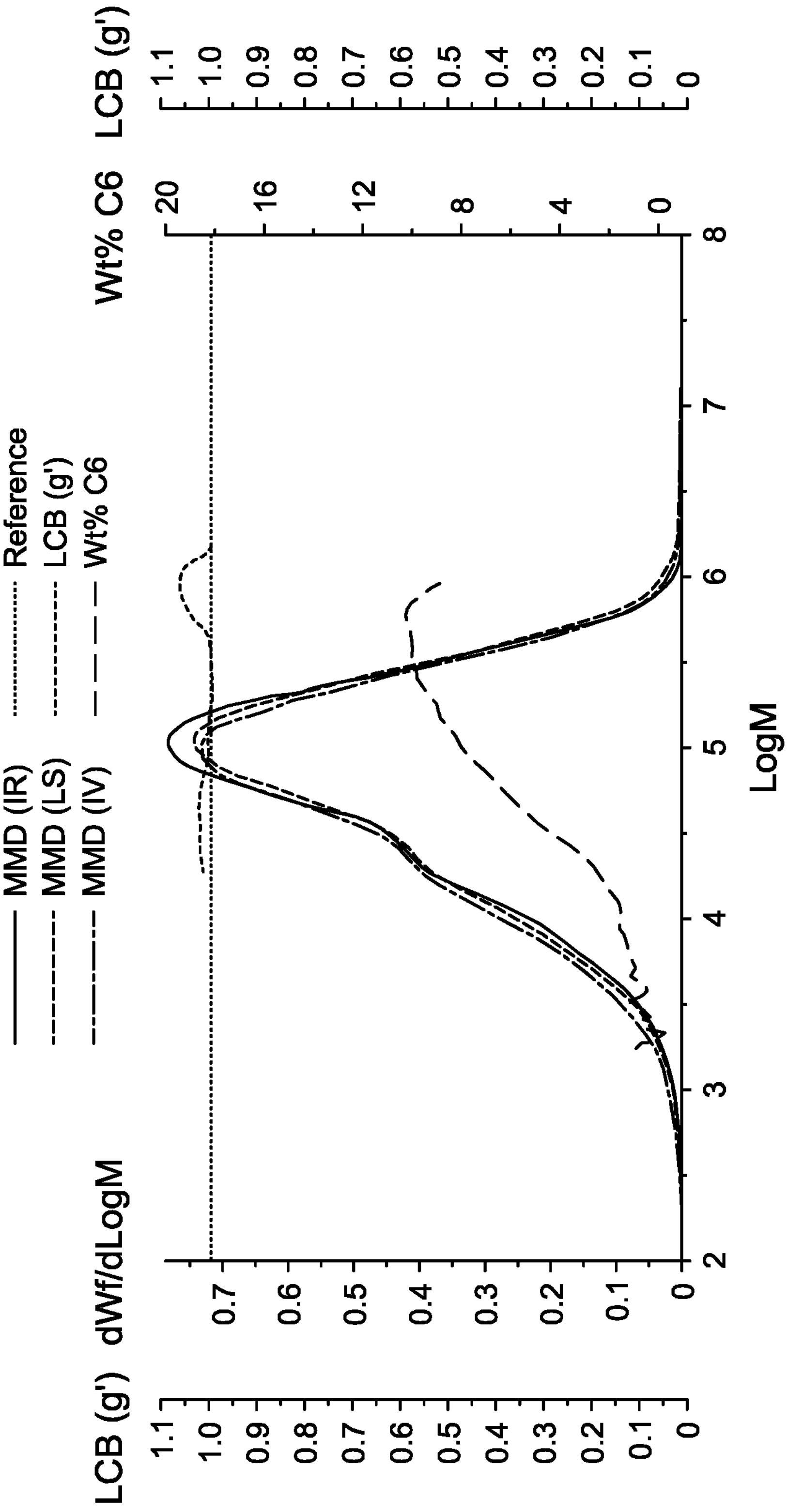
FIGS. 1A-1F shows gel permeation chromatography (GPC) spectra of example ethylene hexene copolymers according to at least one embodiment of the present disclosure.
Figure 1B:
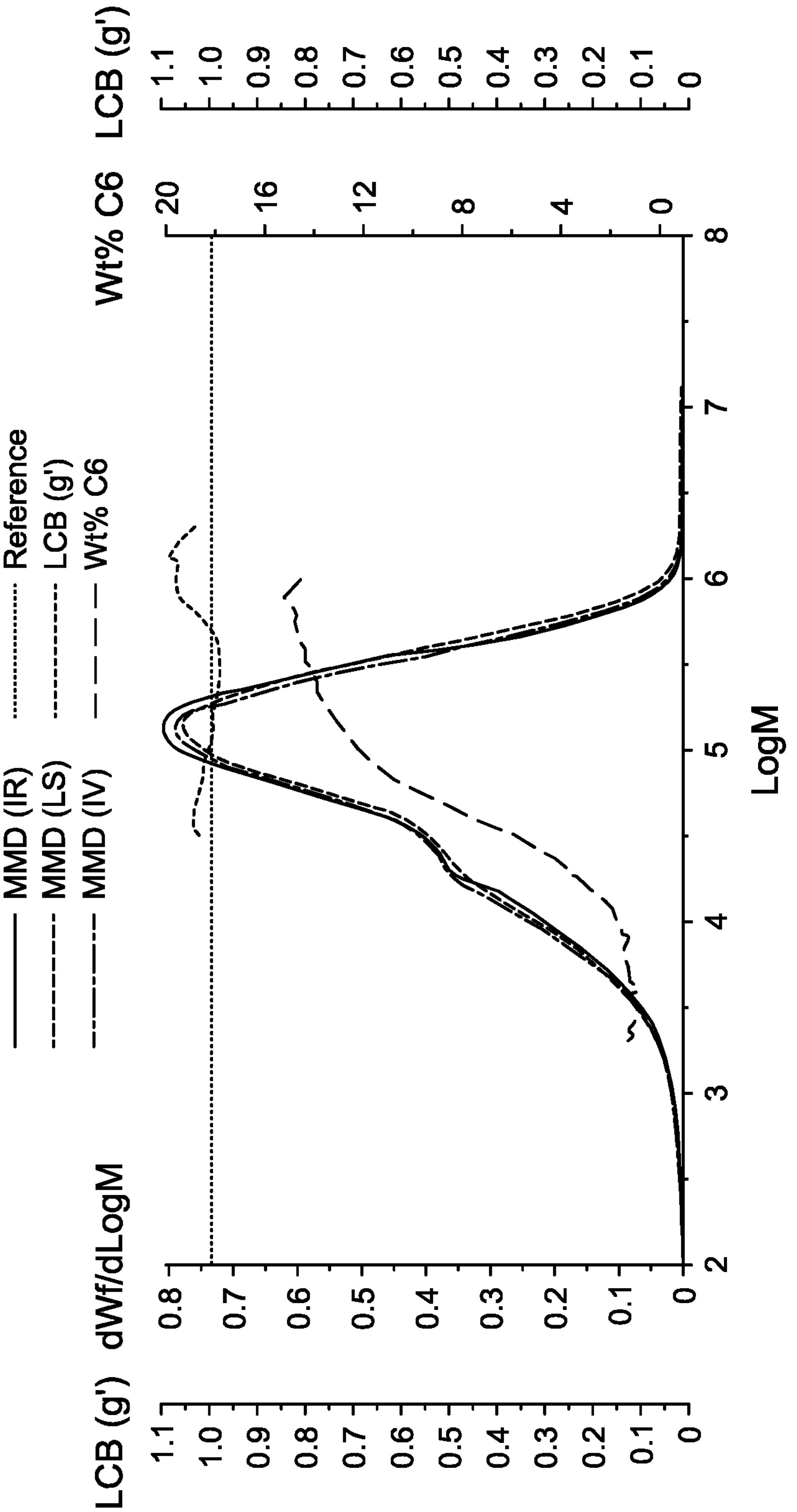
Figure 1C:
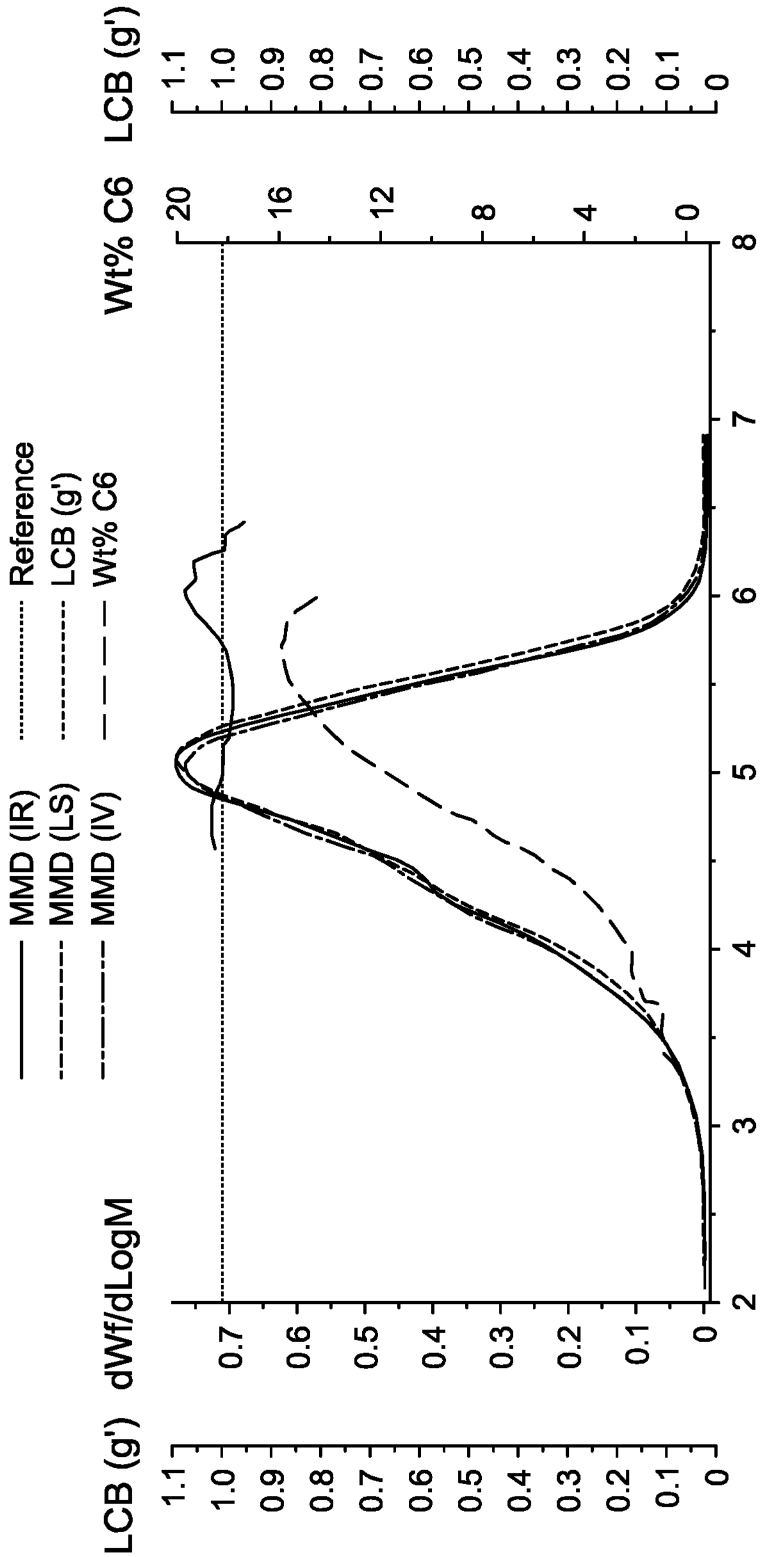
Figure 1D:
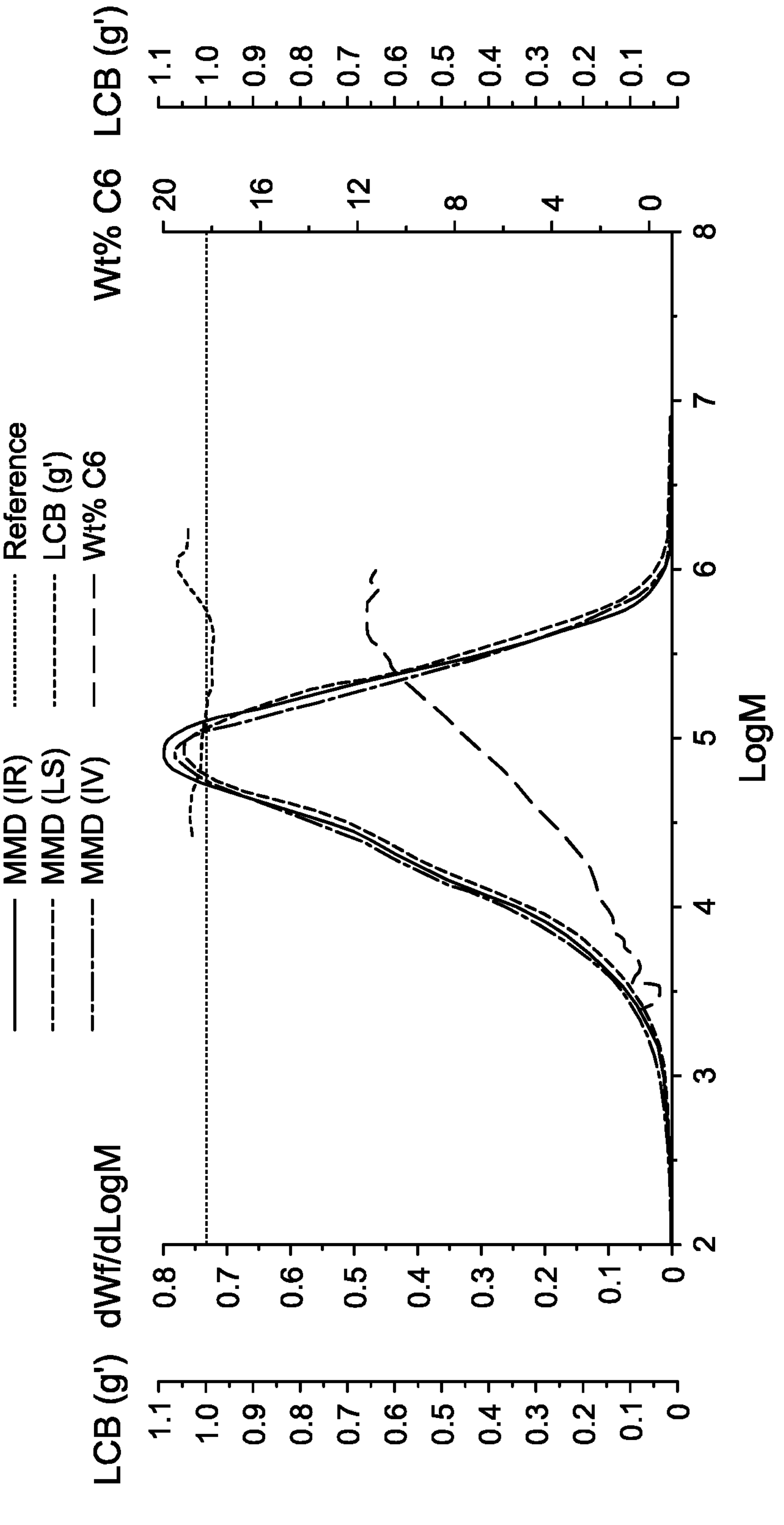
Figure 1E:
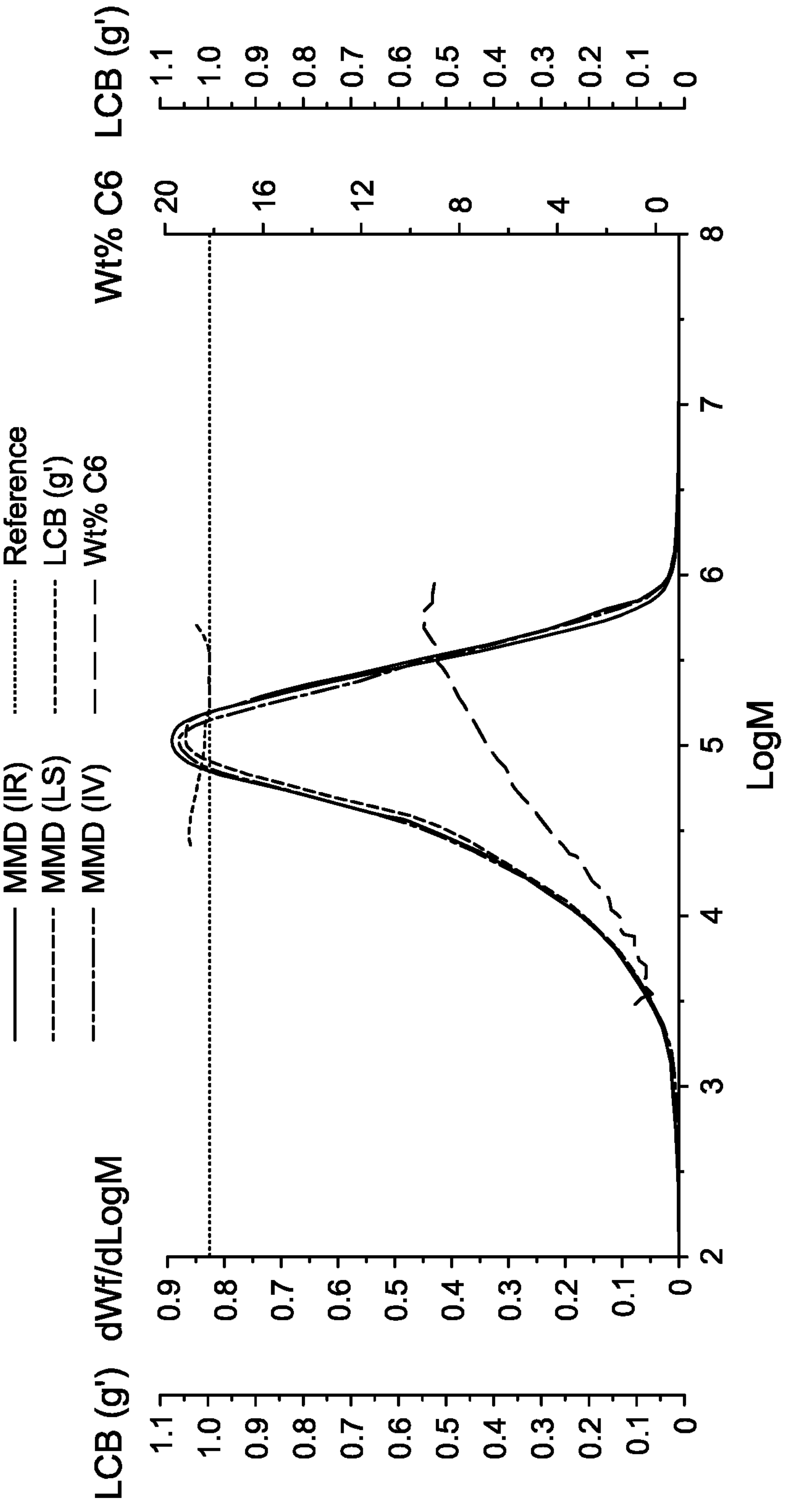
Figure 1F:
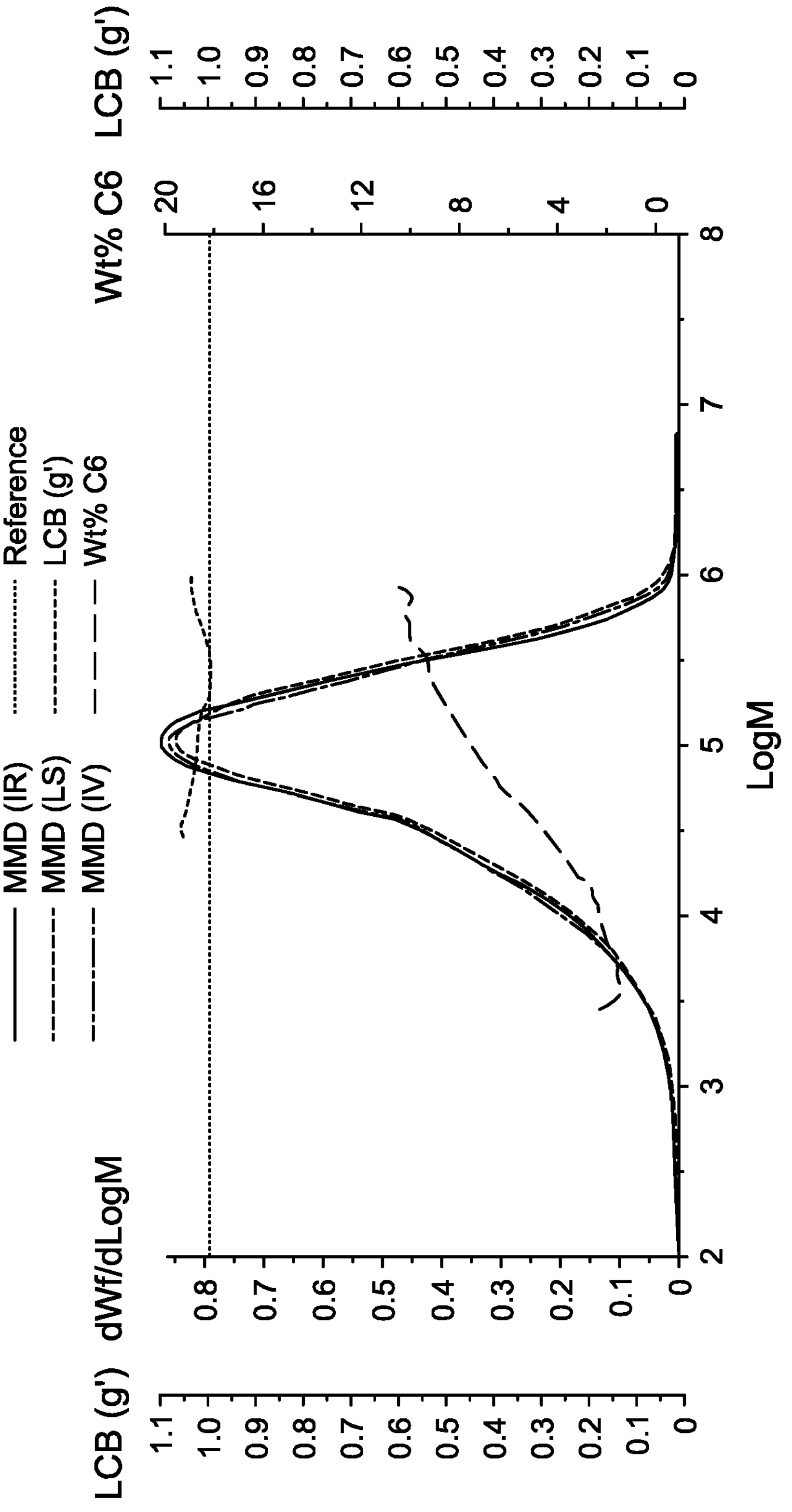
Figure 2A:
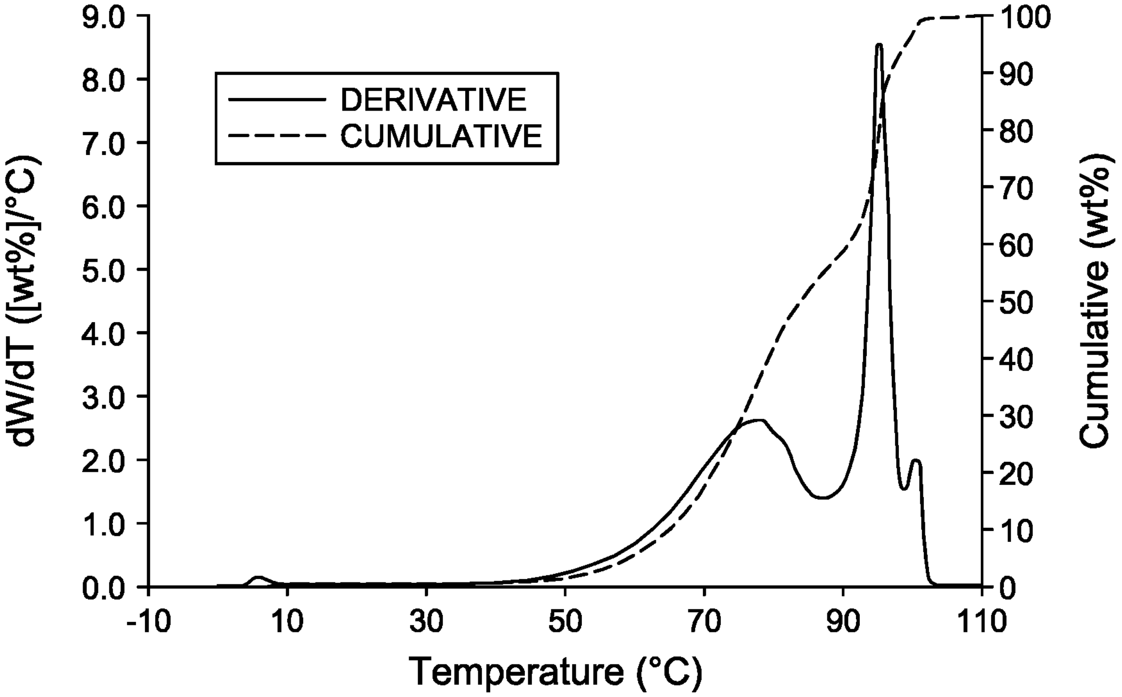
FIGS. 2A-2F shows temperature rising elution fraction-infrared (TREF-IR) curves of example ethylene hexene copolymers according to at least one embodiment of the present disclosure.
Figure 2B:
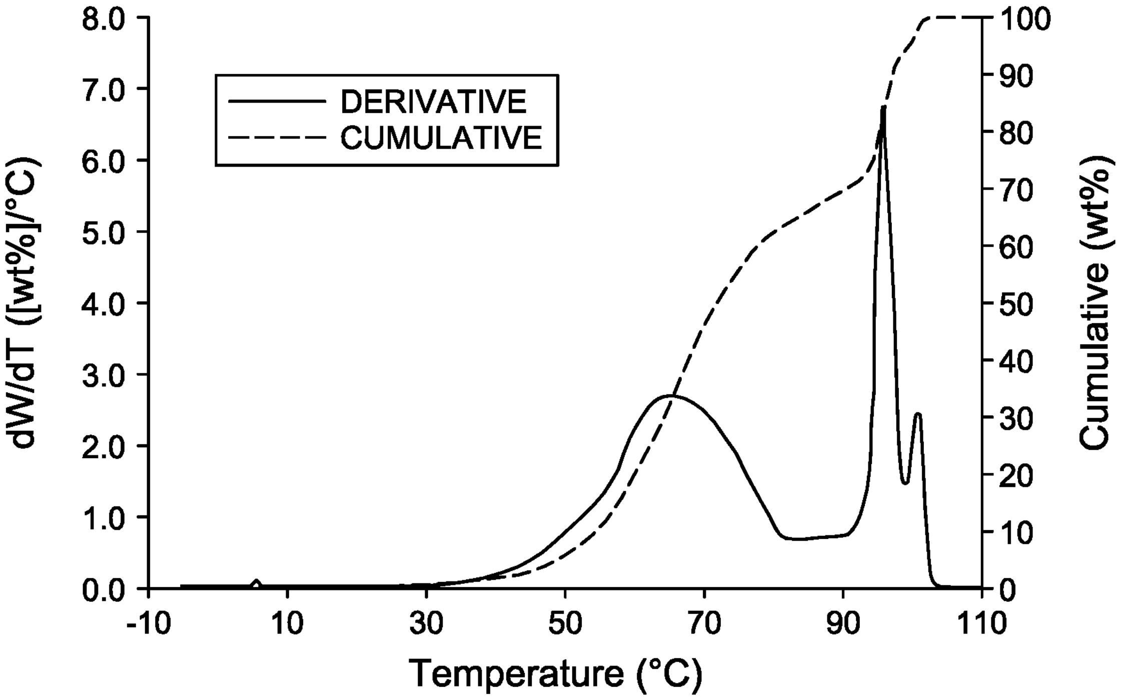
Figure 2C:
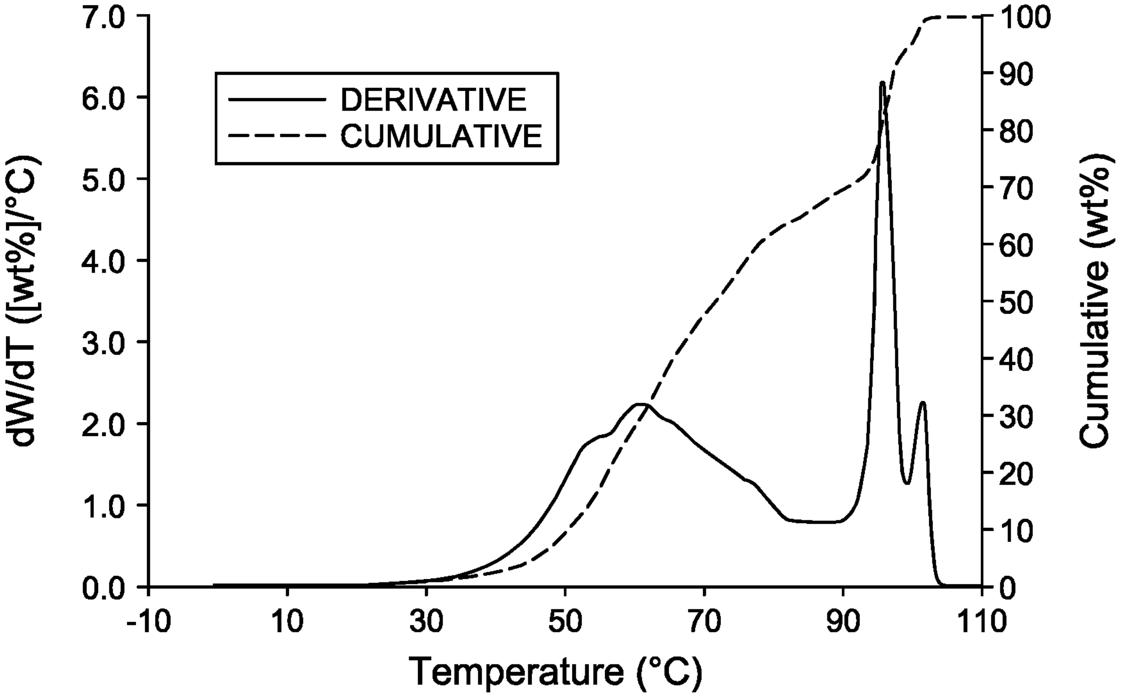
Figure 2D:
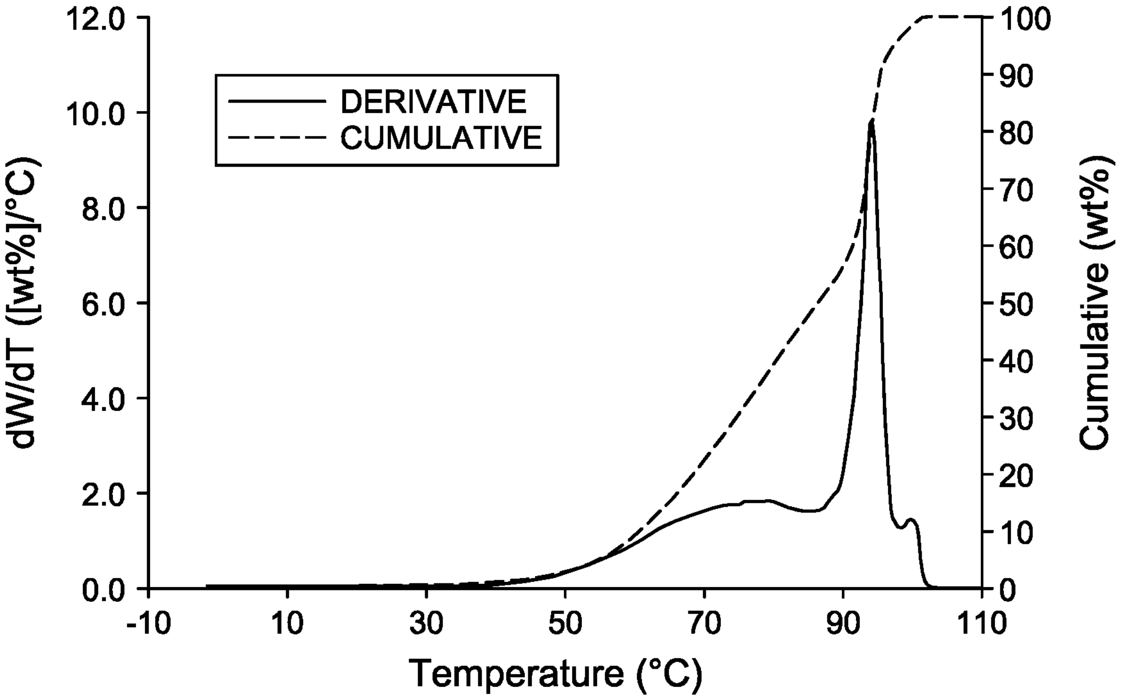
Figure 2E:
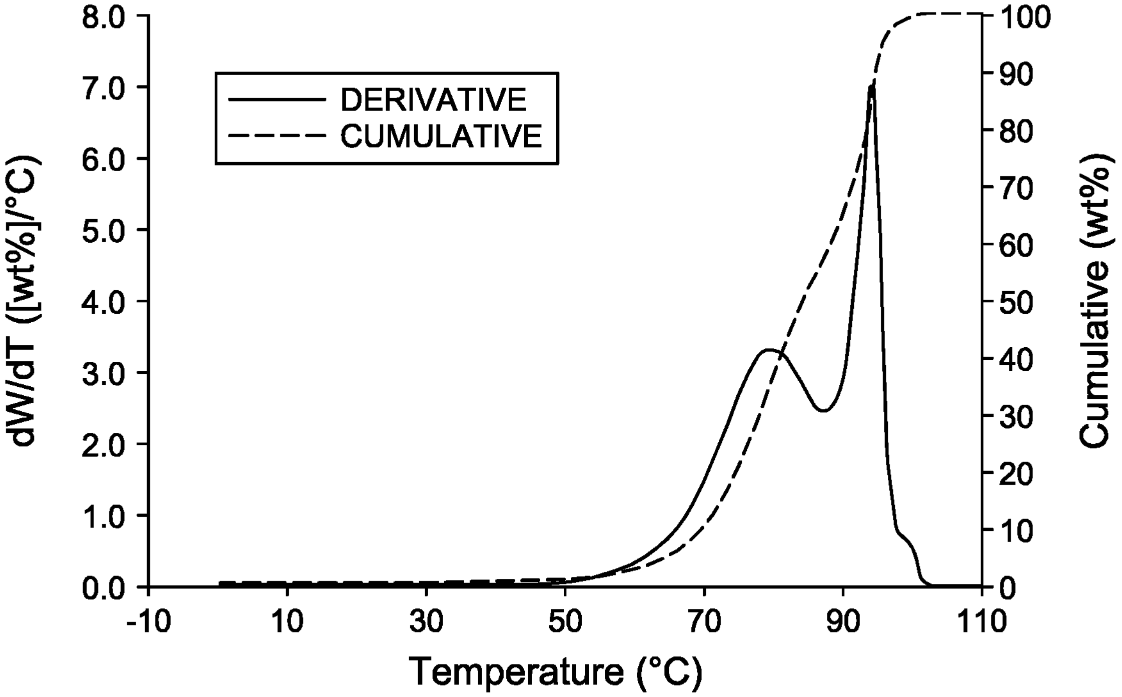
Figure 2F:
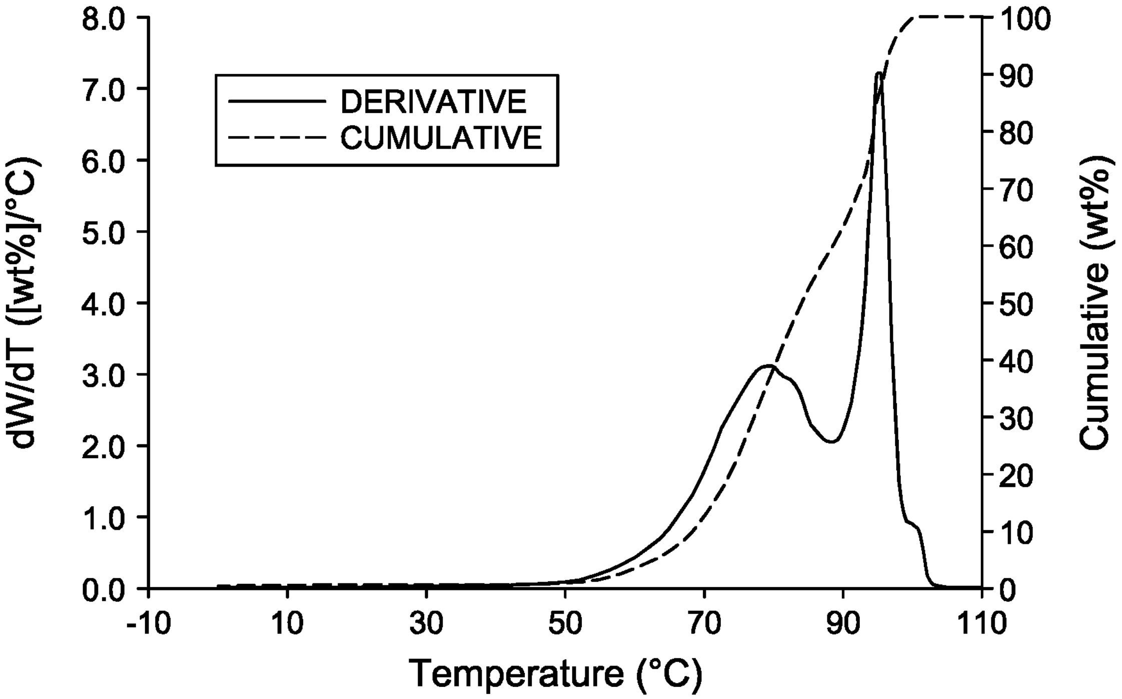

The present disclosure generally relates to catalyst systems, polyethylenes, processes for producing polyethylenes, and uses of such compositions in, e.g., films. The polyethylenes and films thereof have an improved balance of one or more of, e.g., stiffness, toughness, or processability. Catalyst systems and processes of the present disclosure employ a mixed catalyst system of a metallocene catalyst and an iron catalyst for the polymerization. The catalyst ratio of metallocene catalyst to iron catalyst can be tuned by using "trim" technology. Trimming, herein, involves reacting the supported catalyst with a solution containing the same or different metallocene catalyst or a solution containing the same or different iron catalyst. By adjusting the trimming of a composition and adjusting catalyst ratios in line to a reactor, embodiments of the present disclosure can enable production of various grades of polyethylenes which can focus on different aspects of performance. For example, and in at least one embodiment, an increase in the metallocene concentration can enable an increase in the low-density, high-molecular weight polyethylene (PE) component over the high-density, low-molecular weight PE component. This can provide a tougher material, while decreasing some stiffness of the material at approximately similar densities. However, when trimming an iron complex, the high-density, low-molecular weight PE component can increase the overall stiffness of the material while decreasing the toughness of the material. Adjusting the ratios of catalysts can be beneficial for, at least, fine-tuning polymer and film properties depending on application targeting.

It has been discovered that polymer properties, such as melt index ratio (MIR), in a trim process can be controlled by, e.g., the starting ratio of a catalyst system, the final ratio of a catalyst system, and/or whether the same or different catalyst is used for trimming. For example, the MIR of a polymer formed by a catalyst ratio of 80:20 (first catalyst: second catalyst) and trimmed with a third catalyst differs from the MIR of a polymer formed without trimming. Significant polymer properties improvement associated by the trim efficiency of the catalyst demonstrates the critical role of the catalyst trim. Further, films made from such polymers show enhanced properties. For example, trimming with a third catalyst provides a film having higher MD secant (improved stiffness) among other enhanced film properties.

The present disclosure provides processes for producing polyethylene and ethylene copolymers comprising polymerizing ethylene by using mixed catalyst systems with properties tunable in a gas-phase fluidized bed reactor. Thus, on-line ratio adjustment processes of co-supported metallocene catalysts with iron catalysts via contacting with an additional inactivated metallocene catalyst or an iron catalyst, in a hydrocarbon liquid (e.g., isopentane ($iC_5$), isohexane ($iC_6$)), utilizing trim technology are disclosed.

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

As used herein, a "composition" can include component (s) of the composition and/or reaction product(s) of two or more components of the composition. Compositions of the present disclosure can be prepared by any suitable mixing process.

For the purposes of this present disclosure, and unless otherwise specified, the term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. An oligomer is a polymer having a low molecular weight, such as an Mn of 21,000 g/mol or less (such as 10,000 g/mol or less), and/or a low number of mer units, such as 100 mer units or less (such as 75 mer units or less).

For the purposes of this present disclosure, and unless otherwise specified, the term "alpha-olefin" refers to an olefin having a terminal carbon-to-carbon double bond in the structure thereof ((R'R")—C=CH$_2$, where R' and R" is independently hydrogen or any hydrocarbyl group; such as R' is hydrogen and R" is an alkyl group). A "linear alpha-olefin" is an alpha-olefin defined in this paragraph wherein R' is hydrogen, and R" is hydrogen or a linear alkyl group. Non-limiting examples of alpha-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbomadiene, dicyclopentadiene, 5-ethylidene-2-norbornene, vinylcyclohexene, 5-vinyl-2-norbomene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

As used herein, and unless otherwise specified, the term "$C_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

For the purposes of this present disclosure, and unless otherwise specified, the terms "group," "radical," and "substituent" may be used interchangeably. For the purposes of this present disclosure, and unless otherwise specified, the term "alkyl" or "alkyl group" interchangeably refers to a hydrocarbyl group consisting of carbon and hydrogen atoms. An alkyl group can be substituted or unsubstituted and can be linear, branched, or cyclic. For the purposes of this present disclosure, and unless otherwise specified, the term "cycloalkyl" or "cycloalkyl group" interchangeably refers to a hydrocarbyl group wherein the carbon atoms form one or more ring structures.

For the purposes of this present disclosure, and unless otherwise specified, the term "alkenyl" or "alkenyl group" interchangeably refers to a linear unsaturated hydrocarbyl group comprising a C=C bond therein.

For the purposes of this present disclosure, and unless otherwise specified, the term "aryl" or "aryl group" interchangeably refers to a hydrocarbyl group comprising an aromatic ring structure therein.

For the purposes of this present disclosure, and unless otherwise specified, a substituted group refers to a group in which at least one atom is replaced by a different atom or a group. Thus, a substituted alkyl group is an alkyl group in which at least one hydrogen atom is replaced by a hydrocarbyl group, a halogen, any other non-hydrogen group, and/or at least one carbon atom and hydrogen atoms bonded thereto is replaced by a different group. As a non-limiting example, a substituted group is a radical in which at least one hydrogen atom has been substituted with a heteroatom or heteroatom containing group, such as with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where R* is, independently, hydrogen or a hydrocarbyl.

For the purposes of this present disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl, and naphthyl.

For the purposes of this present disclosure, and unless otherwise specified, substituted hydrocarbyl radicals are radicals in which at least one hydrogen atom has been substituted with a heteroatom or heteroatom containing group, such as with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where R* is, independently, hydrogen or a hydrocarbyl.

In some embodiments, the hydrocarbyl radical is defined to be $C_1$-$C_{100}$ alkyls that may be linear, branched, or cyclic. Non-limiting examples of such radicals can include methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclopropyl, cyclobutyl, cyclopentyl, cyclohexyl, cyclohexenyl, methylcyclohexyl, cyclooctyl, and the like. For this present disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For the purposes of this present disclosure, and unless otherwise specified, the terms "alkoxy" and "alkoxide" refer to an alkyl or aryl group bound to an oxygen atom, such as an alkyl ether or aryl ether group/radical connected to an oxygen atom and can include those where the alkyl/aryl group is a $C_1$-$C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

For the purposes of this present disclosure, and unless otherwise specified, the term "substituted hydrocarbyl" refers to a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., $—NR^*_2$, $—OR^*$, $—SeR^*$, $—TeR^*$, $—PR^*_2$, $—AsR^*_2$, $—SbR^*_2$, $—SR^*$, $—BR^*_2$, $—SiR^*_3$, $—GeR^*_3$, $—SnR^*_3$, $—PbR^*_3$, $—(CH_2)q\text{-}SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For the purposes of this present disclosure, and unless otherwise specified, the term "ring atom" refers to an atom that is part of a cyclic ring structure. By this definition, a benzyl group has six ring atoms and tetrahydrofuran has 5 ring atoms.

For the purposes of this present disclosure, and unless otherwise specified, the term "aryl" or "aryl group" refers to an aromatic ring such as phenyl, naphthyl, xylyl, etc. Likewise, heteroaryl refers to an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

For the purposes of this present disclosure, and unless otherwise specified, a heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g $mol^{-1}$).

A "catalyst system" is a combination of at least one catalyst compound, at least one activator, an optional co-activator, and an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

For the purposes of this present disclosure, and unless otherwise specified, the terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor.

For the purposes of this present disclosure, and unless otherwise specified, a scavenger is a compound typically added to facilitate oligomerization/polymerization by scavenging impurities. Some scavengers may also act as activators and may be referred to as co-activators. A co-activator, that is not a scavenger, may be used in conjunction with an activator in order to form an active catalyst. In some embodiments, a co-activator can be pre-mixed with the catalyst compound to form an alkylated catalyst compound. For the purposes of this present disclosure, ethylene shall be considered an $\alpha$-olefin.

In at least one embodiment, the properties and performance of the polyethylene may be advanced by the combination of: (1) varying reactor conditions such as reactor temperature, hydrogen concentration, comonomer concentration, and so on; and (2) selecting and feeding a dual catalyst system having a first catalyst and second catalyst trimmed or not with the first catalyst, the second catalyst, or a third catalyst.

With respect to at least one embodiment of the catalyst system, the first catalyst is a high molecular weight component and the second catalyst is a low molecular weight component. In other words, the first catalyst may provide primarily for a high molecular-weight portion of the polyethylene and the second catalyst may provide primarily for a low molecular weight portion of the polyethylene.

In at least one embodiment, the amount of first or second catalyst fed (or the catalyst trim ratio) the amount of third catalyst fed, and/or the reactor conditions (e.g., temperature and hydrogen concentration), may be varied to give a range of MI and MIR while maintaining polyethylene density. The embodiments may advantageously hold a broad range of MI's with the same catalyst system, e.g., the same dual catalyst system. For a catalyst system fed to the polymerization reactor, the polymer MI, MIR, and density may be controlled by varying reactor conditions such as the reactor mixture including an additional catalyst added, operating temperature, hydrogen concentration, and comonomer concentration in the reaction mixture.

Using multiple pre-catalysts that are co-supported on a single support mixed with an activator, such as a silica methylaluminoxane (SMAO), can be economically advantageous by making the polymer product in one reactor instead of multiple ones. Additionally, using a single support also eases intimate mixing of the polymers while off improving the process relative to preparing a mixture of polymers of different Mw and density independently from multiple catalysts in a single reactor. As described herein, a pre-catalyst is a catalyst compound prior to exposure to activator. The catalysts can be co-supported during a single operation, or may be used in a trim operation, in which one or more additional catalysts are added to catalysts that are supported.

Evidence of the incorporation of comonomer into a polymer is indicated by the density of a polyethylene copolymer, with lower densities indicating higher incorporation. The difference in densities of the low molecular weight (LMW) component and the high molecular weight (HMW) component would be greater than about 0.02, or greater than about 0.04, with the HMW component having a lower density than the LMW component. Satisfactory control of the MWD and short-chain branching distribution (SCBD) lead to the adjustment of these factors, which can be adjusted by tuning the relative amount of the two pre-catalysts on the support. This may be adjusted during the formation of the pre-catalysts, e.g., by supporting two catalysts on a single support. In at least one embodiment, the relative amounts of the pre-catalysts can be adjusted by adding one of the components to a catalyst mixture progressing into the reactor in a process termed "trim." Furthermore, the amount of catalyst addition can be controlled by means of feedback of polymer property data obtained.

Moreover, a variety of polymers with different MWD, SCBD, and long-chain branching distribution (LCBD) may be prepared from a limited number of catalysts. Indeed, the pre-catalysts should trim well onto activator supports. Two parameters that can benefit trimming are solubility in alkane solvents and rapid supportation on the catalyst slurry en-route to the reactor. In at least one embodiment, the mixed catalyst system provides a polymer with a mix of beneficial properties as a result of a tailored combination of MWD and polymer branching. The ability to control the MWD and polymer branching can be important in determining the processability and strength of the resultant polymer.

In at least one embodiment, the first catalyst includes a metallocene catalyst and the second catalyst is an iron catalyst. Further, the catalyst system may be a common supported catalyst system. Furthermore, the second catalyst may be added as a trim catalyst to a slurry having the first catalyst fed the reactor. The first catalyst and the second catalyst may be impregnated on a single support. Furthermore, in certain embodiments, the first catalyst promotes polymerization of the ethylene into a high molecular weight portion of the polyethylene, and the second catalyst promotes polymerization of the ethylene into a low molecular-weight portion of the polyethylene. In some embodiments, an amount of the second catalyst fed (or the catalyst trim ratio) to the polymerization reactor may be adjusted along with reactor conditions to control polyolefin properties at a given MIR, for instance. In some embodiments, an amount of the first catalyst fed (or the catalyst trim ratio) to the polymerization reactor may be adjusted along with reactor conditions to control polyolefin properties at a given MIR, for instance. In some embodiments, an amount of third catalyst fed to the polymerization reactor may be adjusted along with reactor conditions to control polyolefin properties at a given MIR, for instance.

Other embodiments provide for a method of producing polyethylene, including: polymerizing ethylene in the presence of a catalyst system in a reactor to form polyethylene, where the catalyst system comprises a first catalyst and a second catalyst; and adjusting reactor temperature, reactor hydrogen concentration, and/or an amount of the trim catalyst (e.g., first catalyst, second catalyst, or third catalyst) fed to the reactor, to give a range of MIR of the polyethylene while maintaining, e.g., density and MI of the polyethylene. At least one embodiment provides for a system and method of producing polyethylene, including: polymerizing ethylene in the presence of a catalyst system in a reactor to form polyethylene, wherein the catalyst system comprises a first catalyst and a second catalyst, and adjusting reactor conditions and an amount of the trim catalyst (e.g., first catalyst, second catalyst, or third catalyst) fed to the reactor, to adjust the MI and/or MIR of polymer product.

Assorted catalyst systems and components may be used to generate the polymers. These are discussed in the sections to follow regarding the catalyst compounds that can be used in embodiments, including the metallocene and the iron catalysts, among others; generating catalyst slurries that may be used for implementing the techniques described; supports that may be used; catalyst activators that may be used; the catalyst component solutions that may be used to add additional catalysts in trim systems; and polymerization processes.

Catalyst Precursors and Activators

In at least one embodiment of the present disclosure, the catalyst system can include a metallocene catalyst (a first catalyst compound), an iron catalyst (a second catalyst compound), and an activator. In some embodiments, the catalyst system can include two or more catalysts, the two or more catalysts include a metallocene catalyst (a first catalyst compound), an iron catalyst (a second catalyst compound), and a third catalyst used to trim the reaction. This third catalyst can be a metallocene catalyst and/or an iron catalyst.

Metallocene Catalyst

In at least one embodiment of the present disclosure, the catalyst systems can include a Group 4 metallocene catalyst represented by Formula (I):

(I)

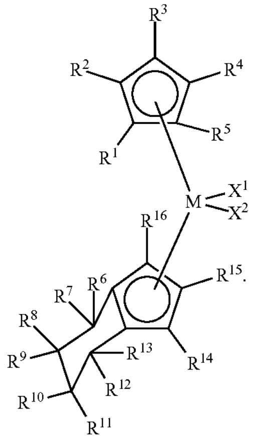

In at least one embodiment, M is a group 4 metal such as hafnium (Hf) or zirconium (Zr) in at least one embodiment, M is hafnium.

In at least one embodiment, each of $X^1$ and $X^2$ is independently a univalent anionic ligand, a diene ligand, an alkylidene ligand, or $X^1$ and $X^2$ are joined to form a metallocyclic ring. Each of $X^1$ and $X^2$ can be independently a halide, a hydride, an alkyl group, an alkenyl group or an arylalkyl group. In at least one embodiment, each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure. In at least one embodiment, each of $X^1$ and $X^2$ is independently selected from hydrocarbyl radicals having from 1 to 20 carbon atoms, aryls, hydrides, amides, alkoxides, sulfides, phosphides, halides, dienes, amines, phosphines, ethers, and a combination thereof, (each of $X^1$ and $X^2$ may form a part of a fused ring or a ring system), such as $X^1$ and $X^2$ is independently selected from halides, aryls, and $C_1$ to $C_5$ alkyl groups, such as phenyl, methyl, ethyl, propyl, butyl, pentyl, or chloride group. In at least one embodiment, each of $X^1$ and $X^2$ are chloride.

In at least one embodiment, each of $R^1$, $R^2$, $R^3$, $R^4$, $R^5$, $R^6$, $R^{14}$, $R^{15}$, and $R^{16}$ is independently selected from hydrogen, halogen, $C_1$-$C_{40}$ hydrocarbyl, substituted $C_1$-$C_{40}$ hydrocarbyl, a functional group comprising elements from Groups 13 to 17 of the periodic table of the elements (such as $-NR'_2$, $-SR'$, $-OR'$, $-OSiR'_3$, or $-PR'_2$, wherein each R' is independently hydrogen, halogen, $C_1$-$C_{10}$ alkyl, or $C_6$-$C_{10}$ aryl), or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ are joined to form a saturated ring, unsaturated ring, substituted saturated ring, or substituted unsaturated ring, such as a substituted or unsubstituted $C_4$ to $C_{62}$ cyclic or polycyclic ring. In at least one embodiment, each of $R^6$ and $R^{13}$ is hydrogen. In at least one embodiment, one or more of $R^1$, $R^2$, $R^3$, $R^4$ and $R^5$ is $-CH_2-Si-(CH_3)_3$. In at least one embodiment, $R^1$, $R^2$, $R^3$, and $R^4$ are each hydrogen and $R^5$ is $-CH_2-Si-(CH_3)_3$. In at least one embodiment, each of $R^{14}$, $R^{15}$, and $R^{16}$ is hydrogen.

In at least one embodiment, each of $R^7$, $R^8$, $R^9$, $R^{10}$, $R^{11}$, $R^{12}$, and $R^{13}$ is independently selected from hydrogen, halogen, $C_1$-$C_{40}$ hydrocarbyl, substituted $C_1$-$C_{20}$ hydrocarbyl, a functional group comprising elements from Groups 13 to 17 of the periodic table of the elements (such as $-NR'_2$, $-SR'$, $-OR'$, $-OSiR'_3$, or $-PR'_2$, wherein each R' is independently hydrogen, halogen, $C_1$-$C_{10}$ alkyl, or $C_6$-$C_{10}$ aryl), or two of $R^7$, $R^8$, $R^9$, $R^{10}$, $R^{11}$, $R^{12}$, and $R^{13}$ are joined to form a saturated ring, unsaturated ring, substituted saturated ring, or substituted unsaturated ring, such as a substituted or unsubstituted $C_4$ to $C_{62}$ cyclic or polycyclic ring. In at least one embodiment, each of $R^7$, $R^8$, $R^9$, $R^{10}$, $R^{11}$, $R^{12}$ and $R^{13}$ is hydrogen.

In at least one embodiment, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, halide, alkoxide or $C_1$ to $C_{40}$ substituted or unsubstituted hydrocarbyl (such as $C_1$ to $C_{12}$ substituted or unsubstituted hydrocarbyl), or —R"—SiR'$_3$ or —R"—CR'$_3$ where R" is $C_1$ to $C_4$ hydrocarbyl (such as —$CH_2$—; —$CH_2CH_2$—; -(Me)$CHCH_2$—; or -(Me)CH—, and each R' is independently $C_1$ to $C_{20}$ substituted or unsubstituted hydrocarbyl and at least one R' is $C_1$ to $C_{20}$ substituted or unsubstituted hydrocarbyl. In at least one embodiment, each R' is independently selected from methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

In at least one embodiment, $C_1$-$C_{40}$ hydrocarbyl, $C_{1-20}$ hydrocarbyl, or $C_1$-$C_{12}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2$($C_6Me_5$), —$CH_2$—$C(CH_3)_2Ph$, —$CH_2$—C(Cy)$Ph_2$, —$CH_2$—$SiPh_3$, —$CH_2$—$Si(CH_3)_2Ph$, —$CH_2$—$Si(CH_3)_2Ph$, —$CH_2$—$Si(CH_3)Ph_2$, —$CH_2$—Si(Et)$_2$Ph, —$CH_2$—Si(Et)$Ph_2$, —$CH_2$—Si(Cy)$Ph_2$, or —$CH_2$—Si(Cy)$_2$Ph.

In at least one embodiment, each of $R^6$, $R^7$, $R^8$, $R^9$, $R^{10}$, $R^{11}$, $R^{12}$, and $R^{13}$ is hydrogen and each of $R^1$, $R^2$, $R^3$, $R^4$, $R^5$, $R^{14}$, $R^{15}$, and $R^{16}$ is independently hydrogen, —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2$($C_6Me_5$), —$CH_2$—$C(CH_3)_2Ph$, —$CH_2$—C(Cy)$Ph_2$, —$CH_2SiPh_3$, —$CH_2$—$Si(CH_3)_2Ph$, —$CH_2$—$Si(CH_3)_2Ph$, —$CH_2$—$Si(CH_3)Ph_2$, —$CH_2$—Si(Et)$_2$Ph, —$CH_2$—Si(Et)$Ph_2$, —$CH_2$—Si(Cy)$Ph_2$, or —$CH_2$—Si(Cy)$_2$Ph.

In at least one embodiment, each of $R^6$, $R^7$, $R^8$, $R^9$, $R^{10}$, $R^{11}$, $R^{12}$, $R^{13}$, $R^{14}$, $R^{15}$, and $R^{16}$ is hydrogen and each of $R^1$, $R^2$, $R^3$, $R^4$, and $R^5$ is independently hydrogen, —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2$($C_6Me_5$), —$CH_2$—$C(CH_3)_2Ph$, —$CH_2$—C(Cy)$Ph_2$, —$CH_2SiPh_3$, —$CH_2$—$Si(CH_3)_2Ph$, —$CH_2$—$Si(CH_3)_2Ph$, —$CH_2$—$Si(CH_3)Ph_2$, —$CH_2$—Si(Et)$_2$Ph, —$CH_2$—Si(Et)$Ph_2$, —$CH_2$—Si(Cy)$Ph_2$, or —$CH_2$—Si(Cy)$_2$Ph.

A catalyst represented by Formula (I) can be an asymmetric catalyst. Useful asymmetric catalysts can be such that a mirror plane cannot be drawn through the metal center and the cyclopentadienyl moieties bridged to the metal center are structurally different.

In at least one embodiment, the Group 4 metallocene catalyst represented by Formula (I) is one or more of the following non-limiting metallocene catalysts:

1

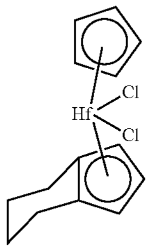

2

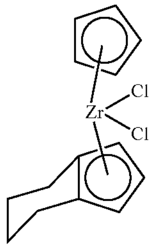

3

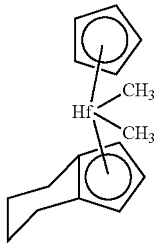

4

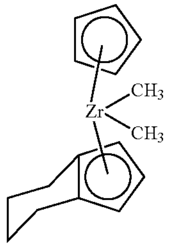

5

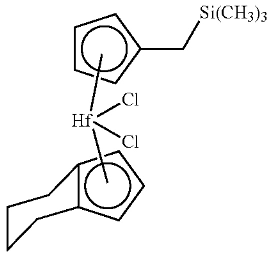

6

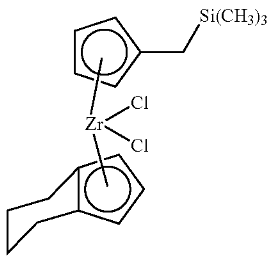

-continued
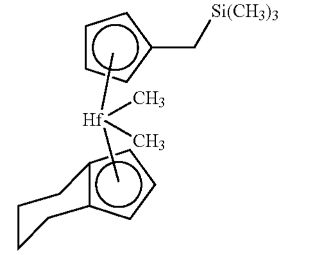
7
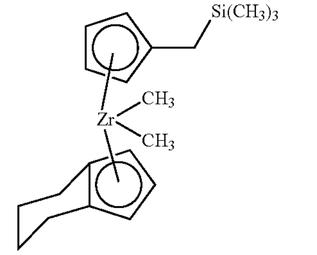
8
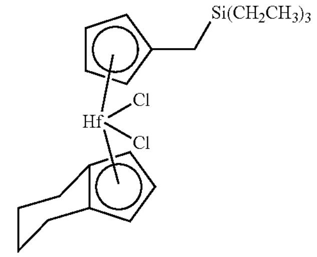
9
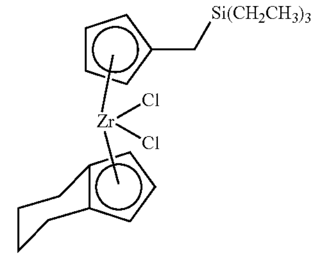
10
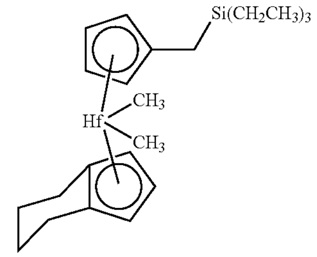
11
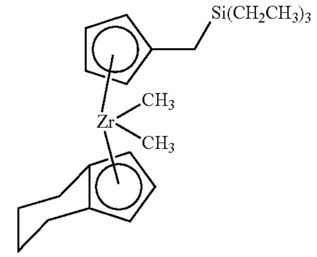
12
-continued
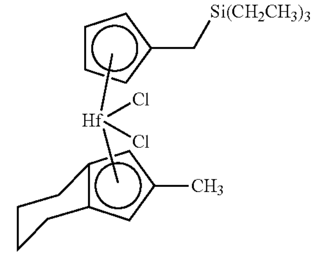
13
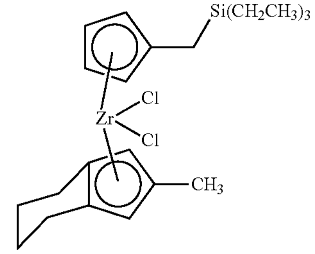
14
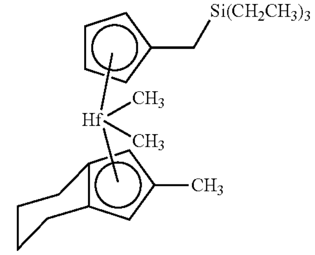
15
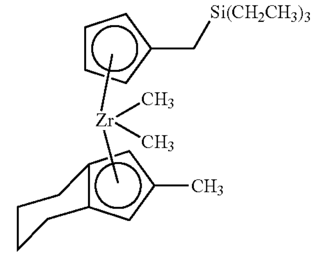
16
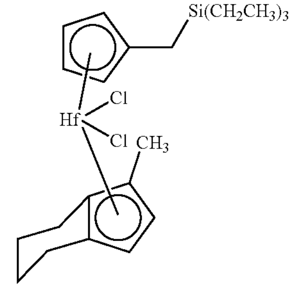
17
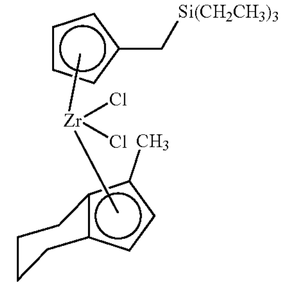
18

-continued
19
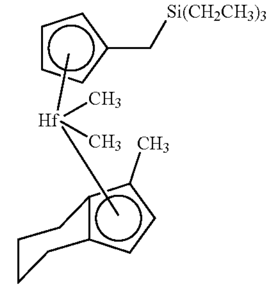
20
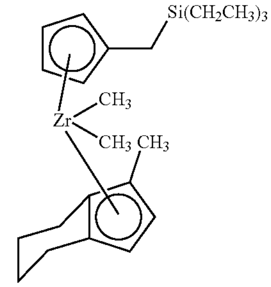
21
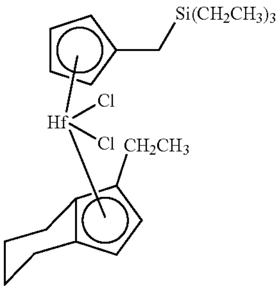
22
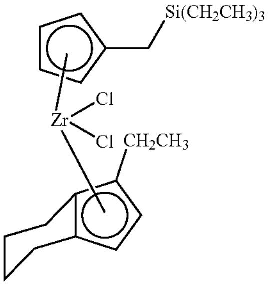
23
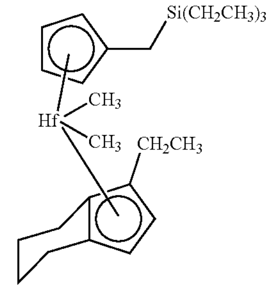
-continued
24
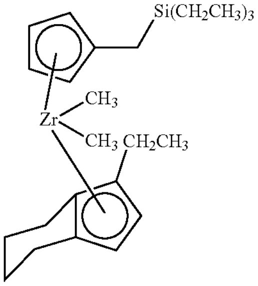
25
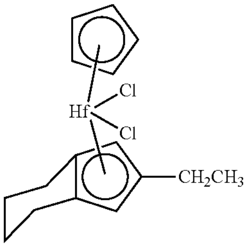
26
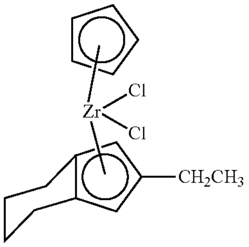
27
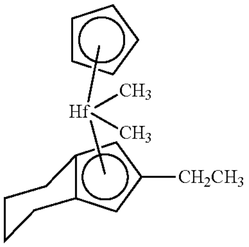
28
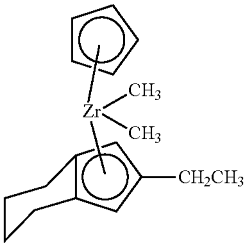
29
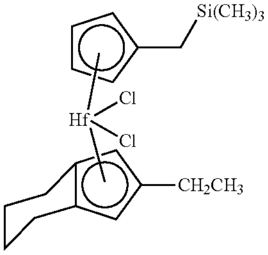

-continued
30
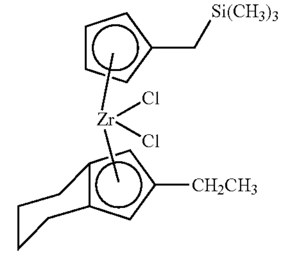
31
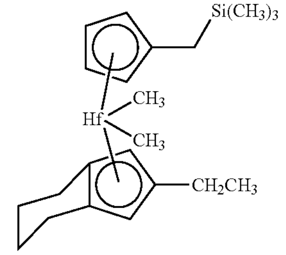
32
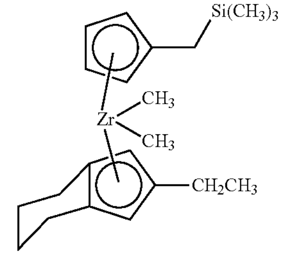
33
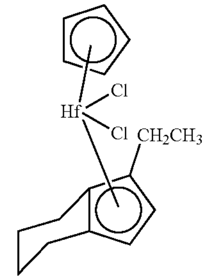
34
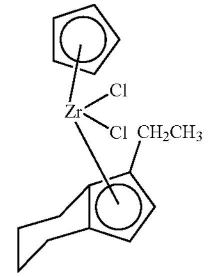
35
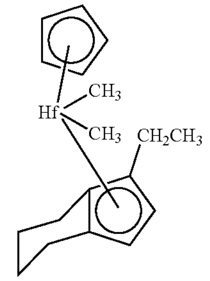
-continued
36
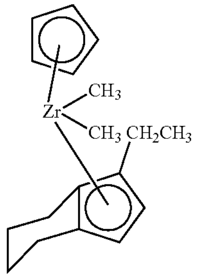
37
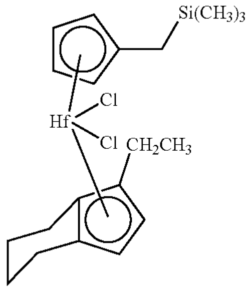
38
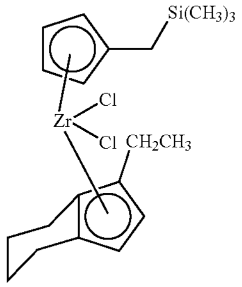
39
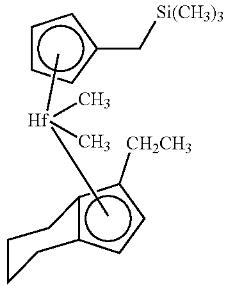
40
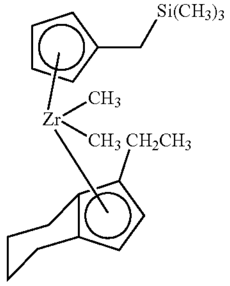

-continued
41
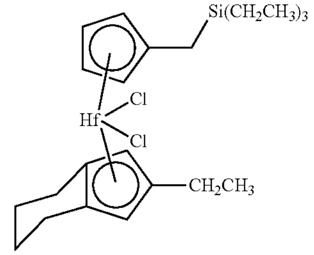
42
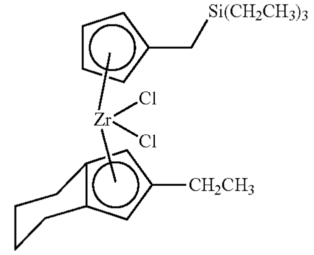
43
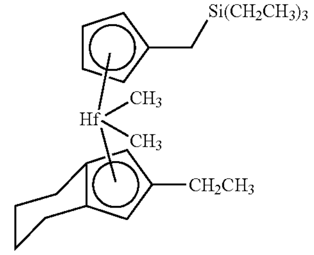
44
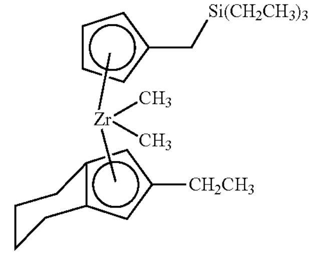
45
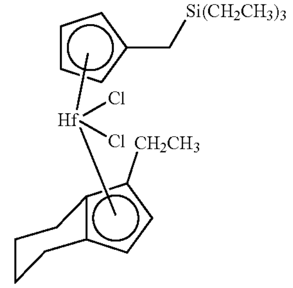
46
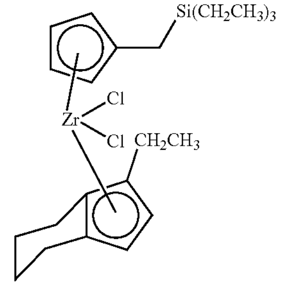
-continued
47
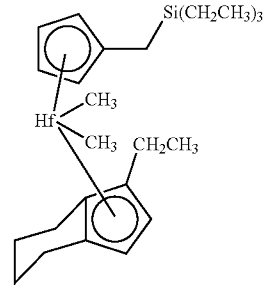
48
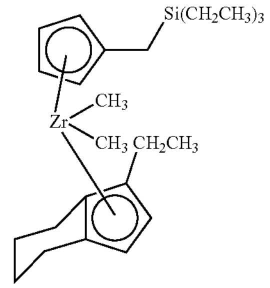
In at least one embodiment, the Group 4 metallocene catalyst represented by Formula (I) is one or more of:
5
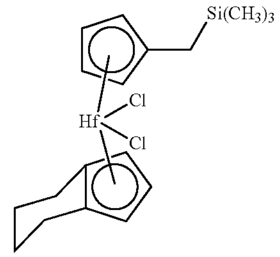
7
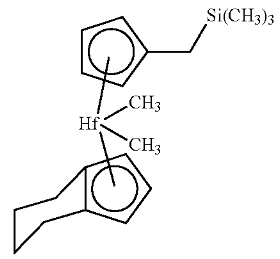
9
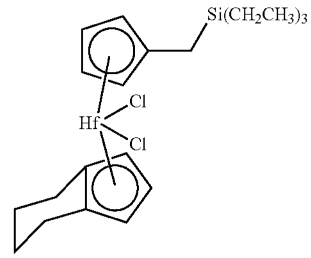

-continued

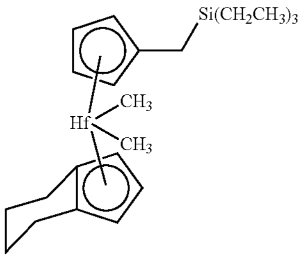

11

In at least one embodiment, the Group 4 metallocene catalyst represented by Formula (I) is

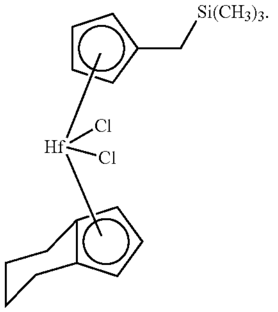

Iron Catalyst

In at least one embodiment, the iron catalyst may be an iron complex represented by Formula (IIa) and/or Formula (IIb):

(IIa)

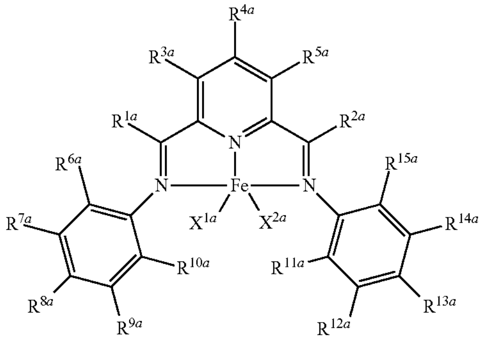

or (IIb)

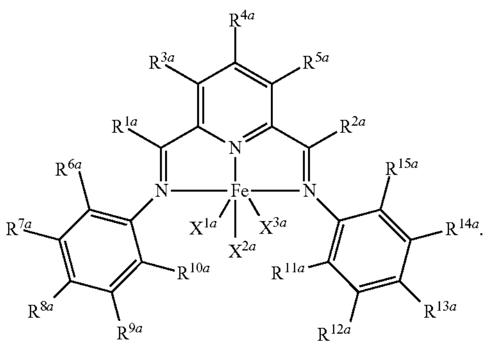

Formula (II), as used herein, refers to one or more of Formula (Ha) and/or Formula (IIb).

In at least one embodiment, each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), $NR'_2$, —OR', —$SiR''_3$ or five-, six- or seven-membered heterocyclyl comprising at least one atom selected from N, P, O and S. In at least one embodiment, each of $R^{6a}$, $R^{10a}$, $R^{11a}$, and $R^{15a}$ are independently fluorine, chlorine, bromine, or iodine. In at least one embodiment, each of $R^{6a}$, $R^{10a}$, $R^{11a}$ and $R^{15a}$ is independently optionally substituted by halogen, —$NR'_2$, —OR', or —$SiR''_3$.

In at least one embodiment, each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —$NR'_2$, —OR' or —$SiR''_3$, wherein $R^{1a}$ optionally bonds with $R^{3a}$, and $R^{2a}$ optionally bonds with $R^{5a}$, in each case to independently form a five-, six- or seven-membered ring. In at least one embodiment, $R^{1a}$ and $R^{2a}$ are independently $C_1$-$C_{22}$-alkyl, substituted $C_1$-$C_{22}$-alkyl, unsubstituted phenyl, or substituted phenyl. In at least one embodiment, each of $R^{1a}$ and $R^{2a}$ is independently selected from methyl, ethyl, n-propyl, isopropyl, n-butyl, isobutyl, sec-butyl, tert-butyl, n-pentyl, isopentyl, sec-pentyl, tert-pentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, and tert-decyl.

In at least one embodiment, each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —$NR'_2$, —OR', —$SiR''_3$ or five-, six- or seven-membered heterocyclyl comprising at least one atom selected from N, P, O and S. Each of $R^{3a}$, $R^{4a}$, $R^{5a}$, $R^{7a}$, $R^{8a}$, $R^{9a}$, $R^{12a}$, $R^{13a}$, and $R^{14a}$ is independently optionally substituted by halogen, —$NR'_2$, —OR', or —$SiR''_3$.

In at least one embodiment, each of $R^{8a}$ and $R^{13a}$ is independently selected from $C_1$-$C_{22}$-alkyl, wherein each of $R^{8a}$ and $R^{13a}$ is independently optionally substituted by halogen, —$NR'_2$, —OR', or —$SiR''_3$. In at least one embodiment, $R^{7a}$, $R^{9a}$, $R^{12a}$, and $R^{14a}$ is hydrogen. In at last one embodiment, each of $R^{3a}$, $R^{4a}$, and $R^{5a}$ is hydrogen.

In at least one embodiment, each of $X^{1a}$, $X^{2a}$, and $X^{3a}$ is independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —$NR'_2$, —OR', —SR', —$SO_3R'$, —OC(O)R', —CN, —SCN, β-diketonate, —CO, —$BF_4^-$, —$PF_6^-$ or bulky non-coordinating anion, or $X^{1a}$ and $X^{2a}$ optionally bond to form a five- or six-membered ring. Each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —$SiR''_3$, wherein R' is optionally substituted by halogen or nitrogen- or oxygen-containing groups, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring. In at least one embodiment, $X^{1a}$ and $X^{2a}$ are chlorine.

In at least one embodiment, each of $R^{6a}$, $R^{10a}$, $R^{11a}$, and $R^{15a}$ is chlorine; each of $R^{1a}$ and $R^{2a}$ is $C_1$-$C_{20}$ hydrocarbyl; each of $R^{1a}$, $R^{4a}$, and $R^{5a}$ is hydrogen; each of $R^{8a}$ and $R^{13a}$ is $C_1$-$C_{20}$ hydrocarbyl; each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from the group consisting of N, P, O and S; $R^{1a}$, $R^{2a}$, $R^{3a}$, $R^{4a}$, $R^{5a}$, $R^{7a}$, $R^{8a}$, $R^{9a}$, $R^{10a}$, and $R^{13a}$ are optionally substituted by halogen, —NR'$_2$, —OR' or —SiR"$_3$; each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring; each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

In at least one embodiment, an iron catalyst represented by Formula (II) is one or more of:

1

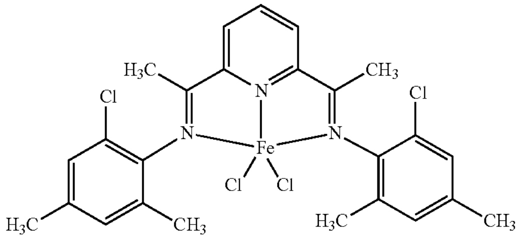

2

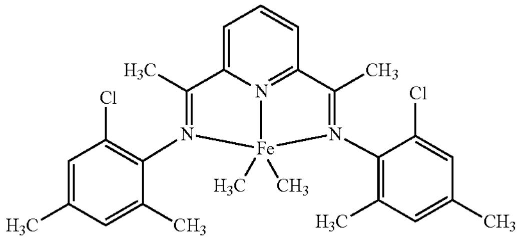

3

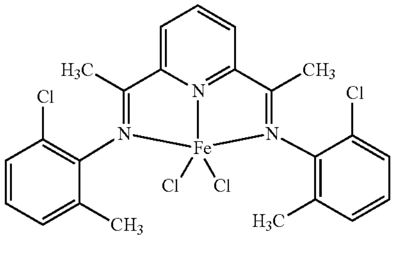

-continued

4

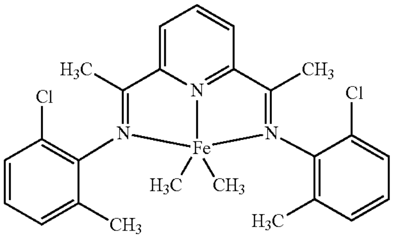

5

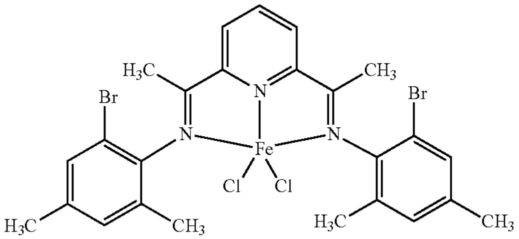

6

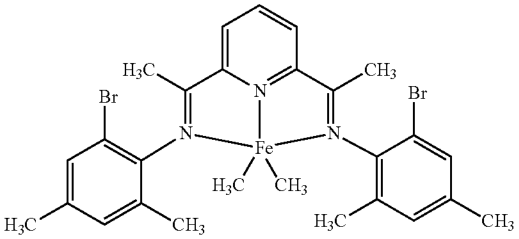

7

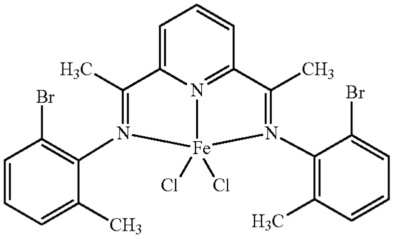

8

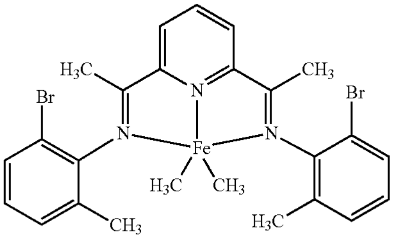

9

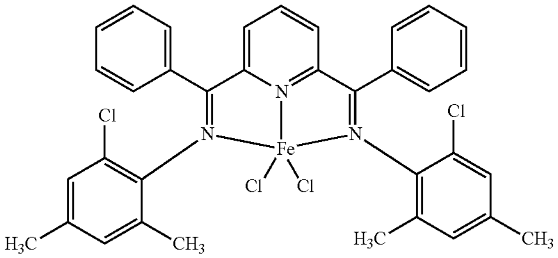

-continued
10
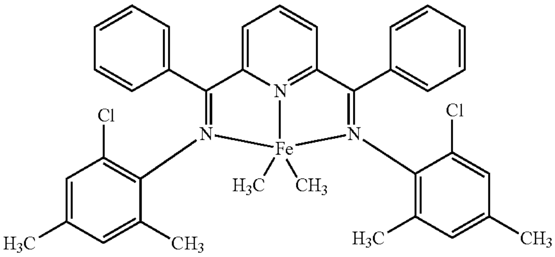
11
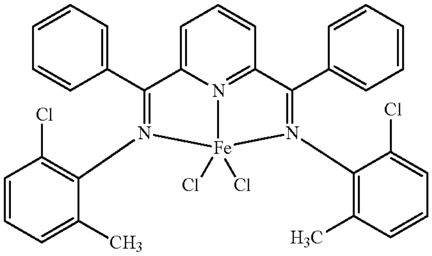
12
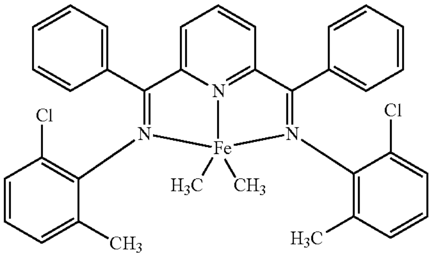
13
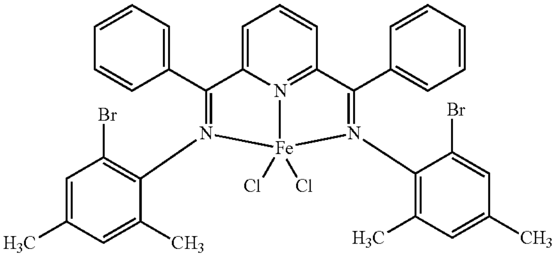
14
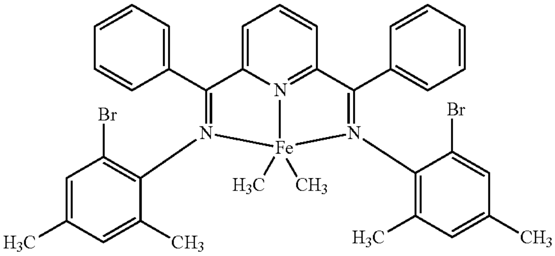
15
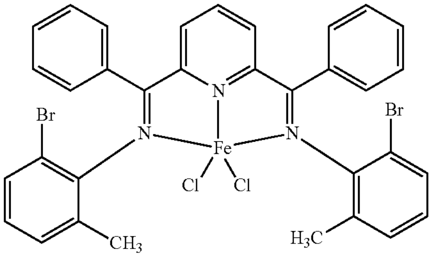
-continued
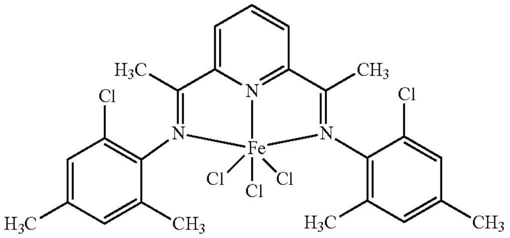
In at least one embodiment, an iron catalyst represented by Formula (II) is one or more of:
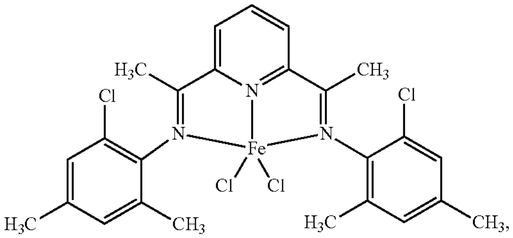
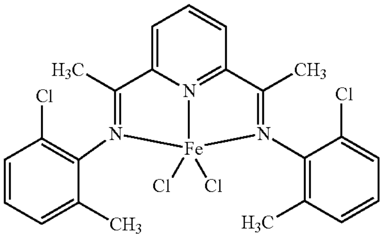
,
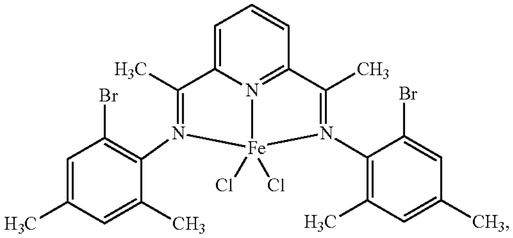
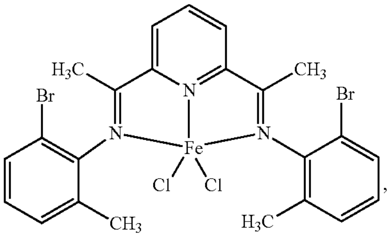
, or
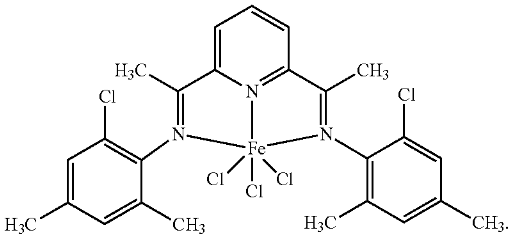
In at least one embodiment, an iron catalyst represented by Formula (II) is one or more of:

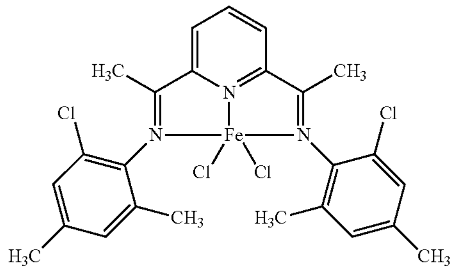

or

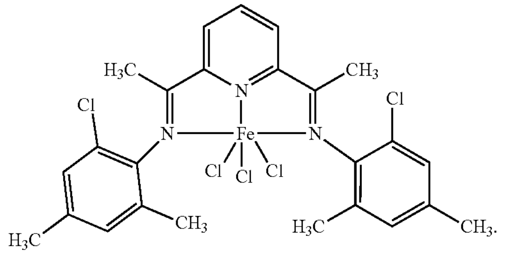

In at least one embodiment, the iron catalyst may be an iron complex represented by Formula (IIIa) and/or Formula (IIIIb):

(IIIa)

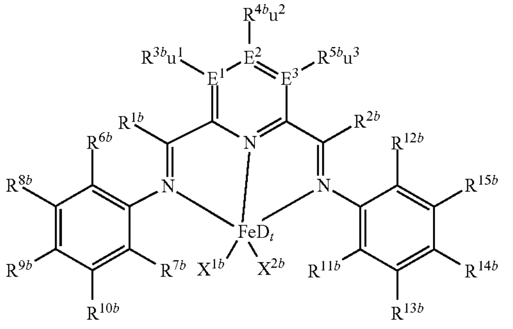

or (IIIb)

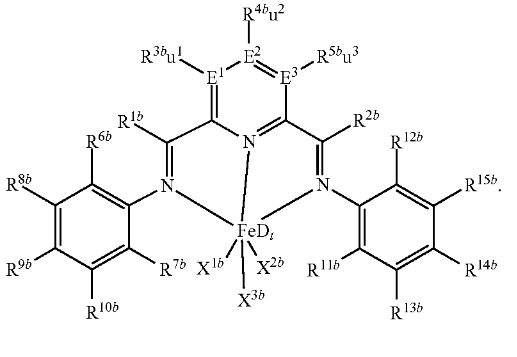

Formula (III), as used herein, refers to one or more of Formula (Ma) and/or Formula (IIIb).

In at least one embodiment, each of $R^{1b}$ and $R^{2b}$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^{1b}$ and $R^{2b}$ is optionally substituted by halogen, —$OR^{16b}$, —$NR^{17b}{}_2$, or —$SiR^{18b}{}_3$; wherein $R^{1b}$ optionally bonds with $R^{3b}$, and $R^{2b}$ optionally bonds with $R^{5b}$, in each case to independently form a five-, six-, or seven-membered ring.

In at least one embodiment, each of $R^{3b}$, $R^{4b}$, $R^{5b}$, $R^{8b}$, $R^{9b}$, $R^{10b}$, $R^{13b}$, $R^{14b}$, and $R^{15b}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16b}$, —$NR^{17b}{}_2$, halogen, —$SiR^{18b}{}_3$ or five-, six- or seven-membered heterocyclic ring comprising at least one atom selected from the group consisting of N, P, O and S.

In at least one embodiment, the catalyst compound represented by Formula (III) has an electron withdrawing side. Each of $R^{13b}$, $R^{14b}$ and $R^{15b}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$OR^{16b}$, —$NR^{17b}{}_2$, or —$SiR^{18b}{}_3$, halogen, —$NO_2$, or five-, six-, or seven-membered heterocyclic ring including at least one atom selected from N, P, O, and S. $R^{13b}$, $R^{14b}$, and $R^{15b}$ can be independently substituted by —$NO_2$, —$CF_3$, —$CF_2CF_3$, —$CH_2CF_3$, halogen, —$OR^{16b}$, —$NR^{17b}{}_2$, or —$SiR^{18b}{}_3$. Furthermore, each of $R^{13b}$, $R^{14b}$, and $R^{15b}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of $R^{13b}$, $R^{14b}$, and $R^{15b}$ can be substituted by —$NO_2$, —$CF_3$, —$CF_2CF_3$, —$CH_2CF_3$, halogen, —$OR^{16b}$, —$NR^{17b}{}_2$, or —$SiR^{18b}{}_2$. In at least one embodiment, at least one of $R^{13b}$, $R^{14b}$, and $R^{15b}$ is halogen or $C_1$-$C_{22}$-alkyl substituted with one or more halogen atoms. In at least one embodiment, each of $R^{13b}$, $R^{14b}$, and $R^{15b}$, is independently hydrogen, halogen (such as fluorine, chlorine, bromine, or iodine), or trihalomethyl (such as trichloromethyl or trifluoromethyl), where at least one of $R^{13b}$, $R^{14b}$, and $R^{15b}$ is halogen or trihalomethyl.

In at least one embodiment, each of $R^{3b}$, $R^{4b}$, $R^{5b}$, $R^{8b}$, $R^{9b}$, $R^{10b}$, $R^{13b}$, $R^{14b}$, and $R^{15b}$ are optionally substituted by halogen, —$OR^{16b}$, —$NR^{17b}{}_2$, halogen, —$SiR^{18b}{}_3$; wherein $R^{3b}$ optionally bonds with $R^{4b}$, $R^{4b}$ optionally bonds with $R^{5b}$, $R^{7b}$ optionally bonds with $R^{10b}$, $R^{10b}$ optionally bonds with $R^{9b}$, $R^{9b}$ optionally bonds with $R^{8b}$, $R^{15b}$ optionally bonds with $R^{14b}$, $R^{14b}$ optionally bonds with $R^{13b}$, and $R^{13b}$ optionally bonds with $R^{11b}$, in each case to independently form a five-, six- or seven-membered carbocyclic or heterocyclic ring, the heterocyclic ring comprising at least one atom from the group consisting of N, P, O and S.

In some embodiments, each of $R^{6b}$, $R^{7b}$, $R^{11b}$, and $R^{12b}$ is independently $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as —$OR^{16b}$, —$NR^{17b}{}_2$, halogen, —$SiR^{18b}{}_3$ or five-, six- or seven-membered heterocyclic ring including at least one atom selected from the group consisting of N, P, O and S); wherein $R^{6b}$, $R^{7b}$, $R^{11b}$, and $R^{12b}$ are optionally substituted by halogen, —$OR^{16b}$, —$NR^{17b}{}_2$, —$SiR^{18b}{}_3$, wherein $R^{6b}$ optionally bonds with $R^{8b}$, $R^{11b}$ optionally bonds with $R^{13b}$, or $R^{15b}$ optionally bonds with $R^{12b}$ in each case to independently form a five-, six- or seven-membered carbocyclic or heterocyclic ring, the heterocyclic ring including at least one atom from the group consisting of N, P, O and S; wherein at least one of $R^{6b}$, $R^{7b}$, $R^{11b}$, and $R^{12b}$ is independently a heteroatom or a heteroatom-containing group. In at least one embodiment, each of $R^{16b}$, $R^{17b}$, and $R^{18b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19b}_3$, wherein each $R^{16b}$, $R^{17b}$, and $R^{18b}$ is independently optionally substituted by halogen, or two $R^{16b}$ radicals optionally bond to form a five- or six-membered ring, or two $R^{17b}$ radicals optionally bond to form a five- or six-membered ring, or two $R^{18b}$ radicals optionally bond to form a five- or six-membered ring. Each $R^{18b}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{18b}$ radicals optionally bond to form a five- or six-membered ring.

In at least one embodiment, $R^{19b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring.

In some embodiments each of $E^1$, $E^2$, and $E^3$ is independently carbon, nitrogen or phosphorus. In at least one embodiment, each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon.

In at least one embodiment, each of $X^{1b}$ and $X^{2b}$ is independently substituted hydrocarbyl, and the radicals $X^{1b}$ and $X^{2b}$ can be bonded with one another. In some embodiments, D is a neutral donor; and/or t is 0 to 2.

In at least one embodiment, each of $R^{1b}$ and $R^{2b}$ is independently $C_1$-$C_{22}$ alkyl or $C_6$-$C_{22}$ aryl wherein each of $R^{1b}$ and $R^{2b}$ is optionally substituted by halogen. One or more of $R^{1b}$ and $R^{2b}$ may be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl. In at least one embodiment, $R^{1b}$ and $R^{2b}$ are methyl.

In at least one embodiment, t is 0, in which case D is absent. In an alternate embodiment, D is a neutral donor such as a neutral Lewis base, such as, for example, amines, alcohols, ethers, ketones, aldehydes, esters, sulfides or phosphines, which can be bonded with the iron center or can still be contained in the complex as residual solvent from the preparation of the iron complexes.

In at least one embodiment, the catalyst compound represented by Formula (III) has an electron donating side. At least one of $R^{6b}$ or $R^{7b}$ is independently halogen, —$CF_3$, —$OR^{16b}$, —$NR^{17b}_2$, or —$SiR^{18b}_3$. For example, at least one of $R^{6b}$ or $R^{7b}$ can independently be selected from fluorine, chlorine, bromine, or iodine. $R^{8b}$, $R^{9b}$, and $R^{10b}$ can be independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, —$OR^{16b}$, —$NR^{17b}_2$, or —$SiR^{18b}_3$, halogen, or five-, six- or seven-membered heterocyclic ring including at least one atom selected from the group consisting of N, P, O and S; wherein $R^{8b}$, $R^{9b}$, and $R^{10b}$ are optionally substituted by halogen, —$OR^{16b}$, —$NR^{17b}_2$, or —$SiR^{18b}_3$.

In at least one embodiment, each of $R^{3b}$, $R^{4b}$, $R^{5b}$ is independently selected from hydrogen, methyl, ethyl, propyl, butyl, pentyl, hexyl, heptyl, octyl, nonyl, decyl, dimethyl-pentyl, tert-butyl, isopropyl, or isomers thereof, such as $R^{3b}$, $R^{4b}$, $R^{5b}$ are hydrogen.

In some embodiments, each of $R^{6b}$, $R^{7b}$, $R^{8b}$, $R^{9b}$, $R^{10b}$, $R^{11b}$, $R^{12b}$, $R^{13b}$, $R^{14b}$, and $R^{15b}$ can be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl, or isomers thereof. In at least one embodiment, each of $R^{8b}$, $R^{9b}$, $R^{10b}$, $R^{11b}$, $R^{12b}$, $R^{13b}$, $R^{14b}$, and $R^{15b}$ can be independently hydrogen.

In at least one embodiment, each instance of $X^{1b}$ and $X^{2b}$ is independently substituted hydrocarbyl, and the radicals $X^{1b}$ and $X^{2b}$ can be bonded with one another. For example, r can be 1 or 2, such as r can be 1. In another example, s can be 1 or 2, such as s can be 1. In at least one embodiment, r and s are the same. For example, each instance of $X^{1b}$ and $X^{2b}$ can be any suitable silane, such as (trialkylsilyl)$C_1$-$C_{20}$ alkyl-, such as (trialkylsilyl)$C_1$-$C_{10}$ alkyl-, such as (trialkylsilyl)$C_1$-$C_5$ alkyl-. In at least one embodiment, one or more $X^{1b}$ and $X^{2b}$ is independently selected from (trimethylsilyl) methyl-, (trimethylsilyl)methyl-, (trimethylsilyl)ethyl-, (trimethylsilyl)propyl-, (trimethylsilyl)butyl-, (trimethylsilyl)pentyl-, (trimethylsilyl)hexyl-, (trimethylsilyl)heptyl-, (trimethylsilyl)octyl-, (trimethylsilyl)nonyl-, (trimethylsilyl)decyl-, (triethylsilyl)methyl-, (triethylsilyl)methyl-, (triethylsilyl)ethyl-, (tri ethyl silyl)propyl (triethylsilyl)butyl (triethylsilyl)pentyl-, (triethylsilyl)hexyl-, (triethylsilyl)heptyl-, (triethylsilyl)octyl-, (triethylsilyl)nonyl-, (triethylsilyl) decyl-, (triisopropylsilyl)methyl-, (triisopropylsilyl)methyl-, (triisopropylsilyl)ethyl-, (triisopropylsilyl)propyl-, (triisopropylsilyl)butyl-, (triisopropylsilyl)pentyl-, (triisopropylsilyl)hexyl-, (triisopropylsilyl)heptyl-, (triisopropylsilyl)octyl-, (triisopropylsilyl)nonyl-, (triisopropylsilyl)decyl-, (t-$BuPh_2Si$)methyl-, (t-$BuPh_2Si$)methyl-, (t-$BuPh_2Si$)ethyl-, (t-$BuPh_2Si$)propyl-, (t-$BuPh_2Si$)butyl-, (t-$BuPh_2Si$)pentyl-, (triethylsilyl)hexyl-, (t-$BuPh_2Si$)heptyl-, (t-$BuPh_2Si$)octyl-, (t-$BuPh_2Si$)nonyl-, (t-$BuPh_2Si$)decyl-, or isomers thereof. For example, $X^1$ and $X^2$ can be (trimethylsilyl)methyl-.

In at least one embodiment, the catalyst compound represented by Formula (III) is one or more of:

1

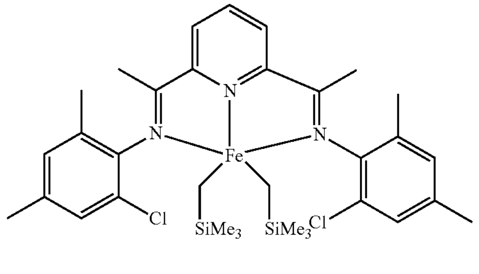

-continued
2
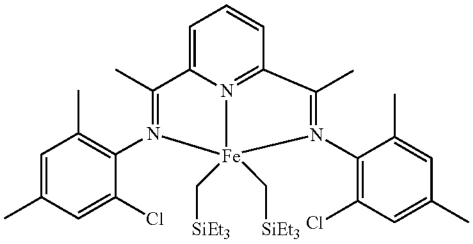
3
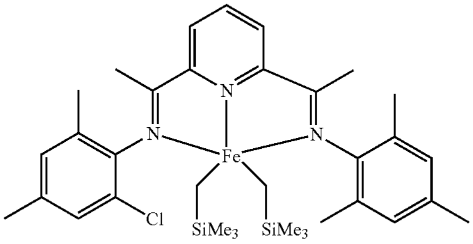
4
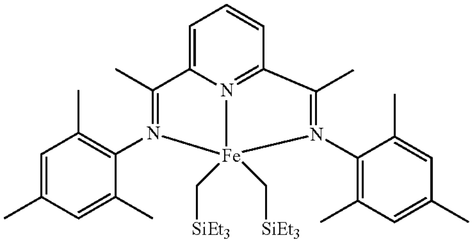
5
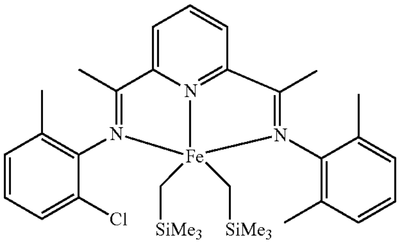
6
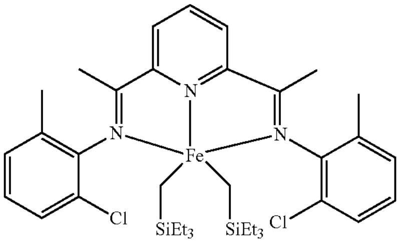
7
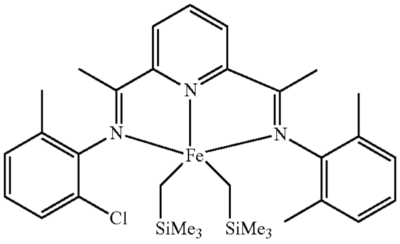
-continued
8
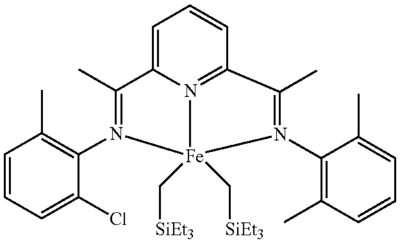
9
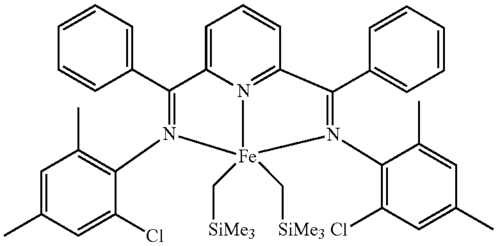
10
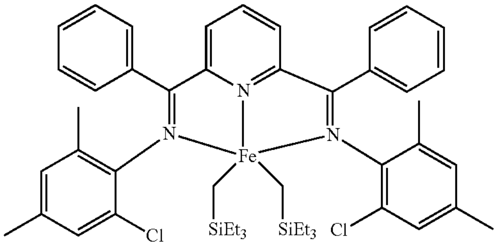
11
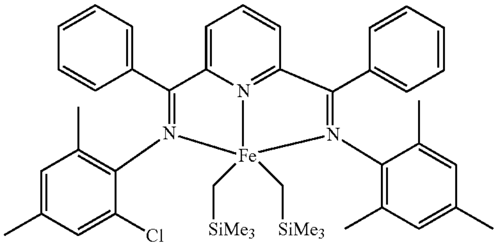
12
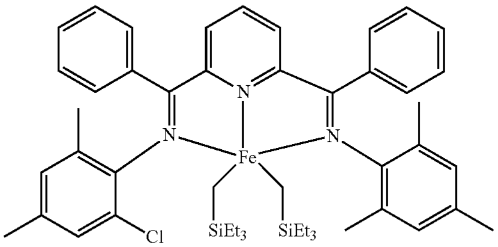
13
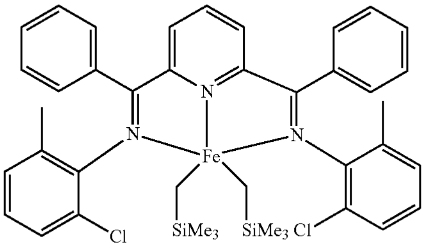

-continued
14
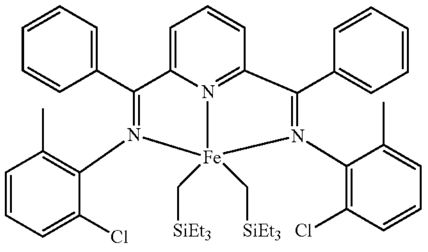
15
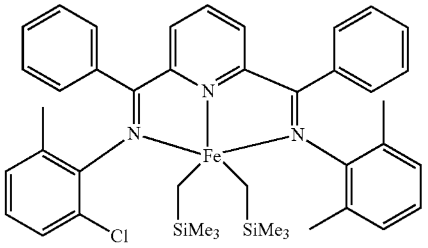
16
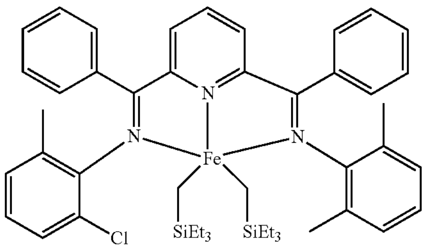
17
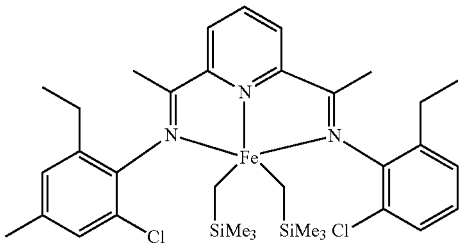
18
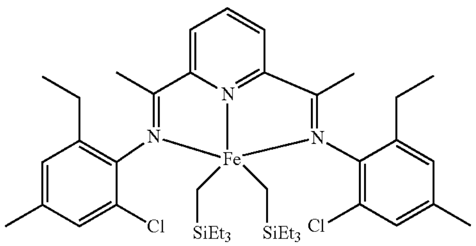
19
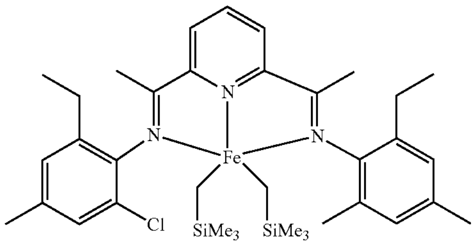
-continued
20
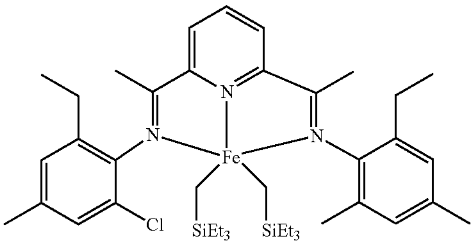
21
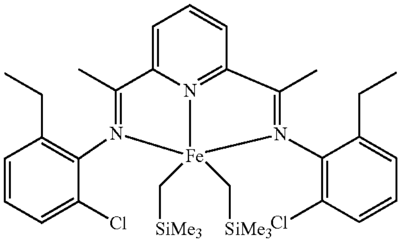
22
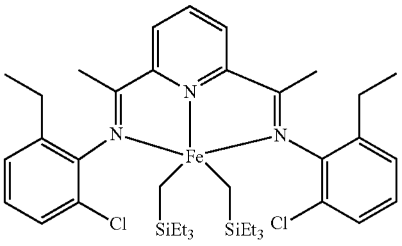
23
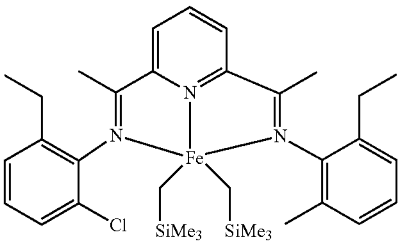
24
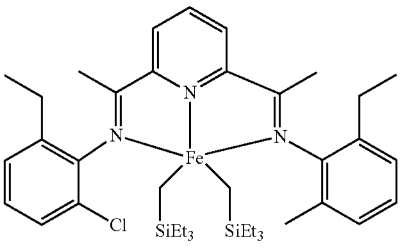
25
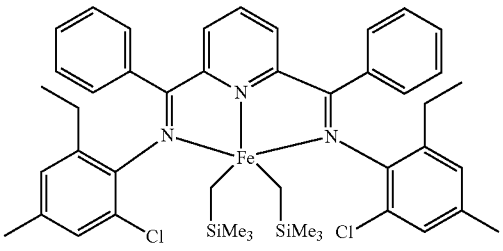

-continued
26
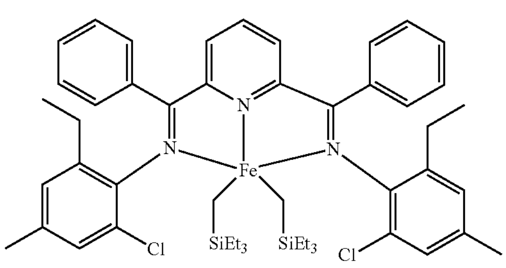
27
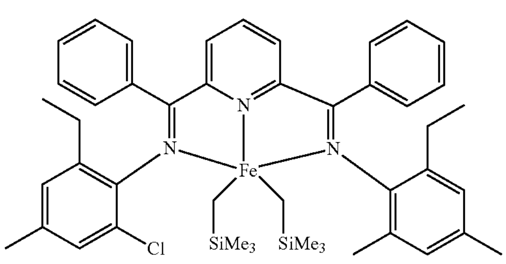
28
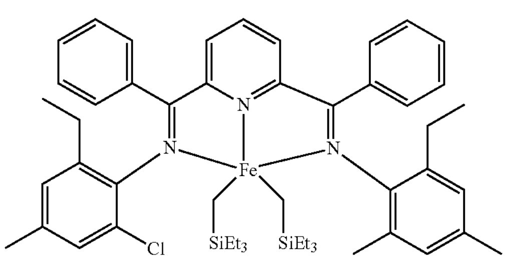
29
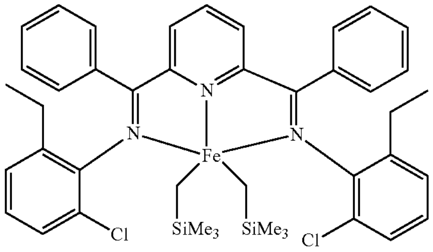
30
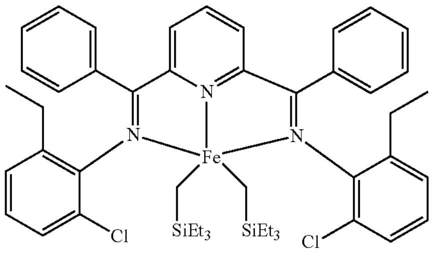
31
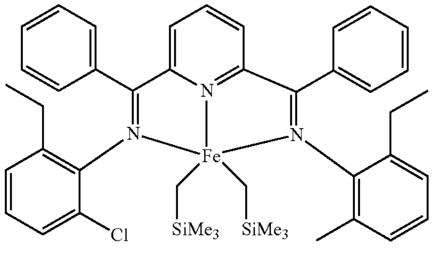
-continued
32
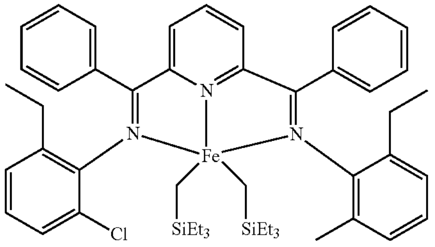
33
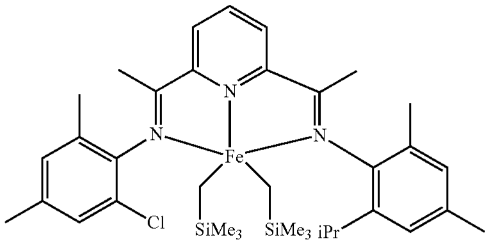
34
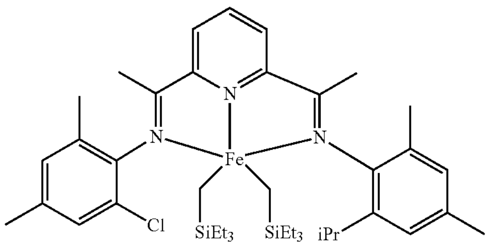
35
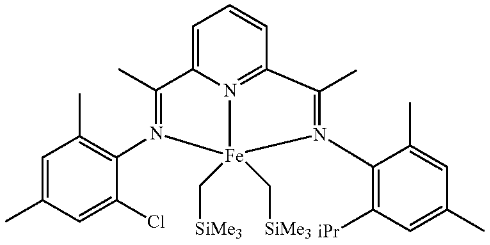
36
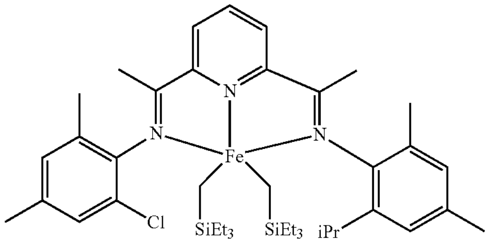
37
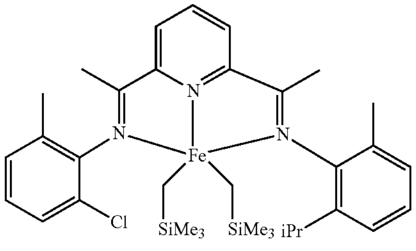

-continued
38
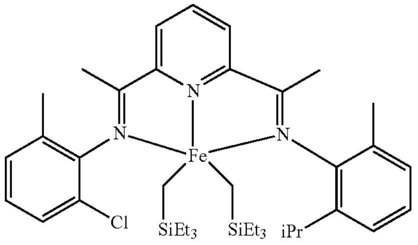
39
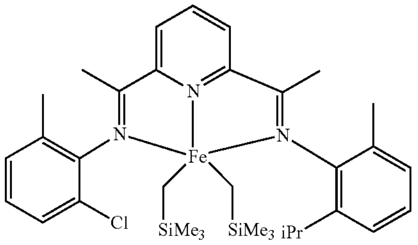
40
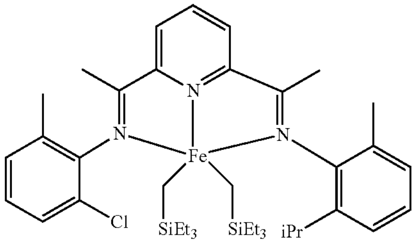
41
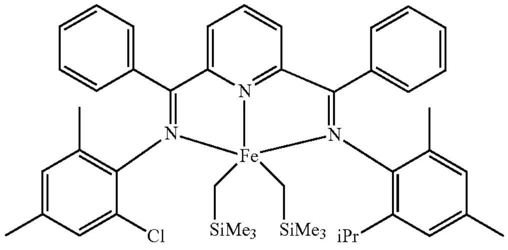
42
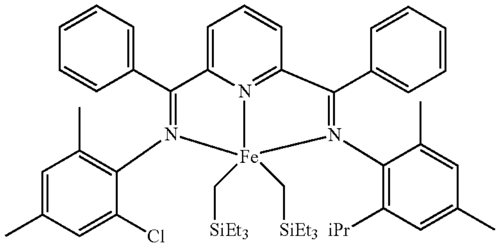
43
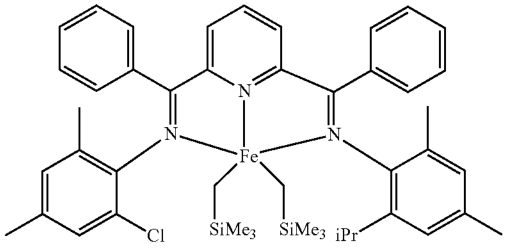
-continued
44
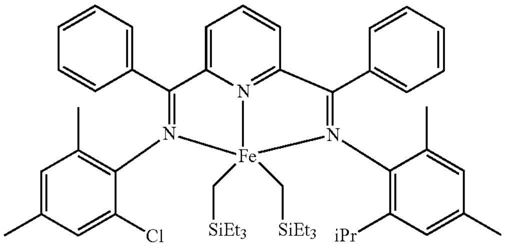
45
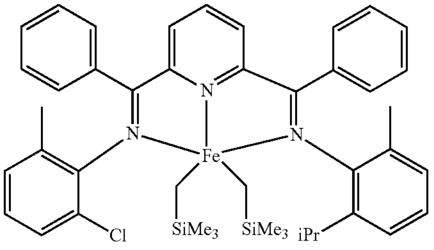
46
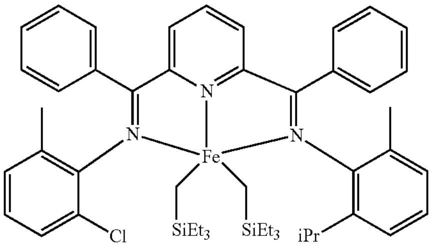
47
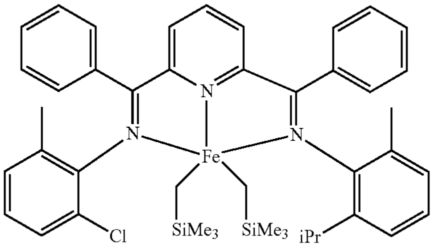
48
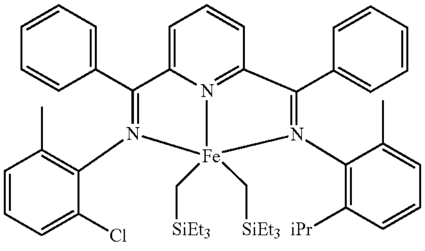
In at least one embodiment, the catalyst compound represented by Formula (III) is selected from:

1

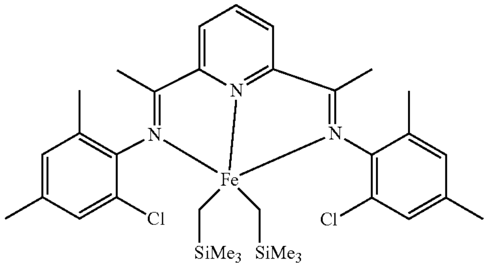

3

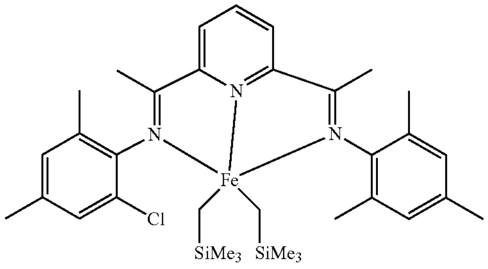

Support Material

In at least one embodiment of the present disclosure, the catalyst systems include the product of the combination of one or more support materials. In some embodiments, a support material is a porous support material, for example, talc, and inorganic oxides. Other support materials include zeolites, clays, organoclays, or any other organic or inorganic support material, or mixtures thereof. As used herein, "support" and "support material" are used interchangeably.

In at least one embodiment, a support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Exemplary support materials include $Al_2O_3$, $ZrO_2$, $SiO_2$, and combinations thereof, such as, $SiO_2$, $Al_2O_3$, or $SiO_2/Al_2O_3$.

A support material, such as an inorganic oxide, can have a surface area in the range of from about 10 $m^2/g$ to about 700 $m^2/g$, a pore volume in the range of from about 0.1 cc/g to about 4.0 cc/g, and an average particle size in the range of from about 5 μm to about 500 μm. For example, the surface area of a support material can be in the range of from about 50 $m^2/g$ to about 500 $m^2/g$, the pore volume can be in the range of from about 0.5 cc/g to about 3.5 cc/g, and the average particle size can be in the range of from about 10 μm to about 200 μm. For example, the surface area of a support material can be in the range of from about 100 $m^2/g$ to about 400 $m^2/g$, pore volume can be in the range of from about 0.8 cc/g to about 3.0 cc/g, and the average particle size can be in the range of from about 5 μm to about 100 μm. The average pore size of a support material useful in at least one embodiment of the present disclosure is in the range of from about 10 Å to 1,000 Å, such as from about 50 Å to about 500 Å, such as from about 75 Å to about 350 Å. In at least one embodiment, a support material is a high surface area, amorphous silica (surface area ≥300 $m^2$/gm, pore volume ≥1.65 $cm^3$/gm), and is marketed under the tradenames of DAVISON 952 or DAVISON 955 by the Davison Chemical Division of W. R. Grace and Company, are particularly useful. In other embodiments, DAVIDSON 948 is used.

In at least one embodiment of the present disclosure, a support material may be dry, that is, free of absorbed water. Drying of the support material can be achieved by heating or calcining at about 100° C. to about 1,000° C., such as at least about 600° C. When a support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material can have at least some reactive hydroxyl (OH) groups.

In several classes of embodiments, the above two catalysts (represented by Formula (I) and Formula (II)) described herein are generally deposited on a support material at a loading level of about 10-100 micromoles of metal per gram of solid support; alternatively about 20-80 micromoles of metal per gram of solid support; or about 40-60 micromoles of metal per gram of support. But greater or lesser values may be used provided that the total amount of solid complex does not exceed the support's pore volume.

Activator

The terms "cocatalyst" and "activator" are used herein interchangeably. The catalyst systems described herein can typically include a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Suitable activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g. a non-coordinating anion.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA. It is within the scope of this present disclosure to use an ionizing activator, neutral or ionic. It is also within the scope of this present disclosure to use neutral or ionic activators alone or in combination with alumoxane or modified alumoxane activators. For descriptions of useful activators please see U.S. Pat. Nos. 8,658,556 and 6,211,105. Suitable activators can include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, $[Me_3NH^+][B(C_6F_5)_4^-]$; 1-(4-(tris (pentafluorophenyl)borate)-2,3,5,6-tetrafluorophenyl) pyrrolidinium; and tetrakis(pentafluorophenyl)borate, 4-(tris (pentafluorophenyl)borate)-2,3,5,6-tetrafluoropyridine.

In at least one embodiment, the activator can include a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, and triphenylcarbenium tetrakis(3,5-bis (trifluoromethyl)phenyl)borate). In at least one embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthyl)borate, N,N-dimethyl-(2,4,6-trimethylanilinium) tetrakis (pentafluorophenyl)borate, trialkylammonium tetrakis-(2,3, 4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl) borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate, (where alkyl is methyl, ethyl, propyl, n-butyl, sec-butyl, or t-butyl).

In at least one embodiment, the activator can be represented by the formula:

$$(Z)_d^+(A^{d-})$$

wherein Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3, such as Z is $(Ar_3C^+)$, where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms (optionally with the proviso that in not more than 1 occurrence is Q a halide). Each Q can be a fluorinated hydrocarbyl group having 1 to 20 carbon atoms, such as a fluorinated aryl group, such as a pentafluoryl aryl group or perfluoronaphthyl group. Examples of suitable $A^{d-}$ also include diboron compounds as disclosed in U.S. Pat. No. 5,447,895, which is fully incorporated herein by reference.

When $Z_d^+$ is the activating cation $(L-H)_d^+$, it can be a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

Bulky activators are also useful herein as NCAs. "Bulky activator" as used herein refers to anionic activators represented by the formula:

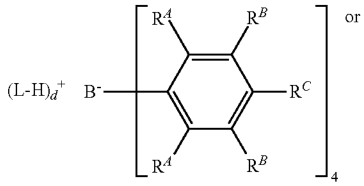

or

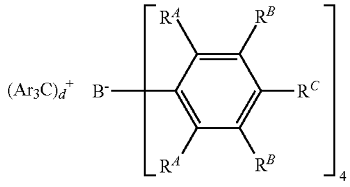

where:

each $R^A$ is independently a halide, such as a fluoride; Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics; each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group); each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

L is a Lewis base; $(L-H)^+$ is a Brønsted acid; d is 1, 2, or 3;

where the anion has a molecular weight of greater than about 1,020 g/mol; and where at least three of the substituents on the B atom each have a molecular volume of greater than about 250 cubic Å, alternatively greater than about 300 cubic Å, or alternatively greater than about 500 cubic Å. The anion can have a molecular weight of greater than about 700 g/mol, and at least three of the substituents on the boron atom each have a molecular volume of greater than about 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume. Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the table below of relative volumes. For fused rings, the Vs is decreased by 7.5% per fused ring. The Calculated Total MV of the anion is the sum of the MV per substituent, for example, the MV of perfluorophenyl is 183 Å3, and the Calculated Total MV for tetrakis(perfluorophenyl)borate is four times 183 Å3, or 732 Å3.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Suitable activator-to-catalyst ratio, e.g., all NCA activators-to-catalyst ratio can be about a 1:1 molar ratio. Alternatively, suitable ranges may include from about 0.1:1 to about 100:1, alternatively from about 0.5:1 to about 200:1, alternatively from about 1:1 to about 500:1 alternatively from about 1:1 to about 1000:1. For example, suitable range can be from about 0.5:1 to about 10:1, such as about 1:1 to about 5:1. It is also within the scope of the present disclosure that the catalyst compounds can be combined with combinations of alumoxanes and NCA's (see for example, U.S. Pat. Nos. 5,153,157; 5,453,410; EP 0573120; WO 1994/007928; and WO 1995/014044 (the disclosures of which are incorporated herein by reference in their entirety) which discuss the use of an alumoxane in combination with an ionizing activator). Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this present disclsoure may be found at page 72, paragraph [00177] to page 74, paragraph [00178] of WO 2004/046214.

Alumoxane Activators

Alumoxane activators can be utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylalumoxane as described in U.S. Pat. Nos. 9,340,630; 8,404,880; and 8,975,209.

When the activator is an alumoxane (modified or unmodified), at least one embodiment selects the maximum amount of activator typically at up to about a 5,000-fold molar excess Al/M over the catalyst compound (per metal catalytic site). The minimum activator-to-catalyst-compound is about a 1:1 molar ratio. Alternative suitable ranges include from about 1:1 to about 500:1, alternatively from 1:1 to 200:1, alternatively from about 1:1 to about 100:1, or alternatively from about 1:1 to about 50:1. In an alternative embodiment, little or no alumoxane is used in the polymerization processes described herein. For example, alumoxane is present at about zero mole %, alternatively the alumoxane is present at a molar ratio of aluminum to catalyst compound transition metal less than about 500:1, such as less than about 300:1, such as less than about 100:1, such as less than about 1:1.

Optional Scavengers, Co-Activators, Chain Transfer Agents

In addition to the activators, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butylaluminum, diisobutylaluminum hydride, or combinations thereof.

In at least one embodiment, the catalyst systems can additionally comprise one or more scavenging compounds. Here, the term "scavenger" means a compound that removes polar impurities from the reaction environment. These impurities adversely affect catalyst activity and stability. For example, the scavenging compound will be an organometallic compound such as the Group-13 organometallic compounds of U.S. Pat. Nos. 5,153,157; 5,241,025; and WO 1991/009882; WO 1994/003506; WO 1993/014132; and that of WO 1995/007941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, and bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$). Exemplary aluminum scavengers can include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In at least one aspect, aluminum containing scavengers can be represented by the formula $((R_z—Al—)_yO—)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain transfer agents may be used in the compositions and/or processes described herein. Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl, octyl or an isomer thereof) or a combination thereof, such as diethyl zinc, methylalumoxane, trimethylaluminum, triisobutylaluminum, trioctylaluminum, or a combination thereof.

Catalyst Component Solution (the "Trim Solution")

The catalyst component solution may include only catalyst compound(s), such as a metallocene and/or an iron catalyst, or may include an activator. In at least one embodiment, the catalyst compound(s) in the catalyst component solution is unsupported. The catalyst solution used in the trim process can be prepared by dissolving the catalyst compound and optional activators in a liquid solvent. The liquid solvent may be an alkane, such as a $C_5$ to $C_{30}$ alkane, or a $C_5$ to $C_{10}$ alkane. Cyclic alkanes such as cyclohexane and aromatic compounds such as toluene may also be used. Mineral oil may be used as a solvent alternatively or in addition to other alkanes such as a $C_5$ to $C_{30}$ alkane. In various embodiments, the catalyst compound is present in the solution 5 wt %, such as from about 0.01 wt % to about 5 wt %, such as from about 0.05 wt % to about 1 wt % or from about 0.3 wt % to about 1.2 wt %, based upon the weight of the solvent and the activator or catalyst compound. If the catalyst component solution includes both activator and catalyst compound, the ratio of metal in the activator to metal in the catalyst compound in the solution may be 1000:1 to 0.5:1, 300:1 to 1:1, or 150:1 to 1:1. The catalyst component solution can include any one of the catalyst compound(s) of the present disclosure.

Preparation of Mixed Catalyst Systems

The above two catalyst types can be combined to form a mixed catalyst system. The two or more catalysts can be added together in a desired ratio when combined, contacted with an activator, or contacted with a support material or a supported activator. The catalyst compounds may be added to the mixture sequentially or simultaneously. The molar ratio of a catalyst represented by Formula (I) to a catalyst represented by Formula (II) can vary depending on the balance of processability versus physical characteristics of the desired polymer. For example, the molar ratio (I):(II) can range from about 20:1 to about 1:1 or from about 1:1 to about 20:1, such as from about 1:1 to about 5:1, such as from about 1:1 to about 3:1, or from about 0.6:0.4 to about 0.8:0.2, or from about 0.6:0.4 to about 0.9:0.2, or from about 0.7:0.2 to about 0.8:0.2.

Other procedures for combining the catalysts are possible, such as addition of a first catalyst compound to a slurry including a support or a supported activator mixture for a specified reaction time, followed by the addition of the second catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first catalyst compound.

The mixed catalyst system may be formed by combining a first catalyst compound (for example a catalyst compound useful for producing a first polymer attribute, such as a high molecular weight polymer fraction) with a support and activator, desirably in a first diluent such as an alkane or toluene, to produce a supported, activated catalyst compound. The mixed catalyst system thus produced may be a supported and activated first catalyst compound in a slurry, the slurry comprising mineral or silicon oil, with a second catalyst compound that is not supported and not combined with additional activator, where the second catalyst compound may or may not be partially or completely soluble in the slurry. In at least one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at about 23° C. and above, and can have a molecular weight of at least 300 amu to 500 amu or more, and a viscosity at 40° C. of from about 40 cSt to about 300 cSt or greater, or from about 50 cSt to about 200 cSt in a particular embodiment. The term "mineral oil" includes synthetic oils or liquid polymers, polybutenes, refined naphthenic hydrocarbons, and refined paraffins, such as disclosed in *Blue Book* 2001, *Materials, Compounding Ingredients, Machinery and Services for Rubber,* 189 247 (J. H. Lippincott, D. R. Smith, K. Kish & B. Gordon eds. Lippincott & Peto Inc. 2001). Exemplary mineral and silicon oils are those that exclude moieties that are reactive with metallocene catalysts, examples of which include hydroxyl and carboxyl groups. The diluent may comprise a blend of a mineral, silicon oil, and/or a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from about 5 wt % to about 99 wt % mineral oil. In at least one embodiment, the diluent may consist essentially of mineral oil.

In at least one embodiment, the first catalyst compound is combined with an activator and a first diluent to form a catalyst slurry that is then combined with a support material. Until such contact is made, the support particles might not be previously activated. The first catalyst compound can be in any desirable form such as a dry powder, suspension in a diluent, solution in a diluent, liquid, etc. The catalyst slurry and support particles are then mixed thoroughly, in at least one embodiment at an elevated temperature, so that both the first catalyst compound and the activator are deposited on the support particles to form a support slurry. After the first catalyst compound and activator are deposited on the support, a second catalyst compound may then be combined with the supported first catalyst compound, wherein the second is combined with a diluent comprising mineral or silicon oil by any suitable means either before, simultaneous to, or after contacting the second catalyst compound with the supported first catalyst compound. In at least one embodiment, the first catalyst compound is isolated from the first diluent to a dry state before combining with the second catalyst compound. In at least one embodiment, the second catalyst compound is not activated, that is, not combined with any activator, before being combined with the supported first catalyst compound. The resulting solids slurry (including both the supported first and second catalyst compounds) is then mixed thoroughly at an elevated temperature.

A wide range of mixing temperatures may be used at various stages of making the mixed catalyst system. For example, in a specific embodiment, when the first catalyst compound and at least one activator, such as methylalumoxane, are combined with a first diluent to form a mixture, the mixture is heated to a first temperature of from about 25° C. to about 150° C., such as from about 50° C. to about 125° C., such as from about 75° C. to about 100° C., such as from about 80° C. to about 100° C. and stirred for a period of time from about 30 seconds to about 12 hours, such as from about 1 minute to about 6 hours, such as from about 10 minutes to about 4 hours, such as from about 30 minutes to about 3 hours.

Next, that mixture is combined with a support material to provide a first support slurry. The support material can be heated, or dehydrated if desired, prior to combining. In at least one embodiment, the first support slurry is mixed at a temperature greater than about 50° C., such as greater than about 70° C., such as greater than about 80° C., such as greater than about 85° C., for a period of time from about 30 seconds to about 12 hours, such as from about 1 minute to about 6 hours, such as from about 10 minutes to about 4 hours, such as from about 30 minutes to about 3 hours. For example, the support slurry is mixed for a time sufficient to provide a collection of activated support particles that have the first catalyst compound deposited thereto. The first diluent can then be removed from the first support slurry to provide a dried supported first catalyst compound. For example, the first diluent can be removed under vacuum or by nitrogen purge. Next, the second catalyst compound is combined with the activated first catalyst compound in the presence of a diluent comprising mineral or silicon oil in at least one embodiment. For example, the second catalyst compound can be added in a molar ratio to the first catalyst compound in the range from about 20:1 to about 1:1 or from about 1:1 to about 20:1, such as from about 1:1 to about 5:1, such as from about 1:1 to about 3:1, or from about 0.6:0.4 to about 0.8:0.2, or from about 0.6:0.4 to about 0.9:0.2, or from about 0.7:0.2 to about 0.8:0.2. The resultant slurry (or first support slurry) can be heated to a first temperature from about 25° C. to about 150° C., such as from about 50° C. to about 125° C., such as from about 75° C. to about 100° C., such as from about 80° C. to about 100° C. and stirred for a period of time from about 30 seconds to about 12 hours, such as from about 1 minute to about 6 hours, such as from about 10 minutes to about 4 hours, such as from about 30 minutes to about 3 hours.

The first diluent is an aromatic or alkane, such as hydrocarbon diluent having a boiling point of less than about 200° C. such as toluene, xylene, hexane, etc., may be removed from the supported first catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in some embodiments, may take any physical form such as a free flowing solid. For example, the mixed catalyst system may range from about 1 wt % to about 99 wt % solids content by weight of the mixed catalyst system (mineral oil, support, all catalyst compounds and activator(s)) in at least one embodiment. The catalyst compound may be the first or second compound, such as the second compound.

Surprisingly, it has been found that bis-imino pyridine (BIP) iron chlorides react with silicas, likely through hydrogen bonding with the iron chlorides to pull all of the iron complex out of toluene slurry into the silica, yielding blue colored silicas with no residue. All of the iron complex can enter the pores of the silica despite poor solubility of the iron catalyst precursors. Activation of the complex can be achieved by treating these silicas with MAO, wherein an activated iron species is produced. A mixed catalyst system can then be produced by the subsequent addition of the second catalyst precursor. When the second catalyst precursor is added, there is no residual unreacted BIP iron catalyst agglomerates.

Polymerization

In some embodiments herein, the present disclosure provides polymerization processes where monomer (such as ethylene), and, optionally, comonomer (such as hexene), are contacted with a catalyst system comprising a catalyst compound represented by Formula (I), a catalyst compound represented by Formula (II), an activator, and an optional support material as described above. The polymerization may further include adding a catalyst compound represented by Formula (I), Formula (II), or Formula (III) as a trim catalyst.

In at least one embodiment, a dual catalyst system is present in a reactor system, and a molar ratio of a first catalyst to a second catalyst of the catalyst system is from 99:1 to 1:99, such as from 90:10 to 10:90, such as from 90:10 to 75:25, such as from 85:15 to 50:50, such as from 80:20 to 50:50, such as from 75:25 to 50:50, such as from 60:40 to 40:60. The second catalyst can be added to a polymerization process as a trim catalyst to adjust the molar ratio of first catalyst to second catalyst. For example, after the second catalyst is added as a trim catalyst, a molar ratio of first catalyst to second catalyst can be from about 90:10 to about 10:90, such as from about 90:10 to about 75:25, such as from about 85:15 to about 50:50, such as from about 80:20 to about 50:50, such as from about 75:25 to about 50:50, such as from about 60:40 to about 40:60.

The first catalyst can be added to a polymerization process as a trim catalyst to adjust the molar ratio of first catalyst to second catalyst. For example, after the first catalyst is added as a trim catalyst, a molar ratio of first catalyst to second catalyst can be from about 90:10 to about 10:90, such as from about 90:10 to about 75:25, such as from about 85:15 to about 50:50, such as from about 80:20 to about 50:50, such as from about 75:25 to about 50:50, such as from about 60:40 to about 40:60.

A third catalyst can be added to a polymerization as a trim catalyst. For example, after the third catalyst is added as a trim catalyst, a molar ratio of second catalyst to third catalyst can be from about 99:1 to about 1:99, such as from about 95:5 to about 5:95, such as from about 80:20 to 20:80, such as from about 75:25 to about 25:75, such as from about 70:30 to about 30:70, such as from about 60:40 to about 40:60. After the third catalyst is added as a trim catalyst, a molar ratio of first catalyst to third catalyst can be from about 90:10 to about 10:90, such as from about 80:20 to about 20:80, such as from about 75:25 to about 25:75, such as from about 70:30 to about 30:70, such as from about 60:40 to about 40:60.

Some or all of the first catalyst and/or second catalyst may be fed as a trim catalyst into the catalyst slurry (e.g., in-line/on-line) having the first catalyst en route to the polymerization reactor. The trim catalyst may be added to the polymerization process by combining the trim catalyst solution with the supported catalyst slurry to form a final catalyst composition. The catalyst component slurry and solution can be mixed in-line. For example, the solution and slurry may be mixed by utilizing a static mixer or an agitating vessel. The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 30 seconds to about 60 minutes, about 1 to about 40 minutes, or about 5 to about 30 minutes.

In at least one embodiment, alpha-olefins suitable for use as starting material in the preparation of the LLDPE can be one or more substituted or unsubstituted $C_2$ to $C_{40}$ alpha-olefins, such as $C_2$-$C_{32}$ alpha-olefins, such as $C_4$-$C_{32}$ alpha-olefins, such as $C_6$-$C_{30}$ alpha-olefins, such as $C_6$-$C_{24}$ alpha-olefins, such as $C_6$-$C_{18}$ alpha-olefins, $C_6$ to $C_{16}$ alpha-olefins, $C_6$-$C_{12}$ alpha-olefins, or a combination thereof. In at least one embodiment, the $C_2$ to $C_{40}$ alpha-olefins may be linear, branched, or cyclic. The $C_2$ to $C_{40}$ cyclic olefins may be strained or unstrained, monocyclic or polycyclic, and may, optionally, include heteroatoms and/or one or more functional groups. Non-limiting examples of alpha-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, branched chain isomers such as 4-methyl-1-pentene, norbornene, norbornadiene, dicyclopentadiene, cyclopentene, cycloheptene, cyclooctene, cyclooctadiene, cyclododecene, 7-oxanorbomene, 7-oxanorbomadiene, 5-cyclooctadiene, 1-hydroxy-4-cyclooctene, 1-acetoxy-4-cyclooctene, 5-methylcyclopentene, dicyclopentadiene, substituted derivatives thereof, and isomers thereof, and a combination thereof.

Polyethylene compositions of the present disclosure can be made by any polymerization process such as those referred to as gas phase processes, slurry process, and/or solution processes, and any of these can be combined in serial reactor processes. For example, a polymerization process is a solution polymerization process, and the process can take place in two reactors in series where the reactants, such as ethylene, the catalyst precursor, and activator are kept under solution polymerization conditions. For example, polymerizations can be carried out in one or more single-phase, liquid-filled, stirred tank reactors with continuous flow of feeds to the system and continuous withdrawal of products under steady state conditions. When more than one reactor is used, the reactors can be operated in a serial configuration. Advantageously, the reactors produce polymers with different properties, such as different molecular weights, or different monomer compositions, or different levels of long-chain branching, or any combinations thereof due to the use of different catalysts and/or other polymerization conditions in each reactor.

In at least one embodiment, one or more dienes are present in the polymer produced herein at up to about 10 wt %, such as at about 0.00001 to about 1.0 wt %, such as about 0.002 to about 0.5 wt %, such as about 0.003 to about 0.2 wt % based upon the total weight of the composition. In at least one embodiment, about 500 ppm or less of diene is added to the polymerization, such as about 400 ppm or less, such as or about 300 ppm or less. In other embodiments, at least about 50 ppm of diene is added to the polymerization, or about 100 ppm or more, or about 150 ppm or more. In at least one embodiment, a diolefin monomer includes any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). It is further exemplary that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly exemplary dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Exemplary cyclic dienes include cyclopentadiene, vinylnorbomene, norbornadiene, ethylidene norbomene, divinylbenzene, dicyclopentadiene or higher ring containing diolefins with or without substituents at various ring positions. In at least one embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. For example, the non-conjugated diene can be selected from $C_7$ to $C_{30}$ cyclic non-conjugated dienes.

In at least one embodiment, dienes are absent from the polymerization process, that is, they are not purposefully combined with the ethylene, propylene, and catalyst components in any stage of the process.

In at least one embodiment, a process provides polymerization of ethylene and at least one comonomer having from 3 to 8 carbon atoms, such as 4 to 8 carbon atoms. Particularly, the comonomers can be propylene, 1-butene, 4-methyl-1-pentene, 3-methyl pentene, 1-hexene and 1-octene, for example 1-hexene, 1-butene, 1-octene, and a combination thereof. In at least one embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and a combination thereof.

Polymerizations can be performed in a system with a solvent comprising any one or more of $C_4$ to $C_{12}$ alkanes and/or the olefin monomers, using soluble (soluble in carrier solvent or in reactor solvent) metallocene catalysts or other single-site catalysts and discrete, non-coordinating borate anions as co-catalysts. Suitable diluents/solvents for polymerization include non-coordinating, non-reactive liquids. Examples include straight and branched-chain hydrocarbons, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such as aromatics are present in the solvent at less than about 1 wt %, such as less than about 0.5 wt %, such as less than about 0.1 wt % based upon the weight of the solvents. A homogeneous dilute solution of, for example, tri-n-octyl aluminum in a suitable solvent, may be used as a scavenger in concentrations appropriate to maintain reaction. Chain transfer agents, such as hydrogen, can be added to control molecular weight. Polymerizations can be at high temperatures and high conversions to maximize macromer re-insertions that create long chain branching, if so desired.

Suitable polymerizations can be run at any temperature and/or pressure suitable to obtain the desired ethylene polymers. Suitable temperatures and/or pressures may include a temperature in the range of from about 0° C. to about 300° C., such as about 20° C. to about 200° C., such as about 35° C. to about 150° C., such as from about 40° C. to about 120° C., such as from about 45° C. to about 80° C.; and/or a pressure in the range of from about 0.35 MPa to about 10 MPa, such as from about 0.45 MPa to about 6 MPa, such as from about 0.5 MPa to about 4 MPa. In at least one embodiment, the reactor temperature is greater than about 100° C., or about 105° C., or about 110° C., or within a range from about 100° C., or about 105° C., or about 110° C. to about 130° C., or about 140° C., or about 150° C., or about 160° C. This combination of a homogeneous, continuous, solution process helps to ensure that the polymer products have narrow composition and sequence distributions. In at least one embodiment hydrogen is present in the polymerization reactor at a partial pressure of about 0.001 to about 50 psig (about 0.007 to about 345 kPa), such as from about 0.01 to about 25 psig (about 0.07 to about 172 kPa), such as about 0.1 to about 10 psig (about 0.7 to about 70 kPa).

In at least one embodiment, little or no alumoxane is used in the process to produce the polymers. Alumoxane can be present at about zero mol %, alternatively the alumoxane can be present at a molar ratio of aluminum to transition metal less than about 500:1, such as less than about 300:1, such as less than about 100:1, such as less than about 1:1. In at least one embodiment, little or no scavenger is used in the process to produce the ethylene polymer. For example, scavenger (such as trialkyl aluminum) can be present at zero mol %, alternatively the scavenger can be present at a molar ratio of scavenger metal to transition metal of less than about 100:1, such as less than about 50:1, such as less than about 15:1, such as less than about 10:1.

In at least one embodiment, the polymerization: 1) is conducted at temperatures of about 0 to about 300° C. (such as about 25 to about 150° C., such as about 40 to about 120° C., such as about 100° C. or greater); 2) is conducted at a pressure of about atmospheric pressure to about 10 MPa (such as about 0.35 to about 10 MPa, such as from about 0.45 to about 6 MPa, such as from about 0.5 to about 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics (such as toluene) can be present in the solvent at less than 1 wt %, such as less than 0.5 wt %, such as at 0 wt % based upon the weight of the solvents); 4) wherein the catalyst system includes a alumoxane activator; 5) the polymerization occurs in one reaction zone; and/or 6) optionally scavengers (such as trialkyl aluminum compounds) are absent (e.g., present at zero mol %, alternatively the scavenger is present at a molar ratio of scavenger metal to transition metal of less than about 100:1, such as less than about 50:1, such as less than about 15:1, such as less than about 10:1); and/or 7) optionally hydrogen is present in the polymerization reactor at a partial pressure of about 0.001 to about 50 psig (about 0.007 to about 345 kPa) (such as from about 0.01 to about 25 psig (about 0.07 to about 172 kPa), such as about 0.1 to about 10 psig (about 0.7 to about 70 kPa)).

In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is about 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

In at least one embodiment of a polymerization process, the catalyst precursor and activator are combined under suitable conditions, with ethylene, and optionally other comonomers, to produce a LLDPE.

The reactor(s) can be maintained at a pressure in excess of the vapor pressure of the reactant mixture to keep the reactants in the liquid phase. In this manner the reactors can be operated liquid-full in a homogeneous single phase. Ethylene, as well as the optional $C_4$ to $C_{40}$ α-olefins and/or dienes, such as $C_3$ to $C_{12}$ α-olefins and/or dienes) can be combined into one stream and then mixed with a solvent stream. A solution of, for example, a tri-n-octyl aluminum scavenger in any suitable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In at least one embodiment, cooled isothermal reactors can be used that do not require feed chilling. A reaction mixture (catalyst system+monomer(s), and which may include trim catalyst) in a reactor may be stirred by any suitable means to provide thorough mixing over a broad range of solution viscosities. Flow rates can be set to maintain an average residence time in a reactor of from about 10 minutes to about 30 minutes, or from about 10 minutes to about 45 minutes. On exiting the reactor, the polymer mixture may be subjected to quenching, a series of concentration steps, heat and vacuum stripping and pelletization. Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The LLDPE can be recovered from the effluent of either the second polymerization stage by separating the polymer from other constituents of the effluent using any suitable separation. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be blended with polyolefin(s). If in situ blends are desired, the removal of solvent takes place after intimate mixing with the solution or slurry phase polyolefin.

The lean phase, e.g., the residual hexene and condensing agents such as isobutene and isopentane, and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise internally unsaturated olefins which are difficult to polymerize can gradually build up in the lean phase and recycle streams. Any adverse effects on the polymerization activity may be mitigated by removing these olefins from the recycle stream and/or encouraging their incorporation in the polymer, favored by high polymerization temperatures.

In at least one embodiment, a LLDPE can be produced in an industrial scale process. For example, the catalyst productivity can be about 20,000 kg polymer per kg of catalyst or more, such as about 40,000 kg polymer per kg of catalyst or more.

Polymerization Products

The present disclosure further provides for compositions that can be produced by the methods of the present disclosure. In at least one embodiment, a process described herein produces ethylene homopolymers or ethylene copolymers, such as ethylene-alpha-olefin (such as $C_3$ to $C_{40}$, such as a $C_3$-$C_{20}$ alpha-olefin, such as $C_3$ to $C_{12}$ alpha-olefin, such as propylene, butene, hexene, octene, decene, dodecene, such as propylene, butene, hexene, octene) copolymers (such as ethylene-butene copolymers, ethylene-hexene and/or ethylene-octene copolymers).

In at least one embodiment, the LLDPE can have an ethylene content of about 75 wt % or greater, such as from about 78 wt % to about 99.9 wt %, such as from about 83 wt % to about 99.5 wt %, such as from about 88 wt % to about 99 wt %, such as from about 90 wt % to about 98 wt %, such as from about 92 wt % to about 97 wt %, such as from about 93 wt % to about 96 wt %, such as from about 94 wt % to about 95 wt %, such as from about 92 wt % to about 98 wt %, when measured according to GPC-IR5-LS-VIS. In some embodiments, the ethylene content can be from about 65 wt % or more, such as from about 90 wt % to about 96 wt %. In at least one embodiment, the LLDPE can have a comonomer content of about 25 wt % or less, such as from about 0.1 wt % to about 22 wt %, such as from about 0.5 wt % to about 17 wt %, such as from about 1 wt % to about 12 wt %, such as from about 2 wt % to about 10 wt %, such as from about 3 wt % to about 8 wt %, such as from about 4 wt % to about 7 wt %, such as from about 5 wt % to about 6 wt %, when measured according to GPC-IR5-LS-VIS. In some embodiments, the comonomer content can be about 35 wt % or less, such as from about 4 wt % to about 10 wt %.

In some embodiments, the LLDPE can have a number average molecular weight (Mn) of from about 10,000 g/mol to about 30,000 g/mol, such as from about 12,000 g/mol to about 28,000 g/mol, such as from about 15,000 g/mol to about 25,000 g/mol, when measured according to GPC-IR5-LS-VIS. In at least one embodiment, the LLDPE can have a weight average molecular weight (Mw) of from about 80,000 g/mol to about 200,000 g/mol, such as from about 90,000 g/mol to about 170,000 g/mol, such as from about 100,000 g/mol to about 150,000 g/mol, when measured according to GPC-IR5-LS-VIS. In at least one embodiment, the LLDPE can have a z-average molecular weight (Mz) of from about 220,000 g/mol to about 380,000 g/mol, such as from about 250,000 g/mol to about 350,000 g/mol, such as from about 275,000 g/mol to about 325,000 g/mol, as determined by GPC-IR5-LS-VIS.

In some embodiments, the LLDPE can have a molecular weight distribution (MWD), defined as Mw/Mn, of from about 2 to about 12, such as from about 2.5 to about 11, such as from about 3 to about 10, such as from about 4 to about 9, such as from about 5 to about 8, when measured according to GPC-IR5-LS-VIS.

The LLDPE may have a g'vis of about 1.1 or less, such as from about 0.90 to about 1.1, such as from about 0.91 to about 1.0, such as from about 0.92 to about 0.99, such as from about 0.93 to about 0.98, such as from about 0.94 to about 0.97, such as from about 0.95 to about 0.96 when measured according to GPC-IR5-LS-VIS.

In at least one embodiment, the LLDPE can have a melt index (MI, $I_2$) of from about 0.15 g/10 min to about 1.35 g/10 min, such as from about 0.3 g/10 min to about 1.3 g/10 min, such as from about 0.5 g/10 min to about 1.25 g/10 min, as measured according to ASTM D1238 (190° C., 2.16 kg load). In at least one embodiment, the LLDPE can have a HLMI/MI ratio of from about 15 to about 35, such as from about 17 to about 30, such as from about 19 to about 26, as determined by ASTM D1238 (190° C.).

In at least one embodiment, the LLDPE can have a gradient density of from about 0.91 g/cm$^3$ to about 0.94 g/cm$^3$, such as from about 0.919 g/cm$^3$ to about 0.935 g/cm$^3$, such as from about 0.92 g/cm$^3$ to about 0.93 g/cm$^3$. The gradient density is determined by density-gradient column method according to ASTM D1505. Details of specimen conditioning and testing is described in Test Methods section.

Blends

In at least one embodiment, the LLDPE produced herein can be combined with one or more additional polymers prior to being formed into a film, molded part or other article. The one or more additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1esters, polyacetal, polyvinylidine fluoride, polyethylene glycols, and/or polyisobutylene.

In at least one embodiment, the LLDPE can be present in the above blends, at from about 10 wt % to about 99 wt %, based upon the weight of the polymers in the blend, such as about 20 wt % to about 95 wt %, such as at least about 30 wt % to about 90 wt %, such as at least about 40 wt % to about 90 wt %, such as at least about 50 wt % to about 90 wt %, such as at least about 60 wt % to about 90 wt %, such as at least about 70 wt % to about 90 wt %.

The blends described above may be produced by mixing a polyethylene composition of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

The LLDPE (and/or blends thereof) of the present disclosure can be used in monolayer films or multilayer films. These films may be formed by any suitable extrusion or coextrusion technique. Films may be unoriented, uniaxially oriented, or biaxially oriented. Physical properties of the film may vary depending on the film forming techniques used. One or more of the foregoing polymers, such as the foregoing blends thereof, may be used in a variety of end-use applications, such as mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a composition layer can be extrusion coated or laminated onto an oriented composition layer or both composition layers can be coextruded together into a film and then oriented. Likewise, oriented composition could be laminated to oriented composition or oriented composition could be coated onto polypropylene or polyethylene (or vice versa) then optionally the combination could be oriented even further. In at least one embodiment, one or more layers may be modified by corona treatment, electron beam irradiation, gamma irradiation, flame treatment, or microwave. In at least one embodiment, one or both of the surface layers is modified by corona treatment.

Films of the present disclosure include any suitable film structure and film application. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any suitable technique, such as for example, techniques utilized to prepare blown, extruded, and/or cast stretch and/or shrink films (including shrink-on-shrink applications).

In at least one embodiment, multilayer films (or multiple-layer films) may be formed by any suitable method. The total thickness of multilayer films may vary based upon the application desired. A total film thickness of about 5 μm-100 μm, more typically about 10 μm-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In at least one embodiment the multilayer films are composed of five to 11 layers.

To facilitate discussion of different film structures, the following notation is used herein. Each layer of a film is denoted "A" or "B". Where a film includes more than one A layer or more than one B layer, one or more prime symbols (', ", '", etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of about 100 (dimensionless) indicated numerically and separated by slashes; e.g., the relative thickness of an A/B/A' film having A and A' layers of about 10 μm each and a B layer of about 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'"; (d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"/B'", B/A/B'/B"/B'", B/B'/A/B"/B'", B/B'/B"/B'"/B""; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

The films can further be embossed, or produced or processed according to other known film processes. The films can be tailored to specific applications by adjusting the thickness, materials and order of the various layers, as well as the additives in or modifiers applied to each layer.

Film Properties

In some embodiments, the films are oriented in the Machine Direction (MD) at a draw down ratio of up to about 25 and a blow up ratio of 2.5 was used. The films may vary in thickness depending on the intended application; however, films of a thickness from about 1 μm to about 150 μm are usually suitable, such as from about 10 μm to about 150 μm. Films intended for packaging are usually from about 10 μm to about 70 μm thick and often consisted of co-extruded multilayers.

In at least one embodiment, a film of the present disclosure can have an average of MD and TD 1% secant modulus from about 42,000 psi to about 65,000 psi, such as from about 42,000 psi to about 63,500 psi, such as from about 42,000 psi to about 62,000 psi, such as from about 42,500 psi to about 60,000 psi.

In at least one embodiment, a film of the present disclosure can have 1% Secant Modulus in the Machine Direction (MD), according to ASTM D882-18 (25.4 mm width strip) from about 37,000 psi to about 57,000 psi, such as from about 39,000 psi to about 55,000 psi, such as from about 41,000 psi to about 54,000 psi, such as from about 42,000 psi to about 53,000 psi. In at least one embodiment, a film of the present disclosure can have an average 1% Secant Modulus in the Transverse Direction (TD), according to ASTM D882-18 (25.4 mm width strip) from about 40,000 psi to about 72,000 psi, such as from about 42,000 psi to about 70,000 psi, such as from about 44,000 psi to about 68,000 psi, such as from about 46,000 psi to about 66,000 psi.

In at least one embodiment, a film of the present disclosure can have a Dart Drop Impact Strength (or Impact Failure or Dart F50 or Dart Drop Impact), grams per mil (g/mil), in accordance with ASTM D1709. A film of the present disclosure can have a Dart Drop Impact of from about 400 g/mil to about 1,000 g/mil, such as from about 500 g/mil to about 900 g/mil, such as from about 550 g/mil to about 850 g/mil, such as from about 600 g/mil to about 800 g/mil, such as from about 700 g/mil to about 750 g/mil.

In at least one embodiment, a film of the present disclosure can have a haze, in accordance with ASTM D1003-13, of from about 7% to about 30%, such as from about 10% to about 28%, such as from about 11% to about 26%, such as from about 12% to about 24%. In some embodiments, the haze can be 30% or more.

In at least one embodiment, a film of the present disclosure can have an Elmendorf Tear value (MD), in accordance with ASTM D-1922 (with conditioning for 40 hours at 23° C.±2° C. and 50%±10% relative humidity), of from about 100 g/mil to about 300 g/mil, such as from about 110 g/mil to about 280 g/mil, such as from about 120 g/mil to about 240 g/mil, such as from about 140 g/mil to about 200 g/mil. In at least one embodiment, a film of the present disclosure can have an Elmendorf Tear value (TD), in accordance with ASTM D-1922 (with conditioning for 40 hours at 23° C.±2° C. and 50%±10% relative humidity), of from about 360 g/mil to about 700 g/mil, such as from about 390 g/mil to about 670 g/mil, such as from about 420 g/mil to about 640 g/mil, such as from about 450 g/mil to about 610 g/mil.

In at least one embodiment, a film of the present disclosure can have a puncture peak force of from about 7 lbs/mil to about 14 lbs/mil, such as from about 8 lbs/mil to about 13 lbs/mil, such as from about 9 lbs/mil to about 12 lbs/mil. Puncture peak force is determined by a modified ASTM D5748 (ASTM probe was used with two 0.25 mil HDPE slip sheets; machine model" United SFM-1; testing speed: 10 in/min).

In at least one embodiment, a film of the present disclosure can have a puncture break energy of from about 17 in-lbs/mil to about 40 in-lbs/mil, such as from about 19 in-lbs/mil to about 36 in-lbs/mil, such as from about 21 in-lbs/mil to about 33 in-lbs/mil. Puncture peak force is determined by a modified ASTM D5748 (ASTM probe was used with two 0.25 mil HDPE slip sheets; machine model" United SFM-1; testing speed: 10 in/min).

Stretch Films

Compositions of the present disclosure may be utilized to prepare stretch films. Stretch films can be used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

Compositions of the present disclosure may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646. Industrial shrink films can be used for bundling articles on pallets. Typical industrial shrink films are formed in a single bubble blown extrusion process to a thickness of about 80 to 200

μm, and provide shrinkage in two directions, typically at a machine direction (MD) to transverse direction (TD) ratio of about 60:40. Retail films can be used for packaging and/or bundling articles for consumer use, such as, for example, in supermarket goods. Such films are typically formed in a single bubble blown extrusion process to a thickness of about 35 μm to 80 μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein may have a sharp shrinking point when subjected to heat from a heat gun at a high heat setting, which indicates that they may be especially suited for use as the inner layer in a variety of shrink-on-shrink applications.

Greenhouse Films

Compositions of the present disclosure may be utilized to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Other Example Applications

Bags

Compositions of the present disclosure may be utilized to prepare bags. Bags include those bag structures and bag applications known to those skilled in the art. Exemplary bags include shipping sacks, trash bags and liners, industrial liners, produce bags, and heavy duty bags.

Packaging

Compositions of the present disclosure may be utilized to prepare packaging. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

Compositions of the present disclosure may be used in suitable blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers. In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process can be performed to provide any suitable design having a hollow shape, including bottles, tanks, toys, household goods, automobile parts, and other hollow containers and/or parts.

Blow molding processes may include extrusion and/or injection blow molding. Extrusion blow molding is typically suited for formation of items having a comparatively heavy weight, such as greater than 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

Compositions of the present disclosure may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit. Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Compositions of the present disclosure may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetic attributes of the non-polymer substrate. In this process, the substrate is typically fed from a roll into a molten polymer as the polymer is extruded from a slot die, which is similar to a cast film process. The resultant structure is cooled, typically with a chill roll or rolls, and formed into finished rolls. Extrusion coating materials can be used in, for example, food and non-food packaging, pharmaceutical packaging, and manufacturing of goods for the construction (insulation elements) and photographic industries (paper).

Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising composition(s) of the present disclosure. Such devices include, for example, electronic cables, computer and computer-related equipment, marine cables, power cables, telecommunications cables or data transmission cables, and combined power/telecommunications cables.

Electrical devices can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Rotomolded Products

Also provided are rotomolded products including one or more layers formed of or comprising composition(s) of the present disclosure. Rotomolding or rotational molding involves adding an amount of material to a mold, heating and slowly rotating the mold so that the softened material coats the walls of the mold. The mold continues to rotate at all times during the heating phase, thus maintaining even thickness throughout the part and preventing any deformation during the cooling phase. Examples of rotomolded products include but are not limited to furniture, toys, tanks, road signs tornado shelters, containers including United Nations-approved containers for the transportation of nuclear fissile materials.

EMBODIMENTS LISTING

The present disclosure provides, among others, the following embodiments, each of which may be considered as optionally including any alternate embodiments.

Clause 1. A process for producing a polyethylene composition, comprising:

introducing, under first polymerization conditions, ethylene and a $C_3$-$C_{40}$ alpha-olefin to a catalyst system in a reactor, the catalyst system comprising a first catalyst compound, a second catalyst compound, and an activator; and forming a polyethylene composition, the first catalyst compound being represented by Formula (I)

(I)

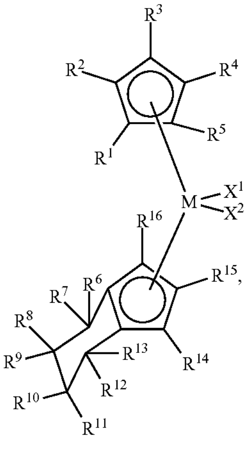

wherein:

M is Ti, Hf, or Zr;

each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;

each of $R^1$, $R^2$, $R^3$, $R^4$, $R^5$, $R^6$, $R^{14}$, $R^{15}$, and $R^{16}$ is independently selected from hydrogen, halogen, $C_1$-$C_{40}$ hydrocarbyl, substituted $C_1$-$C_{40}$ hydrocarbyl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ join together to form a $C_4$ to $C_{62}$ cyclic or polycyclic ring structure;

each of $R^7$, $R^8$, $R^9$, $R^{10}$, $R^{11}$, $R^{12}$, $R^{13}$ is independently selected from hydrogen, halogen, C hydrocarbyl, substituted C hydrocarbyl, aryl, substituted aryl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^7$ and $R^8$, $R^8$ and $R_{10}$, and $R^{10}$ and $R^{12}$ are joined to form a saturated ring, unsaturated ring, substituted saturated ring, or substituted unsaturated ring;

and the second catalyst compound being represented by Formula (IIa) or Formula (IIb):

(IIa)

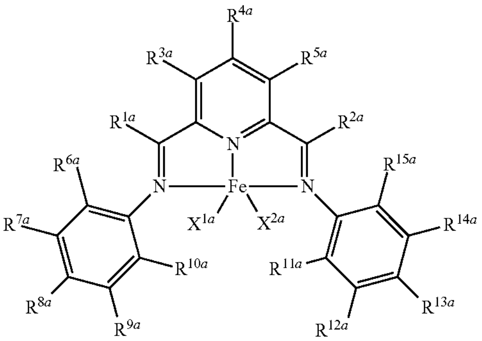

or (IIb)

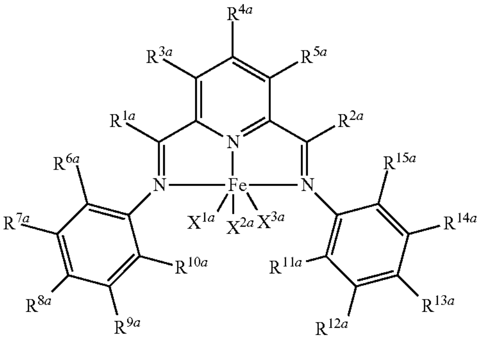

wherein:

each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), NR'$_2$, —OR', —SiR"$_3$ or five-, six- or seven-membered heterocyclyl comprising at least one atom selected from N, P, O and S;

each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'$_2$, —OR' or —SiR"$_3$, wherein $R^{1a}$ optionally bonds with $R^{1a}$, and $R^{2a}$ optionally bonds with $R^{5a}$, in each case to independently form a five-, six- or seven-membered ring;

each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from N, P, O and S; and each of $X^{1a}$ and $X^{2a}$ is independently hydrogen, halogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —SO$_3$R', —OC(O)R', —CN, —SCN, β-diketonate, —CO, —BF$_4$, —PF$_6$ or bulky non-coordinating anion, or $X^{1a}$ and $X^{2a}$ optionally bond to form a five- or six-membered ring.

Clause 2. The process of Clause 1, further comprising introducing, under second polymerization conditions, a third catalyst compound to the reactor, the third catalyst compound being represented by Formula (I), Formula (IIIa), or Formula (IIIb):

(IIIa)

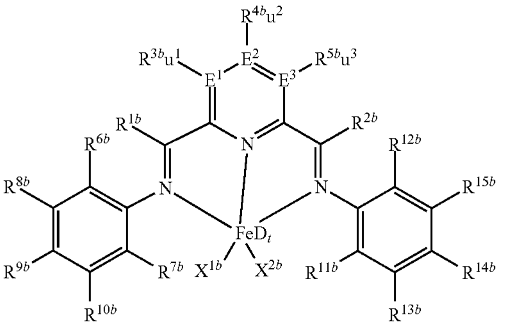

or (IIIb)

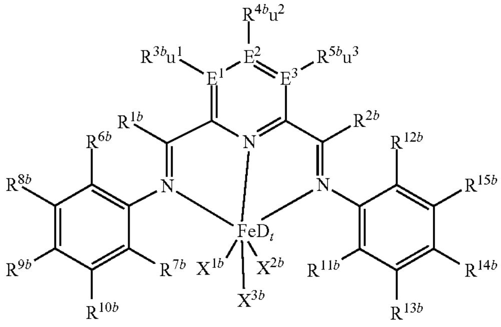

wherein:

each of $R^{1b}$, $R^{2b}$, $R^{3b}$, $R^{4b}$, $R^{5b}$, $R^{8b}$, $R^{9b}$, $R^{10}$, $R^{13b}$, $R^{14b}$, and $R^{15b}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —OR$^{16b}$, —NR$^{17b}{}_2$, halogen, —SiR$^{18b}{}_3$ or five-, six- or seven-membered heterocyclic ring comprising at least one atom selected from the group consisting of N, P, O and S;

each of $R^{6b}$, $R^{7b}$, $R^{11b}$, and $R^{12b}$ is independently $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —OR$^{16b}$, —NR$^{17b}{}_2$, halogen, —SiR$^{18b}{}_3$ or five-, six- or seven-membered heterocyclic ring comprising at least one atom selected from the group consisting of N, P, O and S;

each of $R^{16b}$, $R^{17b}$, and $R^{18b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —SiR$^{19b}{}_3$, wherein each $R^{16b}$, $R^{17b}$, and $R^{18b}$ is independently optionally substituted by halogen, or two $R^{16b}$ radicals optionally bond to form a five- or six-membered ring, or two $R^{17b}$ radicals optionally bond to form a five- or six-membered ring, or two $R^{18b}$ radicals optionally bond to form a five- or six-membered ring;

each $R^{19b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;

each of $X^{1b}$ and $X^{2b}$ is independently substituted hydrocarbyl, and the radicals $X^{1b}$ and $X^{2b}$ can be bonded with one another;

D is a neutral donor; and t is 0 to 2.

Clause 3. The process of Clause 2, wherein the third catalyst compound is

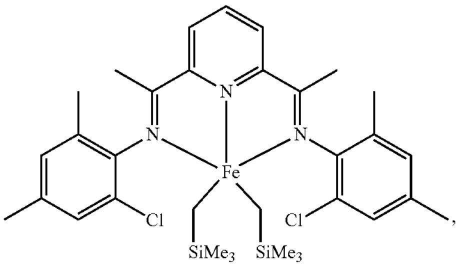

,

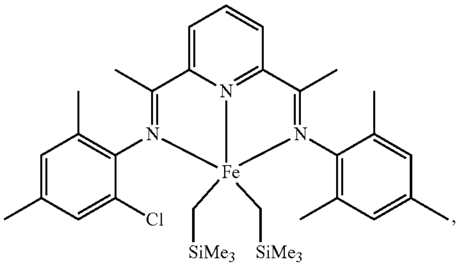

,

-continued

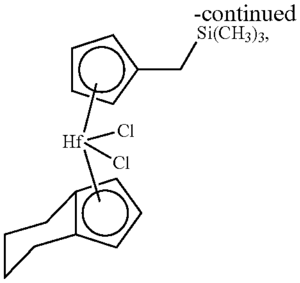

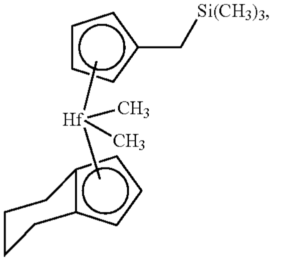

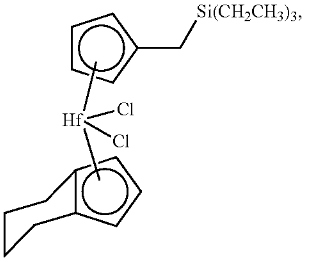

or

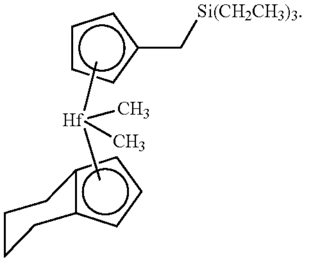

Clause 4. The process of Clause 2 or Clause 3, wherein a molar ratio of second catalyst to third catalyst can be from 95:5 to 5:95, from 80:20 to 20:80, from 70:30 to 30:70, from 60:40 to 40:60.

Clause 5. The process of any one of Clauses 1-4, wherein each of $X^1$ and $X^2$ is independently hydrogen or halogen.

Clause 6. The process of any one of Clauses 1-5, wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and $R^{16}$ is independently is independently hydrogen, halide, alkoxide, $C_1$ to $C_{12}$ substituted or unsubstituted hydrocarbyl, or —R"—SiR'$_3$ or —R"—CR'$_3$ where R" is $C_1$ to $C_4$ hydrocarbyl.

Clause 7. The process of any one of Clauses 1-6, wherein M is hafnium.

Clause 8. The process of any one of Clauses 1-7, wherein the first catalyst compound is one or more of:

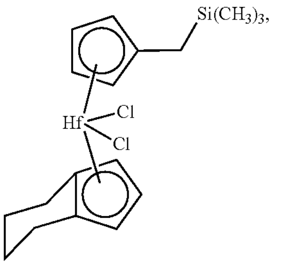

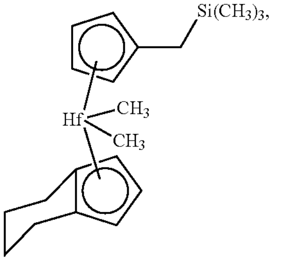

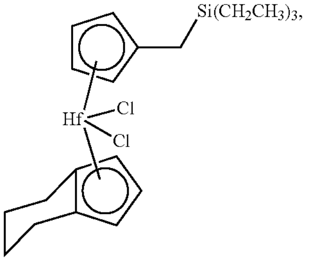

or

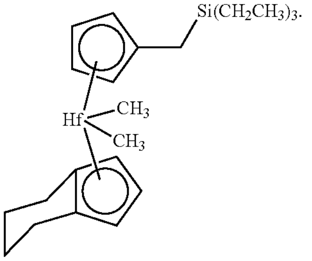

Clause 9. The process of any one of Clauses 1-8, wherein the first catalyst compound is

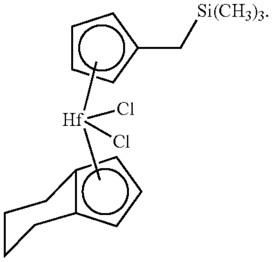

Clause 10. The process of any one of Clauses 1-9, wherein:

each of $X^{1a}$ and $X^{2a}$ is independently halogen; and each of $R^{6a}$ and $R^{15a}$ is independently halogen.

Clause 11. The process of any one of Clauses 1-10, wherein:

each of $R^{1a}$ and $R^{2a}$ is independently $C_1$-$C_{20}$ hydrocarbyl;

each of $R^{3a}$, $R^{4a}$, and $R^{5a}$ is independently hydrogen;

each of $R^{8a}$, $R^{10a}$, $R^{11a}$ and $R^{13a}$ is $C_1$-$C_{20}$ hydrocarbyl;

each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —$NR'_2$, —OR', —$SiR''_3$ or five-, six- or seven-membered heterocycle comprising at least one atom selected from the group consisting of N, P, O and S;

R' is optionally substituted by halogen, or two R' radicals bond to form a five- or six-membered ring; and each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

Clause 12. The process of claim 1, wherein the second catalyst compound is one or more of:

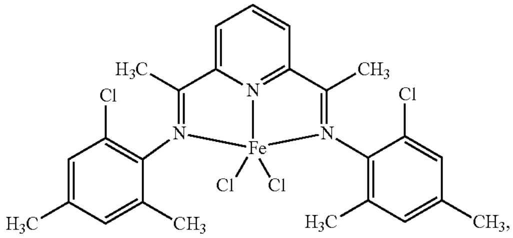

,

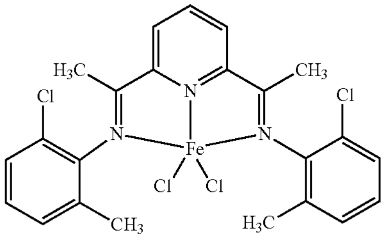

,

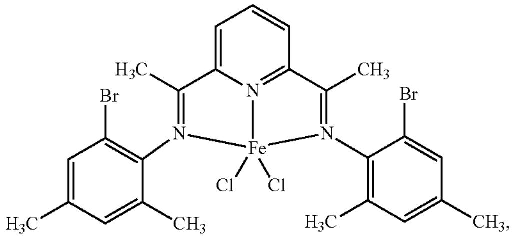

,

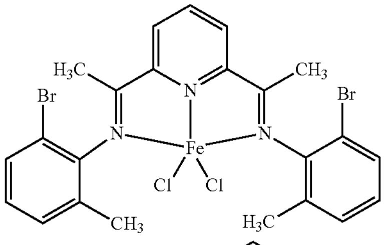

, or

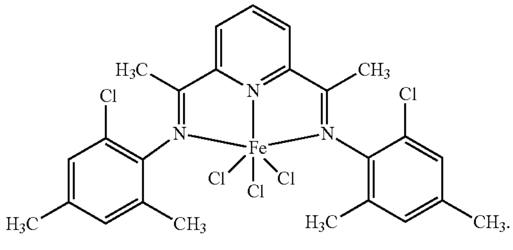

.

Clause 13. The process of any one of Clauses 1-12, wherein the second catalyst compound is

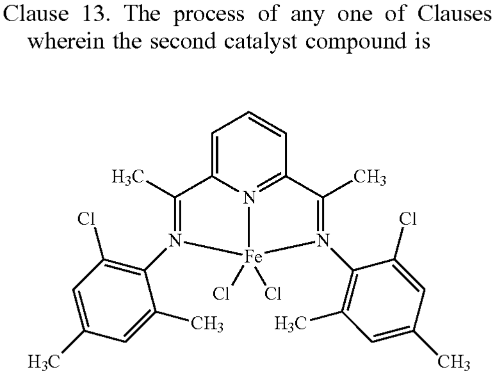

or

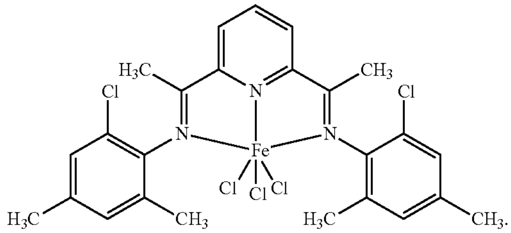

.

Clause 14. The process of any one of Clauses 1-13, wherein a molar ratio of first catalyst compound to second catalyst compound is from 1:1 to 5:1, or from 0.6:0.4 to 0.9:0.2.

Clause 15. The process of any one of Clauses 1-14, wherein the activator is one or more alumoxanes.

Clause 16. The process of any one of Clauses 1-15, wherein the activator is methylalumoxane (MAO), modified methylalumoxane (MMAO), ethylalumoxane, isobutylalumoxane, or a combination thereof.

Clause 17. The process of any one of Clauses 1-16, wherein the activator is methylalumoxane (MAO).

Clause 18. A film, comprising:

a polyethylene composition, comprising:

ethylene and a $C_3$-$C_{40}$ olefin comonomer, the polyethylene composition having at least 75 wt % ethylene content and from 0 wt % to 25 wt % of a $C_3$-$C_{40}$ olefin comonomer content based upon the total weight of the composition as determined by GPC-IR5-LS-VIS, the film having:

an average of MD and TD 1% secant modulus of 42,000 psi or greater as determined by ASTM D-882, and a Dart Drop Impact of greater than 400 g/mil, as determined by ASTM D1709.

Clause 19. The film of Clause 18, wherein the ethylene content is 75 wt % or more based upon the total weight of the polyethylene composition, as determined by GPC-IR5-LS-VIS.

Clause 20. The film of Clause 18 or Clause 19, wherein the $C_3$-$C_{40}$ olefin comonomer is propylene, 1-butene, 4-methyl-1-pentene, 3-methyl-1-pentene, 1-hexene, 1-octene, or a combination thereof.

Clause 21. The film of any one of Clauses 18-20, wherein the $C_3$-$C_{40}$ olefin comonomer is 1-hexene.

Clause 22. The film of any one of Clauses 18-21, wherein the average of MD and TD 1% secant modulus is from 42,000 psi to 65,000 psi, as determined by ASTM D882.

Clause 23. The film of any one of Clauses 18-22, wherein the polyethylene composition has a melt index ($I_2$) of from 0.15 g/10 min to 1.35 g/10 min.

Clause 24. The film of any one of Clauses 18-23, wherein the polyethylene composition has a melt index ratio (121/12) of 15 to 36, wherein 121 and 12 are determined by ASTM D1238.

Clause 25. The film of any one of Clauses 18-24, wherein the polyethylene composition has a density of from 0.919 $g/cm^3$ to 0.935 $g/cm^3$, as determined by ASTM D1505.

Clause 26. The film of any one of Clauses 18-25, wherein the polyethylene composition has a g' vis of from 0.9 to 1.0, as determined by GPC-IR5-LS-VIS.

Clause 27. The film of any one of Clauses 18-26, wherein the polyethylene composition has a weight average molecular weight (Mw) of from 80,000 g/mol to 200,000 g/mol, as determined by GPC-IR5-LS-VIS.

Clause 28. The film of any one of Clauses 18-27, wherein the polyethylene composition has a number average molecular weight (Mn) of from 10,000 g/mol to 30,000 g/mol, as determined by GPC-IR5-LS-VIS.

Clause 29. The film of any one of Clauses 18-28, wherein the polyethylene composition has a z-average molecular weight (Mz) of from 220,000 g/mol to 500,000 g/mol, as determined by GPC-IR5-LS-VIS.

Clause 30. The film of any one of Clauses 18-29, wherein the polyethylene composition has a molecular weight distribution (Mw/Mn) of from 2 to 11, as determined by GPC-IR5-LS-VIS.

31. The film of Clause 18, wherein:

the average of MD and TD 1% secant modulus of the film is from 42,000 psi to 65,000 psi, as determined by ASTM D882; and the polyethylene composition has:

a melt index ($I_2$) of from 0.15 g/10 min to 1.35 g/10 min;

a melt index ratio ($I_{21}/I_2$) of 15 to 36, wherein $I_{21}$ and $I_2$ are determined by ASTM D1238;

a density of from 0.919 $g/cm^3$ to 0.935 $g/cm^3$, as determined by ASTM D1505;

a $g'_{vis}$ of from 0.9 to 1.0, as determined by GPC-IR5-LS-VIS; a weight average molecular weight (Mw) of from 80,000 g/mol to 200,000 g/mol, as determined by GPC-IR5-LS-VIS;

a number average molecular weight (Mn) of from 10,000 g/mol to 30,000 g/mol, as determined by GPC-IR5-LS-VIS;

a z-average molecular weight (Mz) of from 220,000 g/mol to 500,000 g/mol, as determined by GPC-IR5-LS-VIS; and a molecular weight distribution (Mw/Mn) of from 2 to 11, as determined by GPC-IR5-LS-VIS.

Clause 32. The film of any one of Clauses 18-31, wherein the film has one or more of the following properties:

a haze of from 7% to 30%, as determined by ASTM D1003;

an Elmendorf Tear value (MD) of from 100 g/mil to 300 g/mil, as determined by ASTM D-1922 (with conditioning for 40 hours at 23° C.±2° C. and 50%±10% relative humidity); or an Elmendorf Tear value (TD) of from 360 g/mil to 700 g/mil, as determined by ASTM D-1922 (with conditioning for 40 hours at 23° C.±2° C. and 50%±10% relative humidity).

Clause 33. A film, comprising:

a polyethylene composition, comprising:

ethylene and a $C_3$-$C_{40}$ olefin comonomer, the polyethylene composition having at least 75 wt % ethylene content and from 0 wt % to 25 wt % of a $C_3$-$C_{40}$ olefin comonomer content based upon the total weight of the composition as determined by GPC-IR5-LS-VIS, the film having:

an average of MD and TD 1% secant modulus of 42,000 psi to 65,000 psi as determined by ASTM D-882, a Dart Drop Impact of greater than 400 g/mil, as determined by ASTM D1709, a haze of from 7% to 30%, as determined by ASTM D1003, an Elmendorf Tear value (MD) of from 100 g/mil to 300 g/mil, as determined by ASTM D-1922 (with conditioning for 40 hours at 23° C.±2° C. and 50%±10% relative humidity), and an Elmendorf Tear value (TD) of from 360 g/mil to 700 g/mil, as determined by ASTM D-1922 (with conditioning for 40 hours at 23° C.±2° C. and 50%±10% relative humidity).

Clause 34. The film of Clause 33, wherein the polyethylene composition has one or more of the following properties:

a melt index ($I_2$) of from 0.15 g/10 min to 1.35 g/10 min as determined by ASTM D1238, a melt index ratio ($I_{21}/I_2$) of 15 to 36, wherein 121 and 12 are determined by ASTM D1238, a density of from 0.919 $g/cm^3$ to 0.935 $g/cm^3$, as determined by ASTM D1505, a $g'_{vis}$ of from 0.9 to 1.0, as determined by GPC-IR5-LS-VIS, a weight average molecular weight (Mw) of from 80,000 g/mol to 200,000 g/mol, as determined by GPC-IR5-LS-VIS, a number average molecular weight (Mn) of from 10,000 g/mol to 30,000 g/mol, as determined by GPC-IR5-LS-VIS, a z-average molecular weight (Mz) of from 220,000 g/mol to 500,000 g/mol, as determined by GPC-IR5-LS-VIS, or a molecular weight distribution (Mw/Mn) of from 2 to 11, as determined by GPC-IR5-LS-VIS.

Test Methods

A. Resin Analysis

Melt Index (MI, also referred to as $I_2$) is measured according to ASTM D1238 at 190° C., under a load of 2.16 kg unless otherwise noted. The units for MI are g/10 min or dg/min. High Load Melt Index (HLMI, also referred to as $I_{21}$) is the melt flow rate measured according to ASTM D-1238 at 190° C., under a load of 21.6 kg. The units for HLMI are g/10 min or dg/min. Melt Index Ratio (MIR) is the ratio of the high load melt index to the melt index, or $I_{21}/I_2$. Density is measured by density-gradient column, as described in ASTM D1505, on a compression-molded specimen that has been cooled to room temperature following ASTM D4703-10a, Procedure C, then conditioned under ASTM D618-08 (23°±2° C. and 50±10% Relative Humidity) for 40 hours before testing.

Gel Permeation Chromatography (GPC)

While the GPC in the CFC analysis also generated the distributions and the moments of molecular weight, for the purposes of the claims, the distributions and the moments of molecular weight (Mw, Mn, Mw/Mn, etc.), the comonomer content ($C_2$, $C_3$, $C_6$, etc.) and the branching index (g'vis) from GPC-IR5-LS-VIS was used.

GPC-IR5-LS-VIS is a high temperature Gel Permeation Chromatography (Polymer Char GPC-IR) equipped with a multiple-channel band-filter based Infrared detector IR5, an 18-angle Wyatt Dwan Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-mn Teflon filter and degassed with an online degasser before entering the GPC instrument. The nominal flow rate is 1.0 ml/min and the nominal injection volume is 200 μL. The whole system including transfer lines, columns, and viscometer detector are contained in ovens maintained at 145° C. The polymer sample is weighed and sealed in a standard vial with 80-4 flow marker (Heptane) added to it. After loading the vial in the autosampler, polymer is automatically dissolved in the instrument with 8 ml added TCB solvent. The polymer is dissolved at 160° C. with continuous shaking for about 2 hour. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{ps}=0.67$ and $K_{PS}=0.000175$ while $\alpha$ and K are for other materials as calculated and published in literature (Sun, T. et al. *Macromolecules* 2001, v.34, pg. 6812), specifically, $\alpha=0.695$ and $K=0.000579$ for linear ethylene polymers, $\alpha=0.705$ and $K=0.0002288$ for linear propylene polymers. Concentrations are expressed in g/cm3, molecular weight is expressed in g/mole, and intrinsic viscosity (hence K in the Mark-Mark-Houwink equation) is expressed in dL/g unless otherwise noted. Here the concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyl number per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end.

The LS molecular weight (M) at each point in the chromatogram is determined by analyzing the LS output using the Zimm model for static light scattering $$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing PE polymers, dn/dc=0.1048 ml/mg and $A_2$=0.0015.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^{\alpha}},$$

where $M_V$ is the viscosity-average molecular weight based on molecular weights determined by LS analysis and the K and $\alpha$ are for the reference linear polymer, which are, for purposes of the present disclosure, $\alpha$ and K are the same as described above for linear polyethylene polymers.

TREF-IR5

Temperature Rising Elution Fractionation (TREF) analysis was done using a Crystallization Elution Fractionation (CEF) instrument from Polymer Char, S. A., Valencia, Spain. The principles of CEF analysis and a general description of the particular apparatus used are given in the article Monrabal, B.; del Hierro, P. *Anal. Bioanal. Chem.* 2011, v.399, pg. 1557. FIG. 3 of the article is an appropriate schematic of the particular apparatus to be used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-μm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, 3/8" o.d., 7.8 mm i.d.) packed with an inert support (SS balls) at 140° C., and the column temperature was stabilized at 125° C. for 20 minutes. The sample volume was then allowed to crystallize in the column by reducing the temperature to 0° C. at a cooling rate of 1° C./min. The column was kept at 0° C. for 10 minutes before injecting the ODCB flow (1 ml/min) into the column for 10 minutes to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0° C. to 140° C. at a rate of 2° C./min while maintaining the ODCB flow at 1 ml/min to elute and measure the concentration of the dissolving polymer.

Cross-Fraction Chromatography

Cross-fractionation chromatography (CFC), also known as TREF/GPC, which combines TREF and traditional GPC as disclosed in WO 2015/123164, was performed on a CFC-2 instrument from Polymer Char, Valencia, Spain on polyethylene samples. The instrument was operated and subsequent data processing, for example, smoothing parameters, setting baselines, and defining integration limits, was performed according to the manner described in the CFC User Manual provided with the instrument or in a manner commonly used in the art. The instrument was equipped with a TREF column (stainless steel; o.d., 3/8"; length, 15 cm; packing, non-porous stainless steel micro-balls) in the first dimension and a GPC column set (3×PLgel 10 μm Mixed B column from Polymer Labs, UK) in the second dimension. Downstream from the GPC column was an infrared detector (IR4 from Polymer Char) capable of generating an absorbance signal that is proportional to the concentration of polymer in solution.

The sample to be analyzed was dissolved in ortho-dichlorobenzene, at a concentration of about 5 mg/ml, by stirring at 150° C. for 75 minutes. Then a 0.5 ml volume of the solution containing 2.5 mg of polymer was loaded in the center of the TREF column and the column temperature was reduced and stabilized at about 120° C. for 30 minutes. The column was then cooled slowly (0.2° C./min) to −15° C. (for cryogenic runs) to crystallize the polymer on the inert support. The low temperature was held for 10 minutes before injecting the soluble fraction into the GPC column. All GPC analyses were done using solvent ortho-dichlorobenzene at 1 ml/min, a column temperature of 140° C., and in the "Overlap GPC Injections" mode. Then the subsequent higher-temperature fractions were analyzed by increasing the TREF column temperature to the fraction set-points in a stepwise manner, letting the polymer dissolve for 16 minutes ("Analysis Time"), and injecting the dissolved polymer into the GPC column for 3 minutes ("Elution Time"). The soluble portion or "purge" of the polymers was not analyzed, only the "insoluble" portion of the polymer samples were analyzed, that is, insoluble at −15° C. or lower.

The universal calibration method was used for determining the molecular mass of eluting polymers. Thirteen narrow molecular-weight distribution polystyrene standards (obtained from Polymer Labs, UK) within a range of 1.5 kg/mol to 8,200 kg/mol were used to generate a universal calibration curve. Mark-Houwink parameters were obtained from Appendix I of *Size Exclusion Chromatography* by S. Mori and H. G. Barth (Springer, 1999). For polystyrene $K=1.38\times10^{-4}$ dl/g and $\alpha=0.7$; and for polyethylene $K=5.05\times10^{4}$ dl/g and $\alpha=0.693$ were used. Fractions having a weight % recovery (as reported by the instrument software) of less than 0.5% were not processed for calculations of molecular-weight averages (Mn, Mw, etc.) of the individual fractions or of aggregates of fractions.

Composition Analysis from Cross-Fractionation Chromatography Results

The cryogenic cross-fractionation chromatography (CFC) results obtained above were analyzed using Moebus Bivariate Deconvolution with Rotation (MBDR) method to determine the inter-correlation between molecular weight and comonorner content.

Figure 4A:
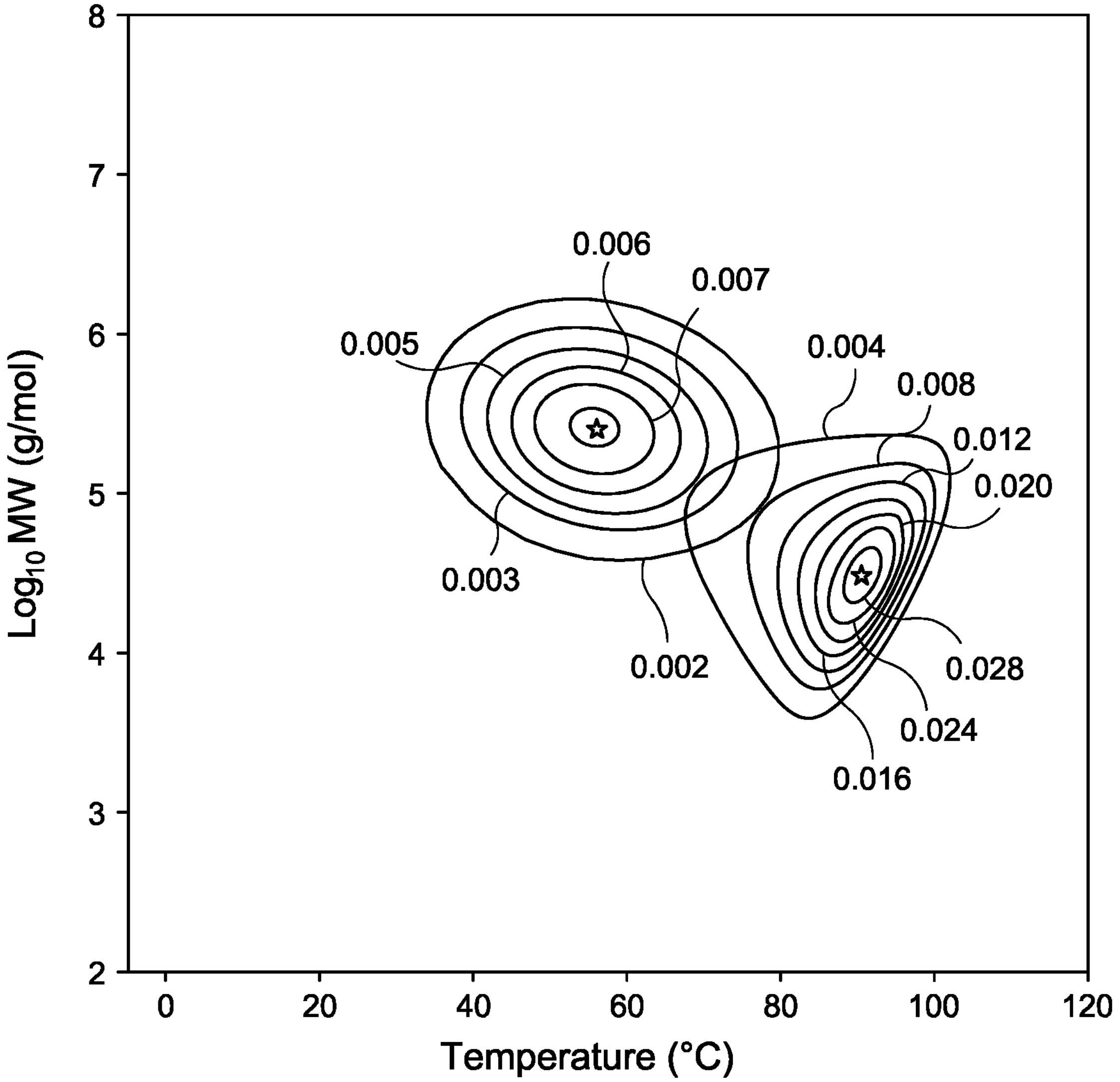
FIGS. 4A-4G shows cryogenic cross-fraction (CFC) plots for comparative and example ethylene hexene copolymer according to at least one embodiment of the present disclosure.
Figure 4B:
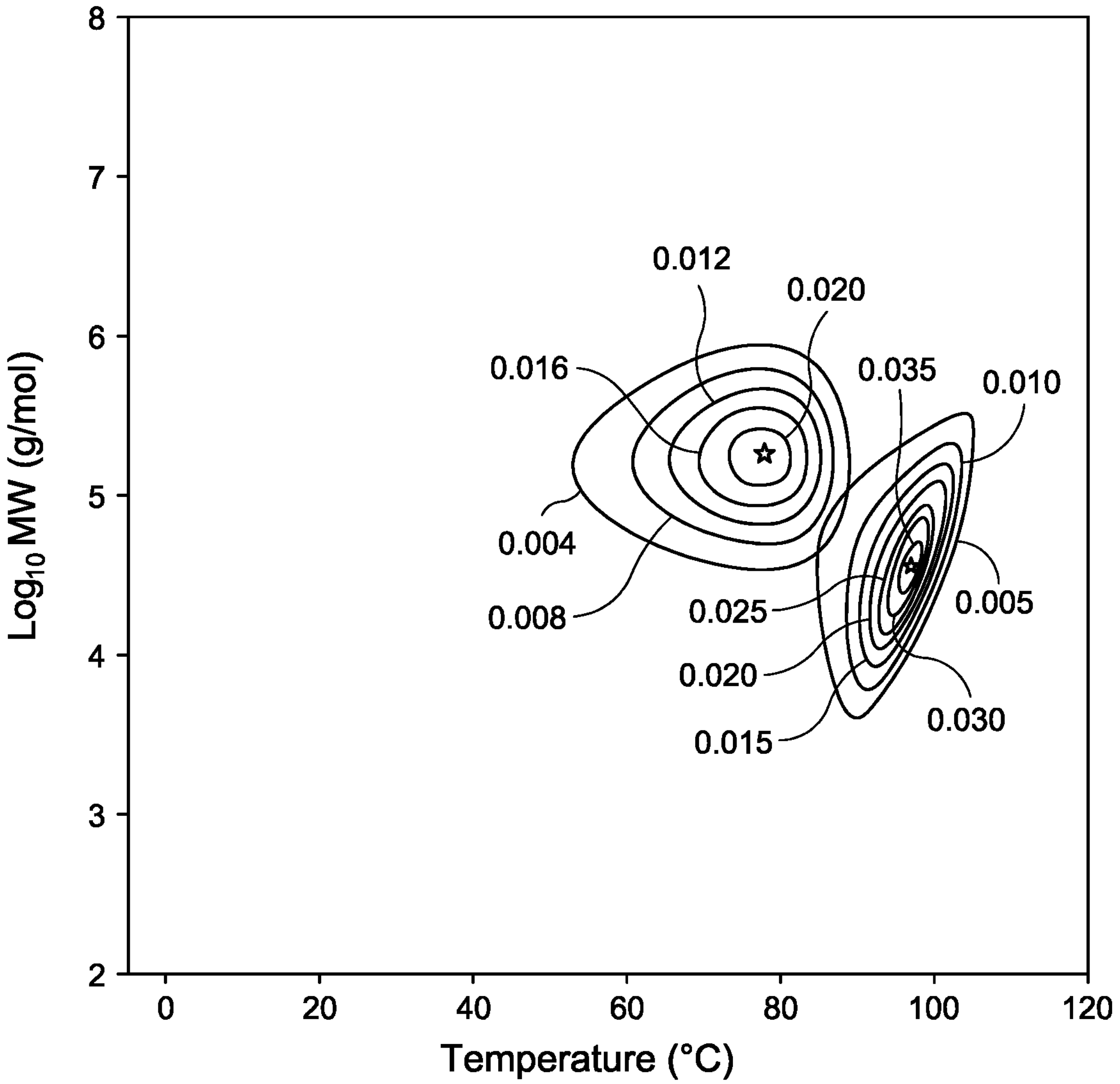
Figure 4C:
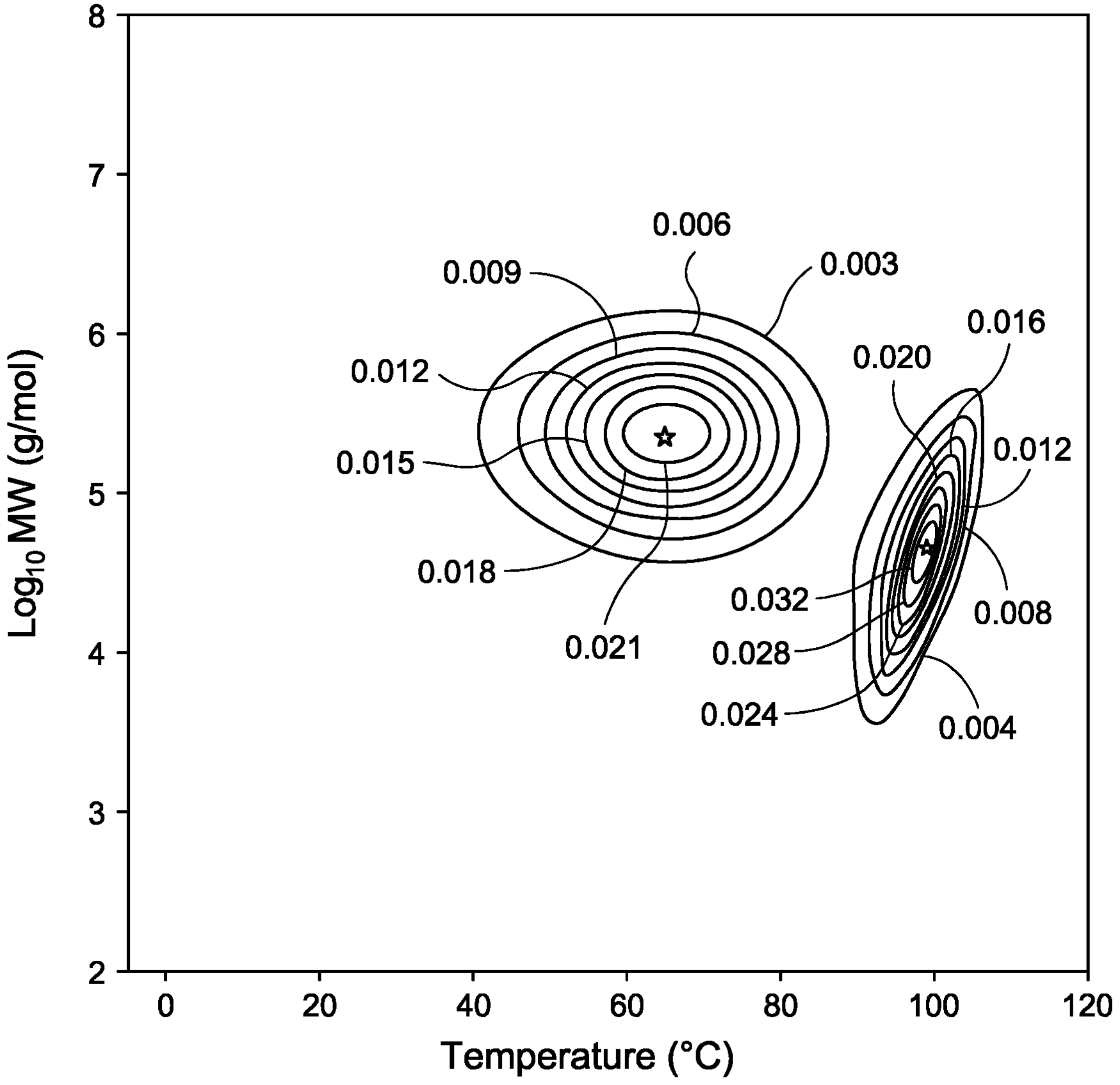
Figure 4D:
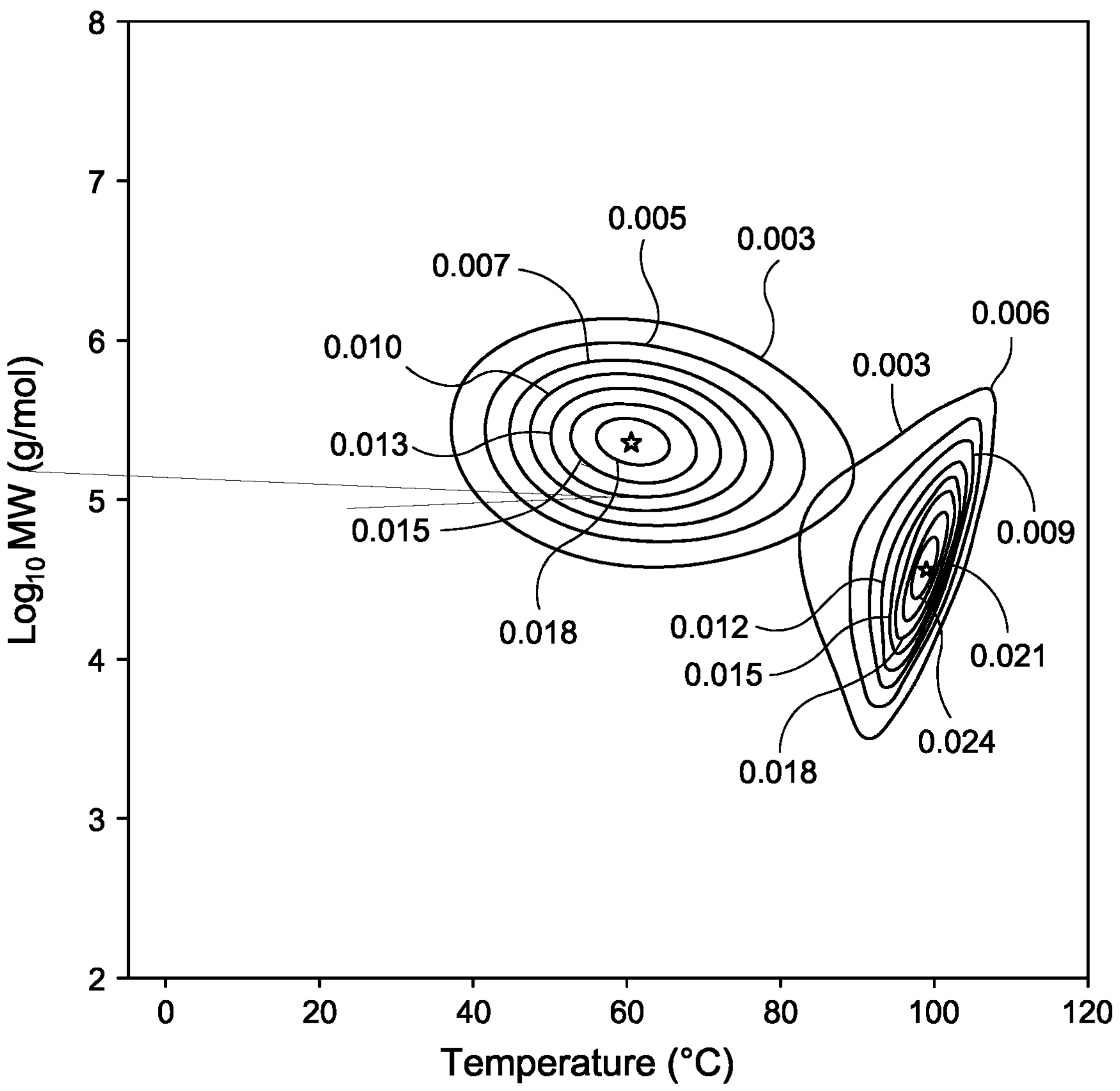
Figure 4E:
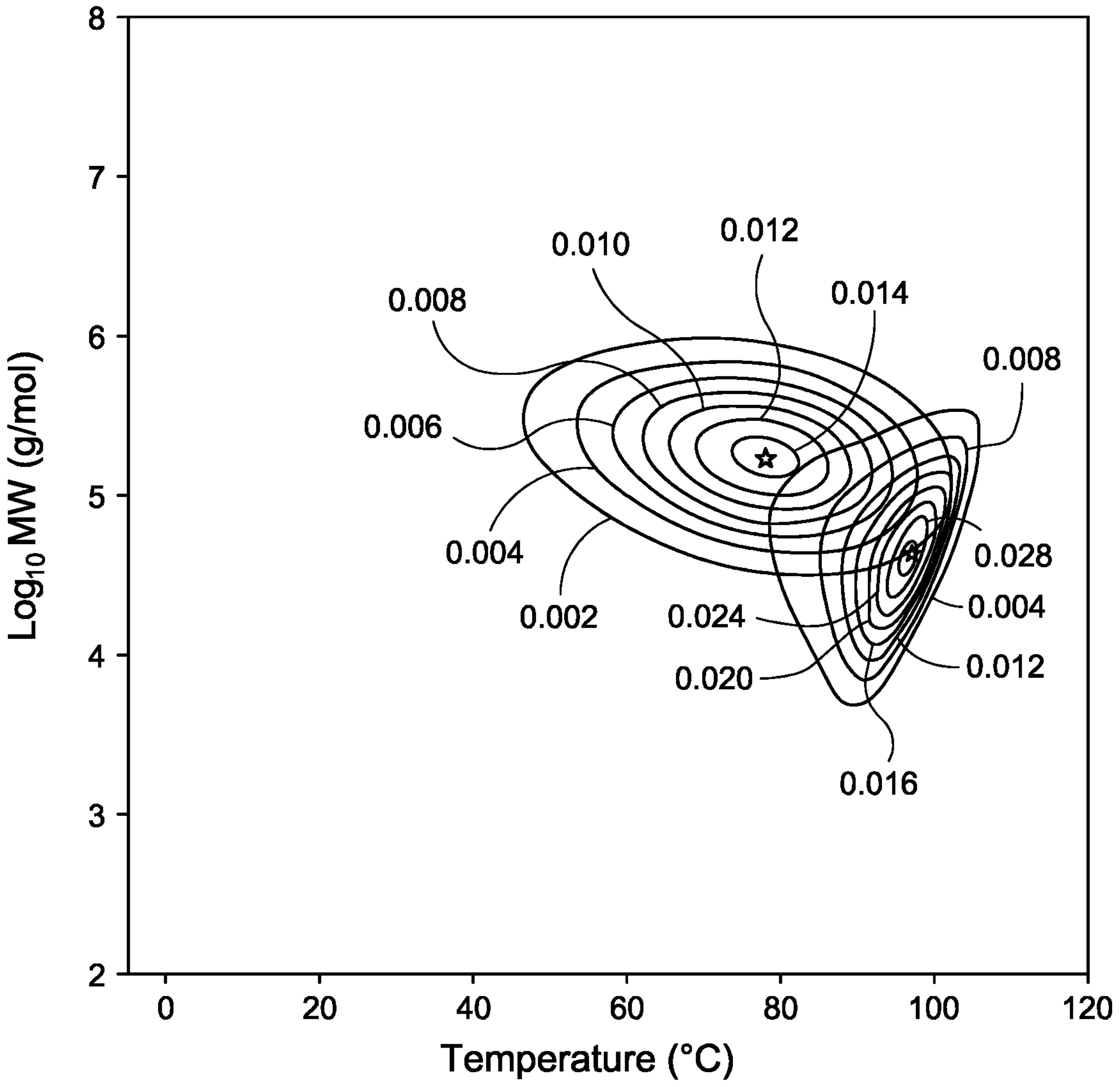
Figure 4F:
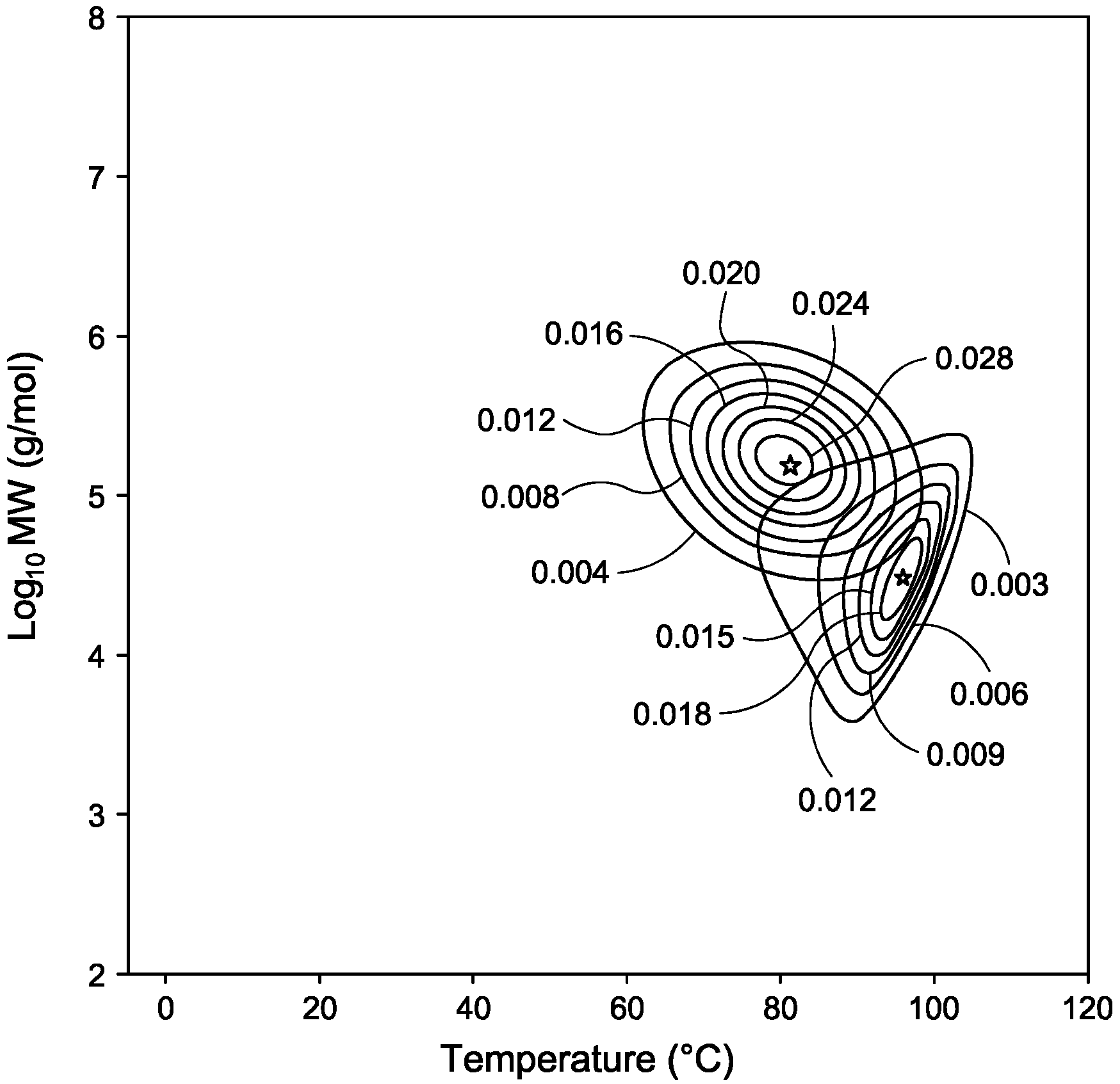
Figure 4G:
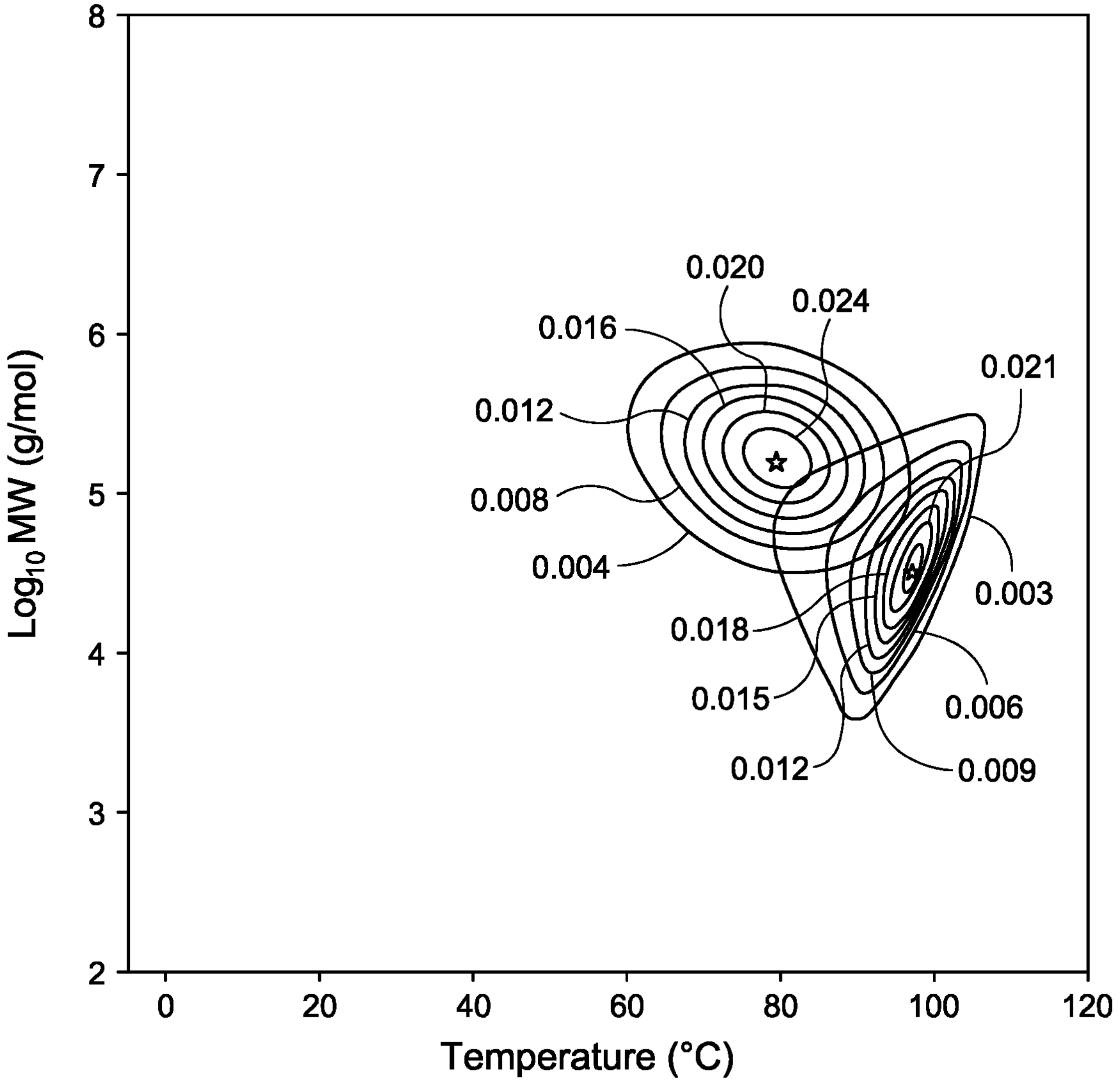

As shown in FIG. 4A and FIG. 4B, two peaks are observed for both samples on the $\log_{10}$MW vs. temperature contour plots. The peak located at lower temperature and higher molecular weight portion (corresponding to a low density population), is defined as Peak 1, with corresponding temperature and molecular weight coordinate of ($M_{p1}$, $T_{p1}$). And the peak located at higher temperature and lower molecular weight portion (corresponding to a high density population), is defined as Peak 2, with corresponding temperature and molecular weight coordinate of ($M_{p2}$, $T_{p2}$). Quantitatively, the Moebus Bivariate Deconvolution with Rotation (MBDR) method was used to calculate the location of the two peaks and the relevant compositional information. The MBDR uses Equation 1 (Pearson IV×Pearson IV) and Equation 2 (Standard Minimization) to deconvolute peaks in x and y (or in this case temperature and molecular weight). One of the most important features of this method is the rotational term. Most samples vary in both dimensions simultaneously but standard deconvolution only truly allows variability in dimensions parallel to the axes (i.e., x or y not x and y). With this being the case, using standard deconvolution would require more peaks to be fitted to sufficiently characterize the data. The rotational term allows the strictly orthogonal dimensions to rotate therefore allowing the data to be more accurately characterized. By simultaneously fitting the parameters for two peaks with constraints, as shown in FIG. 4A and FIG. 4B, we can find the peak locations (e.g., molecular weight peak ($M_p$), temperature peak ($T_p$)), peak mass fractions (i.e., area under the plot for each of the two peaks), and shape parameters (e.g., theta, θ).

$$f(x,y)=\sum_{i=1}^{N}Amp_i\left\{1+\left(\frac{x_{\theta i}}{\alpha_{xi}}\right)^2\right\}^{-m_{xi}}\exp\left\{-v_{xi}\arctan\left(\frac{x_{\theta i}}{\alpha_{xi}}\right)\right\}\left\{1+\left(\frac{y_{\theta i}}{\alpha_{yi}}\right)^2\right\}^{-m_{yi}}\exp\left\{-v_{yi}\arctan\left(\frac{y_{\theta i}}{\alpha_{yi}}\right)\right\}\quad\text{Equation 1}$$

where:

-continued $$x_{\theta i} = (x - \lambda_{xi})\cos\theta_i - (y - \lambda_{yi})\sin\theta_i,$$

and $$y_{\theta i} = (x - \lambda_{xi})\sin\theta_i - (y - \lambda_{yi})\cos\theta_i$$

$$\min\left[(M(x, y) - f(x, y))^2\right] \qquad \text{Equation 2}$$

where M is the measured data or "ground truth"; Amp: the height (i.e. z value) of each peak; λ is the location parameter, which indicates where on the axis the peak exists; α is the scale parameter, which describes the width of the peak (as defined by Pearson IV); m is the shape parameter describing the kurtosis or "tailedness" of the peak; v is another shape parameter that describes skewness; and θ is the rotation parameter, which describes rotation from orthogonal axis.

B. Film Analysis

For all film analysis, film specimens are conditioned at 23° C.+/−2° C. and 50+/−10% relative humidity in accordance with Procedure A of ASTM D618 (40 hour minimum) unless otherwise specified. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a HEIDENHAN Gauge Micrometer following ASTM D6988-13, apparatus C, method C. For average gauge of a film roll, twenty (20) readings were taken, with the location for each reading evenly distributed on the sample. For each film sample, ten film thickness data points were measured per inch of film as the film was passed through the gauge in a transverse direction. From these measurements, an average gauge measurement was determined and reported.

1% Secant Modulus (M), reported in pounds per square inch (lb/in$^2$ or psi), was measured as specified by ASTM D-882 using 1 inch wide film strip. Tensile Strength at Yield, Tensile Strength at Break or Ultimate Tensile Strength were measured as specified by ASTM D-882 using 1 inch wide film strip. Elongation at Yield and Elongation at Break, reported as a percentage (%), were also measured as specified by ASTM D-882 using 1 inch wide film strip. Dart Drop Impact or Dart Drop Impact Strength (DIS), reported in grams (g) and/or grams per mil (g/mil), was measured as specified by ASTM D-1709, method A, using a Phenolic probe. Calculation uses last 10 passes and 10 fails.

Elmendorf Tear, reported in grams (g) or grams per mil (g/mil), was determined according to ASTM D-1922. Puncture test was performed on Model SFM-1 testing machine by United Testing Systems following a modified ASTM D5748 procedure, in which a non-standard probe of ¾" diameter with hemispherical tip of equal size was used with two 0.25 mil HDPE slip sheets. Testing speed was 10 in/min.

Haze, reported as a percentage (%), was measured on a HazeGard PLUS hazemeter by BYK-Gardner as specified by ASTM D-1003. Gloss was measured on a Model 4535 Micro-Gloss 45° Reflectometer by BYK Gardner at a reflectance angle of 45° following ASTM D2457-13.

EXAMPLES

Example Synthesis of Catalysts

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dicyclopentadiene, dimethyl sulfide ($Me_2S$) and purchased from Sigma-Aldrich. Hafnium tetrachloride ($HfCl_4$) 99+%, and trimethylsilylmethyl trifluoromethanesulfonate were purchased from Strem Chemicals and TCI America respectively, and used as received. MAO is methyl alumoxane (30 wt % in toluene) obtained from Albemarle.

Example Synthesis of Metallocene Catalyst 1

Metallocene Catalyst 1 is (Tetrahydroindenyl)(trimethylsilyl-methylcyclopentadienyl)hafnium dichloride:

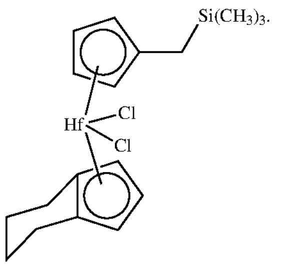

Preparation of (Tetrahydroindenyl)(trimethylsilylmethylcyclopentadienyl)hafnium dichloride, ($H_4$Ind)($Me_3SiCH_2Cp$)$HfCl_2$. To a pale yellow solution of indenyl (trimethylsilylmethylcyclopentadienyl)hafnium dichloride (1.50 g, 2.91 mmol) in dichloromethane (30 mL) was added platinum oxide (0.04 g, 0.18 mmol, 2.7 wt %) to give a brown mixture. 100 psi hydrogen was added to the mixture and the reaction was stirred vigorously for 1 hour. The reaction was vented and filtered to give a colorless solution and black solid. The solution was evaporated under vacuum, leaving white solid title compound (Tetrahydroindenyl)(trimethylsilylmethylcyclopentadienyl)hafnium dichloride, ($H_4$Ind)($Me_3SiCH_2Cp$)$HfCl_2$. Yield 1.43 g (95%). $^1$H NMR ($CD_2Cl_2$): δ 6.23 (t, 1H), 6.15 (t, 2H), 5.88 (t, 2H), 5.67 (d, 2H), 2.85-2.92 (m, 2H), 2.59-2.66 (m, 2H), 2.09 (s, 2H), 1.77-1.80 (m, 2H), 1.60-1.63 (m, 2H), −0.02 (s, 9H).

Preparation of Indenyl(trimethylsilylmethylcyclopentadienyl)hafnium dichloride, Ind($Me_3SiCH_2Cp$)$HfCl_2$. To a white suspension of (trimethylsilylmethylcyclopentadienyl) hafnium trichloride (1,2-dimethoxyethane) (2.50 g, 4.75 mmol, 1.00 eq.) in ether (30 mL) was added lithium indenide (0.57 g, 4.75 mmol, 1.00 eq.) to give a light mixture. The mixture was stirred 21 hours and then evaporated under vacuum, leaving a solid. The solid was extracted with dichloromethane (25 mL, then 3×5 mL) and the extracts filtered to give a light yellow solution and white solid. The solution was evaporated under vacuum, leaving light yellow solid. The solid was washed with pentane (10 mL) and dried under vacuum to provide title compound (Indenyl(trimethylsilylmethylcyclopentadienyl)hafnium dichloride, Ind ($Me_3SiCH_2Cp$)$HfCl_2$). Yield 2.27 g (93%) light yellow powder. $^1$H NMR ($CD_2Cl_2$): δ 7.65 (m, 2H), 7.26 (m, 2H), 6.87 (t, 1H), 6.37 (d, 2H), 5.77 (t, 2H), 5.65 (t, 2H), 1.99 (s, 2H), −0.06 (s, 9H).

Preparation of (Trimethylsilylmethylcyclopentadienyl) hafnium trichloride (1,2-dimethoxyethane) (($Me_3SiCH_2Cp$) $HfCl_3$(dme)). To a white suspension of hafnium tetrachloride (11.65 g, 36.4 mmol, 1.00 eq.) in dichloromethane (120 mL) at −35° C. was added dimethyl sulfide (6.80 g, 109 mmol, 3.01 eq.) to give a hazy, pale yellow solution. Tributyl(trimethylsilylmethylcyclopentadienyl)stannane (16.85 g, 38.2 mmol, 1.05 eq.) was added dropwise to the solution to give a hazy, amber solution. The mixture was allowed to warm to room temperature and stirred 3 hours. 1,2-Dimethoxyethane (10.00 g, 109 mmol, 2.99 eq.) was then added to the reaction and the mixture was filtered to give an amber solution and a small amount of white solid. The solution was evaporated under vacuum, leaving a damp, white solid. The solid was washed with pentane (100 mL, then 3×40 mL) and dried under vacuum to provide the title compound ($(Me_3SiCH_2Cp)HfCl_3(dme)$). Yield 18.15 g (95%) white powder. $^1$H NMR ($CD_2Cl_2$): δ 6.29 (t, 2H), 4.13 (br s, 4H), 3.91 (3, 6H), 2.33 (s, 2H), −0.01 (s, 9H).

Preparation of Tributyl(trimethylsilylmethylcyclopentadienyl)stannane, $Bu_3Sn(Me_3SiCH_2Cp)$. To a colorless solution of chlorotributylstannane (12.55 g, 38.6 mmol, 1.00 eq.) in ether (60 mL) was added lithium (trimethylsilylmethylcyclopentadienide) (6.10 g, 38.5 mmol, 1.00 eq.) to give a cloudy, light mixture. The reaction was stirred 4 hours and then dried under vacuum, leaving a mixture. The mixture was extracted with pentane (50 mL, then 2×20 mL) and extracts filtered to give a yellow solution and a solid. The solution was evaporated under vacuum, leaving yellow liquid title compound ($(Bu_3Sn(Me_3SiCH_2Cp))$). Yield 16.88 g (99%). $^1$H NMR ($C_6D_6$): δ 6.08 (m, 2H), 5.56 (m, 4H), 1.99 (s, 2H), 1.51 (m, 6H), 1.33 (m, 6H), 0.92 (t, 9H), 0.83 (m, 6H), 0.09 (s, 9H).

Example Synthesis of Iron Catalyst 1

Iron Catalyst 1 is 2,6-Bis-[1-(2-chloro,4,6-dimethylphenylimino)ethyl]pyridine iron dichloride:

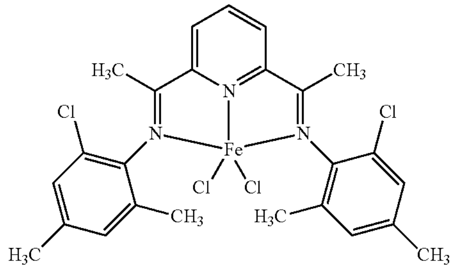

2-chloro-4, 6-dimethyl aniline, 2,6-diacetylpyridine, iron chloride and formic acid (95-97%) were purchased from Sigma-Aldrich and used as received. The $^1$H NMR measurements were recorded on a 400 MHz Bruker spectrometer.

Synthesis of 2,6-bis-[1-(2-chloro-4,6-dimethylphenylimino)ethyl]pyridine. Solid 2,6-diacetylpyridine (5.0 g, 31 mmol) was dissolved in methanol (100 mL). Then, a solid 2-chloro-4, 6-dimethyl aniline (9.537 g, 62 mmol) and formic acid (0.5 mL) were added. The resulting mixture was stirred at room temperature for 48 hours, and a colorless solid precipitated out during the course of reaction. Colorless crystalline solids were filtered out and washed with cold methanol. Crude materials $^1$H NMR spectrum showed that three are 1:1 ratio of title precursor compound and starting material 2-chloro-4,6-dimethyl aniline. The desired compound was purified by column chromatography with a mixture of hexane/ethyl acetate (8:2 ratio) as eluent and solvent removal resulted in colorless crystalline solid (2,6-bis-[1-(2-chloro-4,6-dimethylphenylimino)ethyl]pyridine) in 2.5 g (18.6%) yield. $^1$H NMR (400 MHz, $CD_2Cl_2$): δ 2.06 (6H, s, $CH_3$ side arms), 2.29 (6H, s, $CH_3$), 2.31 (6H, s, $CH_3$), 6.99 (2H, s, Ar—CH), 7.11 (2H, s, Ar—CH), 7.95 (1H, t, Ar—CH), 8.47 (2H, d, Ar—CH) ppm.

Synthesis of 2,6-bis-[1-(2-chloro-4,6-dimethylphenylimino)ethyl]pyridine iron dichloride (Iron Catalyst 1). A solid pro-ligand, 2,6-Bis-[1-(2-chloro-4,6-dimethylphenylimino)ethyl]pyridine, was dissolved in THF (40 mL) and cooled to −25° C., to this a solid pre-dried iron chloride was added. The resulting mixture was stirred overnight at room temperature. The resulting mixture color turned from brown to blue during the course of the reaction and the desired iron complex was precipitated out as blue solids. The blue iron compound was filtered out and washed with hexane. The crude materials were further re-dissolved in dichloromethane to remove any insoluble iron containing impurities and ionic compounds formed during the course of the reaction, which could not be identified by $^1$H NMR measurements because of their faster relaxation rate (paramagnetic nature) on NMR timescale. Solvent removal under reduced pressure resulted in blue crystalline solid of the 2,6-bis-[1-(2-chloro-4,6-dimethylphenylimino)ethyl]pyridine iron dichloride in 1.89 g (81.9%) yield. $^1$HNMR (400 MHz, $CD_2Cl_2$): δ −23.2, −21.0, 3.7, 9.1, 12.2, 15.3, 18.4, 19.3, 22.0, 22.2, 32.9, 33.9, 81.9, 84.2 (bs) ppm.

Example Synthesis of Iron Catalyst 2

Iron Catalyst 2 is (E)-N-(2-chloro-4,6-dimethylphenyl)-1-(6-((E)-1-(mesitylimino)ethyl)pyridin-2-yl)ethan-1-imine iron-silylneopentyl

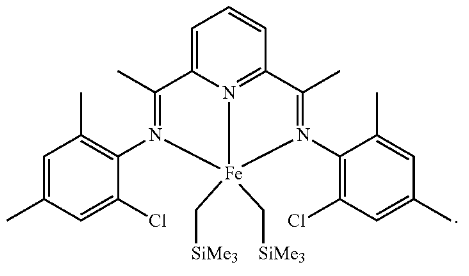

Synthesis of tetrakispyridine iron dichloride. $FeCl_2$ (12.3 g, 0.097 mol) was slurried in dichloromethane (300 mL) at room temperature. Neat pyridine (30.7 g, 0.388 mol) was added dropwise. An exothermic reaction resulted as pyridine was added. The resulting solution cooled to room temperature and stirred overnight; during this time, the solution turned from yellow to colorless. Solvents from the reaction mixture were removed in vacuo. The crude materials were extracted using THF (200 mL) and volatiles were removed. The product was obtained as a pale yellow crystalline solid. 55.8% yield.

Synthesis of bispyridine iron disilylneopentyl. Tetrakis-pyridine iron dichloride (0.890 g, 2.01 mmol) was slurried in ether (40 mL) and pyridine (20 mL) and cooled to −32° C. A 1.0 M solution of $Me_3SiCH_2MgCl$ in diethylether (4.02 mL, 4.02 mmol) was added dropwise. The reaction mixture was stirred for an hour at room temperature. The resulting mixture solvents were removed in vacuo. The desired product was extracted in hexane (20 mL). Solvent was removed in vacuo to yield a dark purple solid. 96.1% yield.

Synthesis of 2,6-bis-[1-(2-chloro-4,6-dimethylphenylimino)ethyl]pyridine iron-silylneopentyl. Bispyridine iron disilylneopentyl (0.748 g, 1.93 mmol) and 2,6-bis-[1-(2-chloro-4,6-dimethylphenylimino)ethyl]pyridine (0.844 g, 1.93 mmol) were mixed in THF (30 mL) at −25° C. and stirred overnight at room temperature. The resulting solvent mixture was removed in vacuo to give a red material that was triturated with hexane (50 mL). The red material was completely soluble in hexane and extracted with hexane. Hexane removal from the resulting mixture yielded a red crystalline solid of the desired compound. 58.3% yield.

Synthesis of (E)-N-(2-chloro-4,6-dimethylphenyl)-1-(6-((E)-1-(mesitylimino)ethyl)pyridin-2-yl)ethan-1-imine iron-silylneopentyl, Iron Catalyst 2. Bispyridine iron disilylneopentyl (0.511 g, 1.32 mmol) and (E)-N-(2-chloro-4,6-dimethylphenyl)-1-(6-((E)-1-(mesitylimino)ethyl)pyridin-2-yl)ethan-1-imine (0.550 g, 1.32 mmol) were mixed in THF (20 mL) and stirred overnight at room temperature. Volatiles were removed in vacuo to give a dark purple material that was extracted with pentane (20 mL). The resultant dark purple solution was filtered and taken to dryness in vacuo to yield the desired compound as a dark purple solid. 82.3% yield.

Example Synthesis of SMAO-ES70-875

In a 4 L stirred vessel in a drybox methylalumoxane (MAO, 30 wt % in toluene, approx. 1,000 grams) is added along with approx. 2,000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1,100 g of supported MAO will be collected.

ES70-875 silica is ES70™ silica (PQ Corporation, Conshohocken, Pennsylvania) that has been calcined at approx. 875° C. Specifically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

Example Synthesis of the Supported Catalyst (Metallocene Catalyst 1: Iron Catalyst 1, 60:40)

To a stirred vessel 1,800 g of toluene (Sigma Aldrich) was added along with 894 g of methylaluminoxane (30 wt % in toluene, Albemarle). To this solution 741 g of ES70-875 degC calcined silica was added. The mixture was stirred for three hours at 80° C. after which the temperature was reduced and the reaction was allowed to cool to ambient temperature. (Tetrahydroindenyl)(trimethylylsilylmethylcyclopentadienyl)hafnium dichloride (6.86 g, 13.2 mmol) (metallocene catalyst 1) and 2,6-Bis[1-(2-chloro-4,6-dimethylphenylimino)ethyl]pyridine iron(II) dichloride (4.97 g, 8.80 mmol) (iron catalyst 1) were then dissolved in toluene (250 g) and added to the vessel, which was stirred for one hour. The mixing speed was then reduced and stirred slowly while drying under vacuum for 65 hours, after which 984 g silica supported catalyst was obtained.

Example Synthesis of the Supported Catalyst (Metallocene Catalyst 1:Iron Catalyst 1, 80:20)

To a stirred vessel 1,800 g of toluene (Sigma Aldrich) was added along with 894 g of methylaluminoxane (30 wt % in toluene, Albemarle). To this solution 741 g of ES70-875 calcined silica was added. The mixture was stirred for three hours at 80° C. after which the temperature was reduced and the reaction was allowed to cool to ambient temperature. (Tetrahydroindenyl)(trimethylylsilylmethylcyclopentadienyl)hafnium dichloride (9.15 g, 17.6 mmol) (metallocene catalyst 1) and 2,6-Bis[1-(2-chloro-4,6-dimethylphenylimino)ethyl]pyridine iron(II) dichloride (2.49 g, 4.40 mmol) (iron catalyst 1) were then dissolved in toluene (250 g) and added to the vessel, which was stirred for one hour. The mixing speed was then reduced and stirred slowly while drying under vacuum for 65 hours, after which 992 g silica supported catalyst was obtained.

Example Synthesis of the Supported Catalyst (Iron Catalyst 3:Metallocene Catalyst 2, 60:40)

Iron Catalyst 3 is (1E,1'E)-1,1'-(pyridine-2,6-diyl)bis(N-(2-chloro-4,6-dimethylphenyl)ethan-1-imine)$FeCl_2$. Metallocene Catalyst 2 is

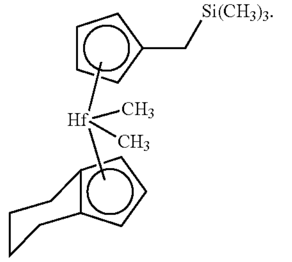

ES70YSilica (33 g) was loaded in the Celestir™ followed by the addition of 200 ml of toluene. The mixture was stirred for few seconds to achieve homogeneity. Catalyst 3, 0.735 g (24 micromol) was added as one portion and allowed to stir overnight at room temperature. The mixture turned dark in color. Then MAO (59.85 g) was added through the side arm slowly over 15 minutes with constant stirring. Catalyst 1, 0.441 g (16 micromol) was dissolved in toluene and added slowly to the above slurry. The mixture was allowed to stir for 2 hours at room temperature under $N_2$. The slurry was filtered through glass frit and washed with toluene (100 ml) and followed by pentane (200 ml). Then the supported catalyst was then dried under vacuum overnight yields dirty white free flowing solid of approximately 53 g.

Example Polymerizations:

Table 1 summarizes the example samples of the present disclosure.

TABLE 1

| Sample | Description |
|---|---|
| Example 1 (Ex. 1) | metallocene catalyst 1:iron catalyst 1 (60:40), cosupported on SMAO-ES70-875 silica, no trim |
| Example 2 (Ex. 2) | metallocene catalyst 1:iron catalyst 1 (60:40), cosupported on SMAO-ES70-875 silica, no trim |

TABLE 1-continued

| Sample | Description |
|---|---|
| Example 3 (Ex. 3) | metallocene catalyst 1:iron catalyst 1 (60:40), cosupported on SMAO-ES70-875 silica, no trim |
| Example 4 (Ex. 4) | metallocene catalyst 1:iron catalyst 1 (60:40), cosupported on SMAO-ES70-875 silica, trim with 0.11 wt % metallocene catalyst 1 |
| Example 5 (Ex. 5) | metallocene catalyst 1:iron catalyst 1 (80:20), cosupported on SMAO-ES70-875 silica, no trim |
| Example 6 (Ex. 6) | metallocene catalyst 1:iron catalyst 1 (80:20), cosupported on SMAO-ES70-875 silica, trim with 0.06 wt % iron catalyst 2 |
| Example 7 (Ex. 7) | Iron Catalyst 3:Metallocene Catalyst 2, (60:40), cosupported on SMAO-ES70-875 silica, no trim |

For Examples 1-6, polymerization to generate the above examples was performed in an 18.5 foot tall gas-phase fluidized bed reactor with a 16.5" diameter straight section. Cycle and feed gases were fed into the reactor body through a perforated distributor plate, and the reactor was controlled at a constant pressure set point of 290 psig and constant 67 mol % ethylene. The reactor temperature was maintained at 173 or 185° F. throughout the polymerization by controlling the temperature of the cycle gas loop. The supported catalyst (20 wt % in mineral oil slurry) was delivered to the reactor with iC5 diluent and $N_2$ carrier flows. In the comparative example CEx. 3 in Table 2, a reactor pressure of 300 psig, temperature set point of 175° F., and ethylene concentration of 70 mol % were used.

For Example 7, polymerization was performed in a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. Reactor temperature was maintained by heating the cycle gas. Supported catalyst was fed as a 10 wt % slurry in Sono Jell® from Sonnebom (Parsippany, NJ). The slurry was delivered to the reactor by nitrogen and isopentane feeds in a ⅛" diameter catalyst probe. Polymer was collected from the reactor as necessary to maintain the desired bed weight. Average process conditions for the polymer collection are shown in Table 3B.

Trim Polymerization. Polymerization with trim was performed similarly to untrimmed polymerization. The supported catalyst slurry was combined in-line with the trim catalyst solution at different ratios and mixed in a static mixer to form a third, trimmed catalyst composition and then delivered to the reactor with the iC5 and $N_2$ carrier flows. Process conditions for each example are shown in Table 2.

TABLE 2

| Sample | C. Ex. 3 | Ex. 1 | Ex. 2 | Ex. 3 | Ex. 4 | Ex. 5 | Ex. 6 |
|---|---|---|---|---|---|---|---|
| H2 conc. (molppm) | 387 | 228 | 252 | 282 | 241 | 241 | 242 |
| $C_6/C_2$ Ratio (mol %/mol %) | 0.021 | 0.016 | 0.024 | 0.023 | 0.016 | 0.014 | 0.015 |
| $C_2$ conc. (mol %) | 70.02 | 67.0 | 67.0 | 67.1 | 66.8 | 66.7 | 66.9 |
| Comonomer/$C_2$ Flow Ratio | 0.110 | 0.067 | 0.105 | 0.115 | 0.065 | 0.065 | 0.065 |
| $C_2$ flow (lb/hr) | 179 | 104 | 107 | 106 | 96 | 96 | 89 |
| H2/$C_2$ Ratio (ppm/mol %) | 5.53 | 3.4 | 3.8 | 4.2 | 3.6 | 3.6 | 3.6 |
| iC5 conc. (mol %) | 4.8 | 5.7 | 5.4 | 5.2 | 6.1 | 7.4 | 6.9 |
| Reactor Pressure Set Point (psig) | 300 | 290 | 290 | 290 | 290 | 290 | 290 |
| Reactor Temperature Set Point (° F.) | 175 | 185 | 185 | 173 | 173 | 185 | 185 |
| Avg. Bedweight (lb) | 735 | 364 | 375 | 379 | 351 | 356 | 356 |
| PE Production Rate (lb/hr) | 141 | 70 | 68 | 71 | 53 | 69 | 58 |
| PE Residence Time (hr) | 5.22 | 5.2 | 5.5 | 5.3 | 6.6 | 5.2 | 6.1 |
| Trim Solution Feed (ml/hr) | 0.0 | 0.00 | 0.00 | 0.00 | 29.36 | 0.00 | 23.51 |
| Catalyst Feed (g/hr) | 8.06 | 3.084 | 2.680 | 2.374 | 2.046 | 2.274 | 2.021 |
| Cat Activity (g poly/g cat) | 7825 | 10231 | 11465 | 13648 | 11782 | 13794 | 13123 |

COMPARATIVE EXAMPLES 12 total samples are given as comparative examples. The comparative examples 1 through 6 (CEx. 1-6) are examples 1-6 from PCT Publication Application No. WO 2019/094132 or US Patent Pub. No. 2019/0144576 (see page 49, paragraph [00211] and table 1 et seq.). The process parameters for the preparation parameters of Comparative Example 3 (CEx. 3), which was made in a gas-phase fluidized reactor with a 22.5" diameter straight section, were also given in Table 2. Comparative example 7 (CEx. 7) is EXCEED™ 1327CA, a commercial grade of metallocene LLDPE by ExxonMobil Chemical Company. The comparative examples 8 through 10 (CEx. 8-10) are examples A-C from PCT Publication Application No. WO 2019/027587 (see page 60, paragraph [00193] and table 1 et seq.). Comparative examples 11 (CEx. 11) and 12 (CEx. 12) are Polymer of Run 1 and Run 2, Film 2 and Film 6 from PCT Publication No. WO 2019/108327 (see page 74, paragraph and table 3 et seq.). Table 3 summarizes certain properties of the example polyethylene as determined by GPC-IR5-LS-VIS. FIG. 1A, FIG. 1B, FIG. 1C, FIG. 1D, FIG. 1E, and FIG. 1F show the GPC-IR5-LS-VIS data for example ethylene hexene copolymers Ex. 1, Ex. 2, Ex. 3, Ex. 4, Ex. 5, and Ex. 6, respectively.

TABLE 3

| Sample | C. Ex. 3 | Ex. 1 | Ex. 2 | Ex. 3 | Ex. 4 | Ex. 5 | Ex. 6 |
|---|---|---|---|---|---|---|---|
| Mw (g/mol) | 128,953 | 118,430 | 131,076 | 127,835 | 108,576 | 126,936 | 126,018 |
| Mn | 14,790 | 17,428 | 17,986 | 19,457 | 17,484 | 22,302 | 20667 |
| Mw/Mn | 8.7 | 6.80 | 7.29 | 6.57 | 6.21 | 5.69 | 6.10 |
| Wt % $C_6$ | 9.5 | 6.48 | 9.99 | 9.96 | 6.30 | 6.43 | 6.83 |
| LCB-g' (vis avg) | 0.943 | 0.990 | 0.939 | 0.955 | 0.967 | 0.987 | 0.982 |

TABLE 3B

| PROCESS DATA | Run 1 | Run 2 | Run 3 |
|---|---|---|---|
| $H_2$ conc. (molppm) | 25 | 371 | 73 |
| Hydrogen flow (sccm) | 0.45 | 10.13 | 1.59 |
| $C_6/C_2$ Ratio (mol %/mol %) | 0.002 | 0.012 | 0.003 |
| Comonomer conc. (mol %) | 0.11 | 0.83 | 0.19 |
| $C_2$ conc. (mol %) | 69.9 | 68.0 | 70.7 |
| Comonomer/$C_2$ Flow Ratio | 0.001 | 0.040 | 0.005 |
| $C_2$ flow (g/hr) | 1394 | 1453 | 1150 |
| $H_2/C_2$ Ratio | 0.4 | 5.5 | 1.0 |
| Rx. Pressure (psig) | 299 | 299 | 300 |
| Reactor Temp (F.) | 185 | 185 | 185 |
| Avg. Bedweight (g) | 2194 | 1761 | 1620 |
| Production (g/hr) | 460 | 446 | 318 |
| Residence Time (hr) | 4.8 | 4.0 | 5.1 |
| $C_2$ Utilization ($gC_2/gC_2$ poly) | 3.03 | 3.26 | 3.61 |
| Avg Velocity (ft/s) | 1.38 | 1.47 | 1.43 |
| Catalyst Slurry Feed (ml/hr) | 2.1 | 2.4 | 2.3 |
| Catalyst Slurry Conc. (wt frac.) | 0.1 | 0.1 | 0.1 |
| Catalyst Slurry Density (g/ml) | 0.88 | 0.88 | 0.88 |
| Trim Feed (ml/hr) | 0.00 | 0.00 | 0.00 |
| Catalyst Feed (g/hr) | 0.187 | 0.210 | 0.203 |
| Cat Activity (g poly/g cat) | 2462 | 2119 | |
| Melt Index (MI) | | 1.69 | |
| HLMI | | 32.47 | 2.53 |
| HLMI/MI Ratio | | 19.26 | |
| Gradient Density | 0.9403 | 0.9251 | 0.9374 |
| Bulk Density | 0.4446 | 0.3839 | 0.3993 |

Figure 3A:
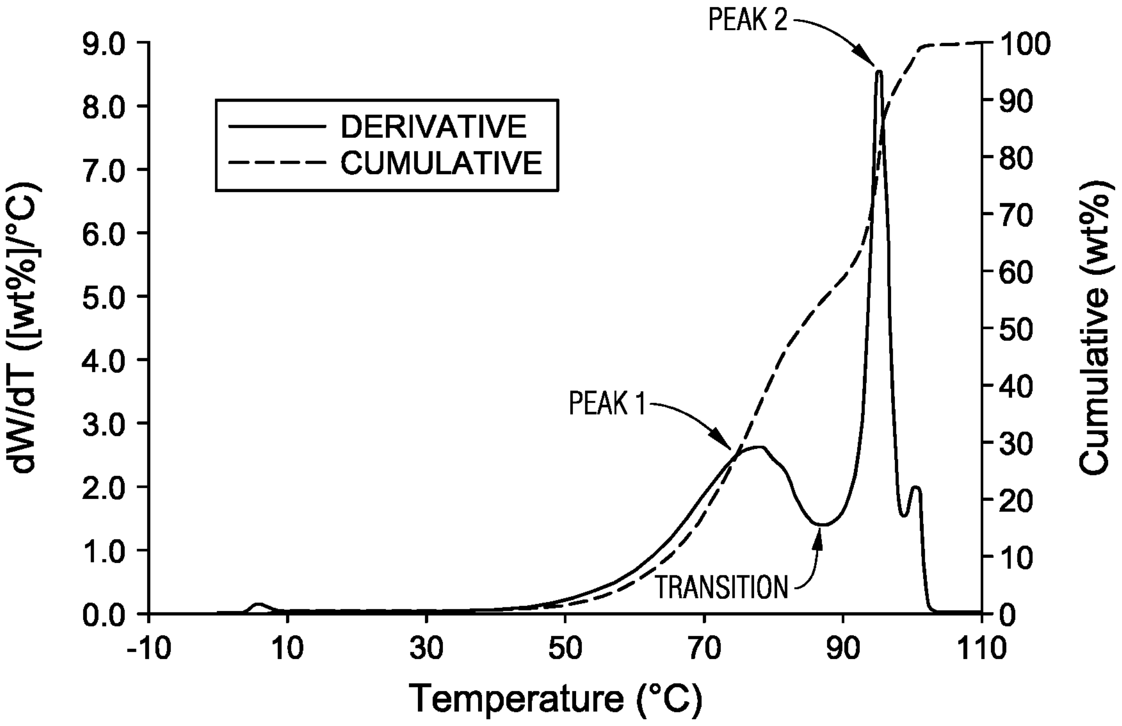
FIG. 3A is a TREF-IR curve of an example ethylene hexene copolymer according to at least one embodiment of the present disclosure.
Figure 3B:
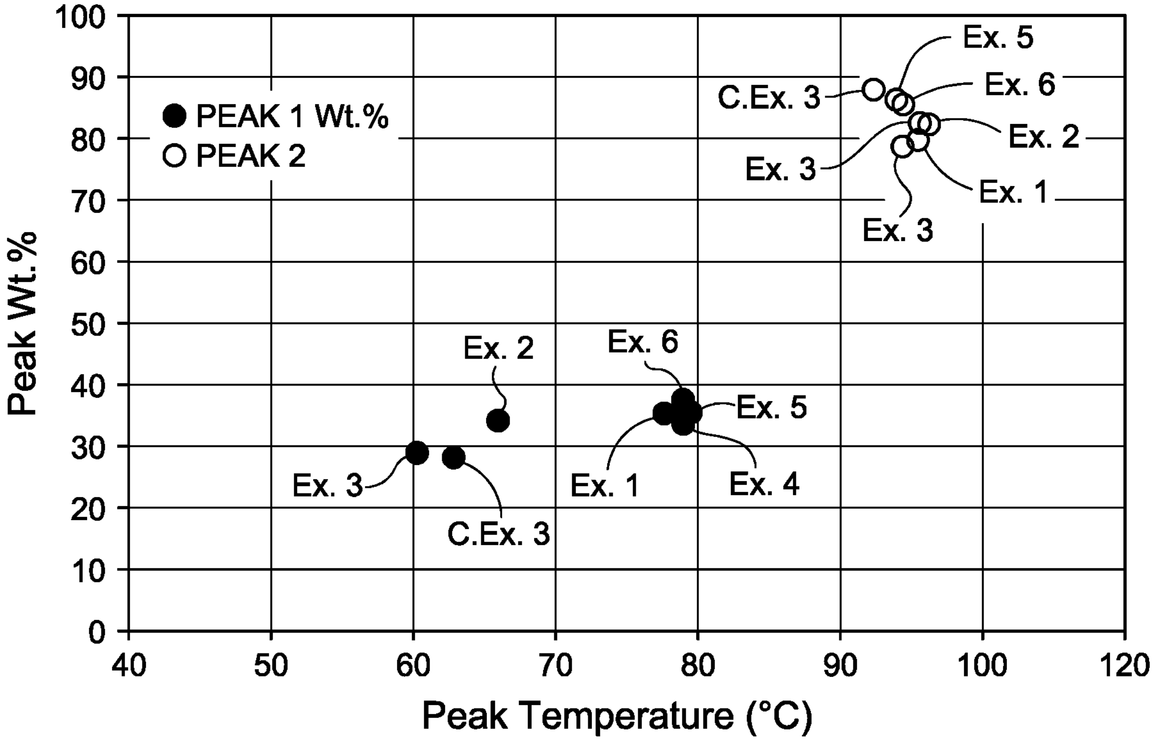
FIG. 3B is a graph of peak wt % versus peak temperature for an example ethylene hexene copolymer according to at least one embodiment of the present disclosure.

FIG. 2A, FIG. 2B, FIG. 2C, FIG. 2D, FIG. 2E, and FIG. 2F show the TREF-IR5 traces for Ex. 1, Ex. 2, Ex. 3, Ex. 4, Ex. 5, and Ex. 6, respectively. Table 4 summarizes characteristics properties of the example polyethylenes as determined from the TREF-IR5 results, with peak and transition temperatures and the weight fractions corresponding to those transitions. FIG. 3A illustrates peak and transition temperatures with example Ex. 1 as an example and FIG. 3B shows the characteristic temperatures and the corresponding weight fractions base on the TREF-IR5 data analysis.

TABLE 4

| Sample | C. Ex. 3 | Ex. 1 | Ex. 2 | Ex. 3 | Ex. 4 | Ex. 5 | Ex. 6 |
|---|---|---|---|---|---|---|---|
| Peak 1 Temperature, ° C. | 62.8 | 77.7 | 65.9 | 60.3 | 79.2 | 79.3 | 78.9 |
| Peak 1 Wt % | 28.1 | 35.2 | 34.0 | 28.6 | 34.0 | 35.2 | 36.9 |
| Transition Temperature, ° C. | 84.4 | 87.3 | 83.8 | 88.3 | 85.6 | 87.2 | 87.2 |
| Transition Wt % | 62.1 | 54.4 | 64.8 | 68.0 | 47.1 | 57.9 | 58.4 |
| Peak 2 Temperature, ° C. | 92.4 | 95.5 | 96 | 95.5 | 94.5 | 94.1 | 94.5 |
| Peak 2 Wt % | 87.6 | 79.8 | 82.1 | 82.2 | 78.5 | 85.7 | 85.2 |

FIG. 4A, FIG. 4B, FIG. 4C, FIG. 4D, FIG. 4E, FIG. 4F, and FIG. 4G show the CFC data for CEx. 3, Ex. 1, Ex. 2, Ex. 3, Ex. 4, Ex. 5, and Ex. 6, respectively. Table 5 is molecular weight data determined using the MBDR method to deconvolution FIG. 4. In Table 5, cumulative Wt $\%_{transition}$ is defined as the averaged cumulative Wt %, i.e. the location of saddle line, which separates the two population contours. $Orientation_{p1}$ denotes the orientation of the low density peak, and $Orientation_{p2}$ denotes the orientation of the high density peak. And positive Orientation values indicate the composition distribution of the peak is BOCD, and negative Orientation values indicate the composition distribution of the peak is BCD. Orientation values close to 0 or 180 indicate narrow composition distribution and broad MW distribution, while orientations of around 90 indicate narrow MW distribution and broad composition distribution.

TABLE 5

| Sample | C. Ex. | Ex. 1 | Ex. 2 | Ex. 3 |
|---|---|---|---|---|
| CumulativeWt $\%_{transition}$ (%) | 31.2 | 52.0 | 64.8 | 57.4 |
| $M_{p1}$ (g/mol) | 251190 | 199530 | 199530 | 199530 |
| $M_{p2}$ (g/mol) | 31623 | 39811 | 39811 | 31623 |
| $T_{p1}$ (° C.) | 56 | 79 | 65 | 60 |
| $T_{p2}$ (° C.) | 91 | 98 | 99 | 98 |
| $T_{p1} - T_{p2}$ (° C.) | −35 | −19 | −34 | −38 |
| $M_{p1}$ /$M_{p2}$ | 7.94 | 5.01 | 5.01 | 6.31 |
| $Orientation_{p1}$ | 76.4 | 93.4 | 88.6 | 82.3 |
| $Orientation_{p2}$ | 149.6 | 159.2 | 162.7 | 160.0 |

| Sample | Ex. 4 | Ex. 5 | Ex. 6 |
|---|---|---|---|
| CumulativeWt $\%_{transition}$ (%) | 46.7 | 61.7 | 58.6 |
| $M_{p1}$ (g/mol) | 158490 | 158490 | 158490 |
| $M_{p2}$ (g/mol) | 39811 | 31623 | 31623 |
| $T_{p1}$ (° C.) | 78 | 81 | 79 |
| $T_{p2}$ (° C.) | 97 | 96 | 97 |
| $T_{p1} - T_{p2}$ (° C.) | −19 | −15 | −18 |
| $M_{p1}/M_{p2}$ | 3.98 | 5.01 | 5.01 |
| $Orientation_{p1}$ | 78.8 | 62.9 | 69.9 |
| $Orientation_{p2}$ | 155.9 | 155.3 | 156.6 |

Example Film Formulation

Reactor resin of Example samples 1-6 were compounded with stabilizers into pellet resins through simple melt blending on lab scale twin screw extruders such as Coperion W&P 57 under typical PE compounding conditions. Prior to melt mixing, the polyethylene resins in granular forms were dry blended in a tumble mixer with the following additives: 500 ppm of Irganox™-1076, 1,000 ppm of Irgafos™ 168, and 600 ppm of Dynamar™ FX5920A. Resin samples of Example samples Ex. 1-6 were converted into monolayer films on a 2.5" Battenfeld Gloucester line with 30:1 L:D equipped with a 6" oscillating die and a Future Design air ring. The die gap was 60 mil and the blow-up ratio (BUR) was 2.5. The blown film fabrication parameters of these example samples Ex. 1-6 are summarized in Table 6.

TABLE 6

| Sample | CEx. 3 | Ex. 1 | Ex. 2 | Ex. 3 | Ex. 4 | Ex. 5 | Ex. 6 |
|---|---|---|---|---|---|---|---|
| Gauge (mil) | 1.0 | 1.05 | 1.06 | 1.02 | 0.99 | 0.99 | 0.99 |
| Die Gap (mil) | 60 | 60 | 60 | 60 | 60 | 60 | 60 |
| Blow up ratio (BUR) | 2.5 | 2.5 | 2.5 | 2.5 | 2.5 | 2.5 | 2.5 |
| Air % | 41.5 | 61.1 | 74 | 74 | 66.2 | 80.1 | 75.1 |
| Top Cone | — | 0.5 | 0.5 | 0.5 | 0.5 | 0.5 | 0.5 |
| Top Lip | — | 0.75 | 0.75 | 0.75 | 0.75 | 0.75 | 0.75 |
| Bottom Lip | — | 0.625 | 0.625 | 0.625 | 0.625 | 0.625 | 0.625 |
| Frost Line Height (in) | 23 | 23 | 23 | 23 | 23.5 | 19 | 22 |
| Output (lb/hr) | 198 | 188 | 189 | 185 | 188 | 185 | 188 |
| Screw Speed (rpm) | 75.4 | 62.8 | 64.7 | 62.3 | 60.8 | 71.7 | 68.7 |
| Melt Pressure 1 (psi) | 4227 | 3840 | 4330 | 4230 | 3110 | 4260 | 4380 |
| Melt Pressure 2 (psi) | 3279 | 2560 | 3250 | 3060 | 2240 | 3230 | 3190 |
| % Motor Load | 45.7 | 60 | 55.6 | 57 | 53.7 | 46.9 | 50.8 |
| Power (horsepower) | — | 20 | 19 | 19 | 17 | 18 | 18 |
| Melt Temp (° F.) | 396.3 | 402 | 406 | 404 | 396 | 407 | 405 |
| Die Factor (lb/hr/in) | 10.0 | 9.96 | 10.03 | 9.81 | 9.97 | 9.8 | 9.94 |
| Bubble Pressure (in of water) | — | 3.5 | 4.75 | 4.75 | 4 | 5.75 | 5 |
| Draw Speed (ft/min) | 162.7 | 166.5 | 166.5 | 166.5 | 166.5 | 166.5 | 166.6 |
| Die Diameter (in) | 6.3 | 6 | 6 | 6 | 6 | 6 | 6 |
| Velocity @ Die Exit, Vo (cm/s) | — | 4.22 | 4.24 | 4.15 | 4.22 | 4.15 | 4.22 |
| Velocity @ FLH, Vf (cm/s) | — | 79.83 | 80.38 | 81.96 | 84.72 | 83.91 | 85.28 |
| Draw Down Ratio | — | 18.91 | 18.94 | 19.73 | 20.07 | 20.20 | 20.20 |
| Specific Output (lb/hr/rpm) | 2.63 | 2.98 | 2.91 | 2.96 | 3.08 | 2.57 | 2.72 |
| Specific Energy Output (W/lb/hr) | — | 79.26 | 74.89 | 76.51 | 67.37 | 72.49 | 71.33 |

Resin properties of comparative samples and example samples Ex. 1 through Ex. 6 and 1-mil blown film performance of the example polyethylene films are shown in Table 7.

TABLE 7

| Sample | CEx. 1 | CEx. 2 | CEx. 3 | CEx. 4 | CEx. 5 |
|---|---|---|---|---|---|
| Density (g/cm$^3$) | 0.922 | 0.922 | 0.922 | 0.922 | 0.922 |
| I2 (g/10 min) | 1.00 | 1.00 | 1.00 | 0.70 | 0.70 |
| I21 (g/10 min) | — | — | — | — | — |
| MIR | 35.0 | 40.0 | 54.0 | 44.0 | 53.0 |
| Gauge (mil), Average | 1.03 | 1.02 | 1.04 | 1.08 | 1.06 |
| 1% Secant Modulus (psi) | | | | | |
| MD | 34,005 | 35,360 | 33,747 | 35,157 | 34,888 |
| TD | 44,028 | 45,918 | 51,575 | 46,934 | 50,437 |
| Average | 39,017 | 40,639 | 42,661 | 41,046 | 42,663 |
| Tensile Yield Strength (psi) | | | | | |
| MD | 1,576 | 1,573 | 1,547 | 1,593 | 1,553 |
| TD | 1,771 | 1,831 | 1,927 | 1,880 | 1,837 |
| Tensile Strength (psi) | | | | | |
| MD | 8,919 | 8,672 | 8,627 | 9,361 | 8,758 |
| TD | 7,609 | 7,876 | 6,507 | 7,526 | 6,889 |
| Elmendorf Tear | | | | | |
| MD (g/mil) | 287 | 247 | 107 | 369 | 260 |
| TD (g/mil) | 527 | 499 | 544 | 569 | 590 |
| Dart Drop (g/mil) | 759 | 825 | 585 | 735 | 772 |
| Puncture Peak Force (lbs/mil) | | | 8.8 | | |
| Puncture Break Energy (in-lbs/mil) | 28.69 | 24.66 | 21.45 | 20.14 | 19.94 |
| Haze (%) | 19.8 | 25.8 | >30 | >30 | >30 |
| Gloss (GU) | | | | | |
| MD | 10.9 | 8.1 | 5.7 | 7.2 | 4.6 |
| TD | 11.1 | 8.2 | 5.9 | 7.2 | 4.6 |

| Sample | CEx. 6 | CEx. 7 | CEx. 8 | CEx. 9 | CEx. 10 |
|---|---|---|---|---|---|
| Density (g/cm$^3$) | 0.917 | 0.9281 | 0.9178 | 0.9197 | 0.9175 |
| I2 (g/10 min) | 0.5 | 1.30 | 0.98 | 1.15 | 0.72 |
| I21 (g/10 min) | — | 20.7 | 22.6 | 28.7 | 16.1 |
| MIR | 49.0 | 15.7 | 23.0 | 24.9 | 22.6 |
| Gauge (mil), Average | 1.08 | 0.99 | 1 | 0.95 | 1.01 |
| 1% Secant Modulus (psi) | | | | | |
| MD | 29,859 | 42,412 | 28,631 | 32,548 | 29,928 |
| TD | 43,514 | 48,900 | 32,781 | 37,686 | 36,681 |
| Average | 29,859 | 45,656 | 30,706 | 35,117 | 33,305 |

TABLE 7-continued

| | | | | | |
|---|---|---|---|---|---|
| Tensile Yield Strength (psi) | | | | | |
| MD | 1,392 | 1,825 | 1,460 | 1,524 | 1,439 |
| TD | 1,587 | 1,984 | 1,570 | 1,557 | 1,596 |
| Tensile Strength (psi) | | | | | |
| MD | 9,730 | 7,804 | 8,642 | 8,645 | 9,109 |
| TD | 7,624 | 7,015 | 8,099 | 7,953 | 8,857 |
| Elmendorf Tear | | | | | |
| MD (g/mil) | 322 | 174.3 | 285 | 246 | 303 |
| TD (g/mil) | 576 | 444.7 | 522 | 511 | 519 |
| Dart Drop (g/mil) | 857 | 153.54 | 866 | 722 | 881 |
| Puncture Peak Force (lbs/mil) | | 9.84 | 11.08 | 10.07 | 12.07 |
| Puncture Break Energy (in-lbs/mil) | 26.6 | 25.49 | 35.45 | 31.03 | 37.02 |
| Haze (%) | >30 | >30 | 14.8 | 16.7 | 11.6 |
| Gloss (GU) | | | | | |
| MD | 4.0 | 12.6 | 7 | 7 | 12 |
| TD | 3.9 | 13 | 7 | 8 | 13 |

| Sample | CEx. 10 | CEx. 11 | CEx. 12 | Ex. 1 | Ex. 2 |
|---|---|---|---|---|---|
| Density (g/cm$^3$) | 0.9175 | 0.9340 | 0.9320 | 0.9308 | 0.9206 |
| I2 (g/10 min) | 0.72 | 1.57 | 1.29 | 0.9 | 0.6 |
| I21 (g/10 min) | 16.1 | 159.4 | 46.4 | 22.4 | 14.4 |
| MIR | 22.6 | 101.8 | 36.0 | 24.1 | 23.3 |
| Gauge (mil), Average | 1.01 | 0.93 | 0.99 | 1.03 | 1.05 |
| 1% Secant Modulus (psi) | | | | | |
| MD | 29,928 | 54,251 | 59,018 | 52,184 | 37,813 |
| TD | 36,681 | 83,722 | 92,391 | 65,782 | 51,260 |
| Average | 33,305 | 68,987 | 75,705 | 58,983 | 44,537 |
| Tensile Yield Strength (psi) | | | | | |
| MD | 1,439 | 2,143 | 2,206 | 1,934 | 1,495 |
| TD | 1,596 | 2,684 | 2,913 | 2,315 | 1,904 |
| Tensile Strength (psi) | | | | | |
| MD | 9,109 | 7,576 | 8,062 | 9,731 | 9,310 |
| TD | 8,857 | 4,973 | 7,246 | 8,007 | 9,239 |
| Elmendorf Tear | | | | | |
| MD (g/mil) | 303 | 34.9 | 65.6 | 149 | 157 |
| TD (g/mil) | 519 | 999.1 | 633.5 | 601 | 455 |
| Dart Drop (g/mil) | 881 | 192 | 322 | 620 | 793 |
| Puncture Peak Force (lbs/mil) | 12.07 | 6.6 | 8.8 | 9.43 | 10.34 |
| Puncture Break Energy (in-lbs/mil) | 37.02 | 11.6 | 18.9 | 21.92 | 27.98 |
| Haze (%) | 11.6 | 71.4 | 20.2 | >30 | 23.6 |
| Gloss (GU) | | | | | |
| MD | 12 | 5.9 | 35.5 | 18 | 29 |
| TD | 13 | 5.3 | 39.7 | 18 | 30 |

| Sample | Ex. 3 | Ex. 4 | Ex. 5 | Ex. 6 |
|---|---|---|---|---|
| Density (g/cm$^3$) | 0.9184 | 0.9302 | 0.9242 | 0.9241 |
| I2 (g/10 min) | 0.7 | 1.4 | 0.7 | 0.7 |
| I21 (g/10 min) | 17.3 | 34.5 | 13.4 | 14.5 |
| MIR | 25.0 | 25.0 | 20.2 | 20.7 |
| Gauge (mil), Average | 1.03 | 1.02 | 1.03 | 1.02 |
| 1% Secant Modulus (psi) | | | | |
| MD | 32,729 | 47,111 | 39,096 | 40,087 |
| TD | 47,183 | 58,500 | 46,438 | 47,778 |
| Average | 39,956 | 52,806 | 42,767 | 43,933 |
| Tensile Yield Strength (psi) | | | | |
| MD | 1,384 | 1,852 | 1,641 | 1,649 |
| TD | 1,787 | 2,174 | 1,828 | 1,914 |
| Tensile Strength (psi) | | | | |
| MD | 10,489 | 7,578 | 9,075 | 7,938 |
| TD | 8,838 | 7,120 | 7,770 | 8,337 |
| Elmendorf Tear | | | | |
| MD (g/mil) | 153 | 160 | 190 | 195 |
| TD (g/mil) | 469 | 589 | 500 | 495 |
| Dart Drop (g/mil) | 830 | 203 | 620 | 659 |
| Puncture Peak Force (lbs/mil) | 9.29 | 9.53 | 11.57 | 11.25 |

TABLE 7-continued

| | | | | |
|---|---|---|---|---|
| Puncture Break Energy (in-lbs/mil) | 24.25 | 23.6 | 32.14 | 31.38 |
| Haze (%) | 18.7 | >30 | 12.3 | 16.1 |
| Gloss (GU) | | | | |
| MD | 30 | 21 | 49 | 36 |
| TD | 31 | 22 | 44 | 31 |

Figure 5:
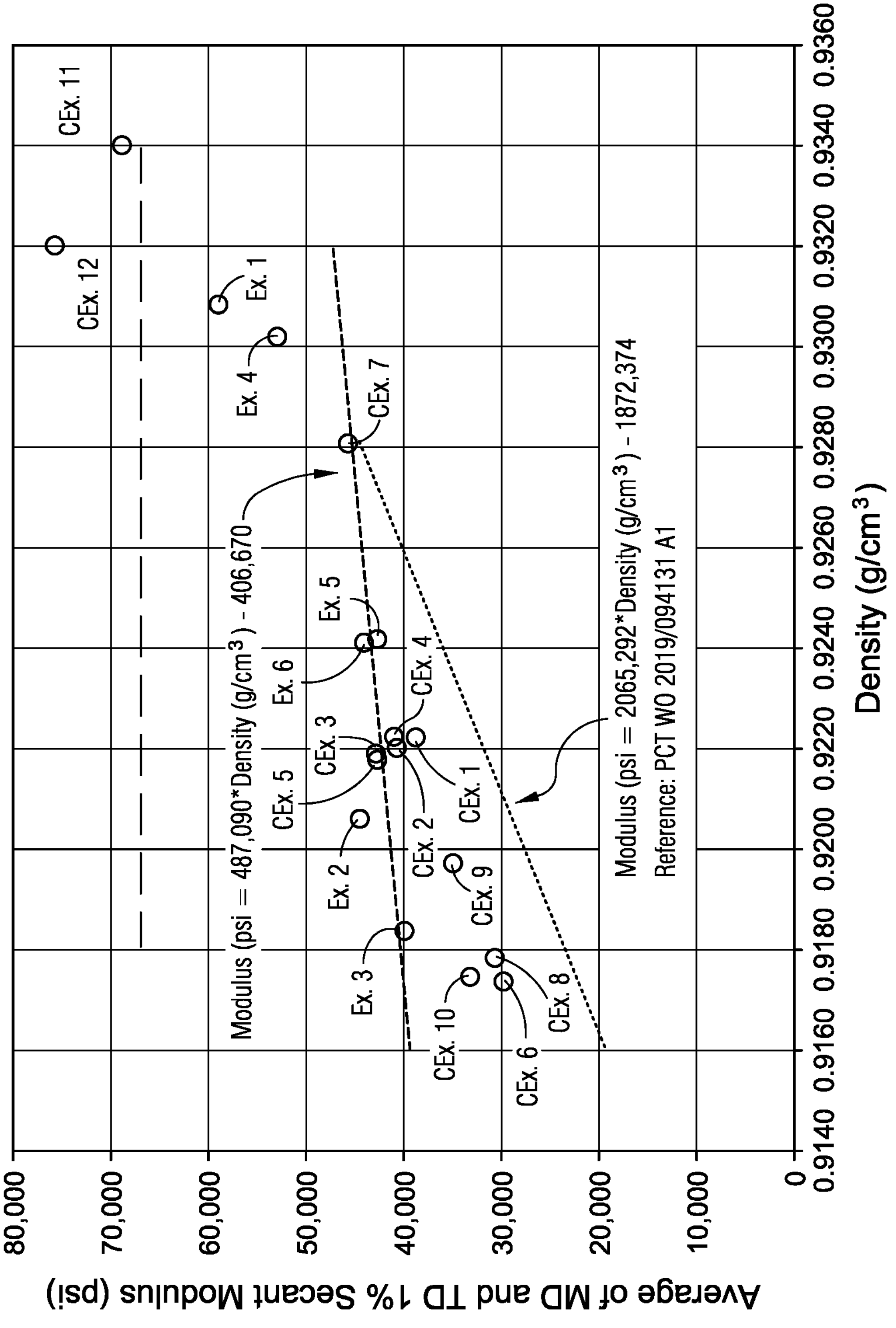
FIG. 5 shows the film modulus (average 1% secant modulus of MD and TD) as a function of resin density for comparatives as well as example samples of the present disclosure.

FIG. 5 shows the film modulus (average 1% secant modulus of MD and TD) as a function of resin density for comparatives as well as example samples of the present disclosure. The lower equation and dotted line shows the film modulus dependence on its resin density of the examples in US Pat. Pub. No. 2019/0144576, here incorporated as comparative examples 1 through 6. The upper equation and dashed-line shows the boundary between comparative examples, including those in the art referenced, and the examples presented in this disclosure. The example films of the present disclosure exhibited a substantial advantage in film stiffness at a given resin density. In US Pat. Pub. No. 2019/0144576, the example samples were differentiated from comparative examples by the following equation:

$$\text{Average Film Modulus}=2065{,}292*\text{Density}-1872{,}345$$

where modulus unit is psi and density unit is g/cm$^3$.

In the present disclosure, the example samples described herein are differentiated from the examples and comparative examples of US Pat. Pub. No. 2019/0144576 and US Pat. Pub. No. 2016/632117 by the following equation:

$$\text{Average Film Modulus}=487{,}090*\text{Density}-406{,}670$$

where modulus unit is psi and density unit is g/cm$^3$.

The differentiation of the polyethylene compositions of the present disclosure relative to conventional polyethylene compositions is shown in FIG. 5. The example polyethylene compositions of the present disclosure can be stiffer than the conventional polyethylenes at a given density. The comparative examples in FIG. 5 include comparative examples and examples of US Pat. Pub. No. 2019/0144576 and US Pat. Pub. No. 2016/632117, and commercial metallocene LLDPED grade EXCEED™ 1327.

Figure 6:
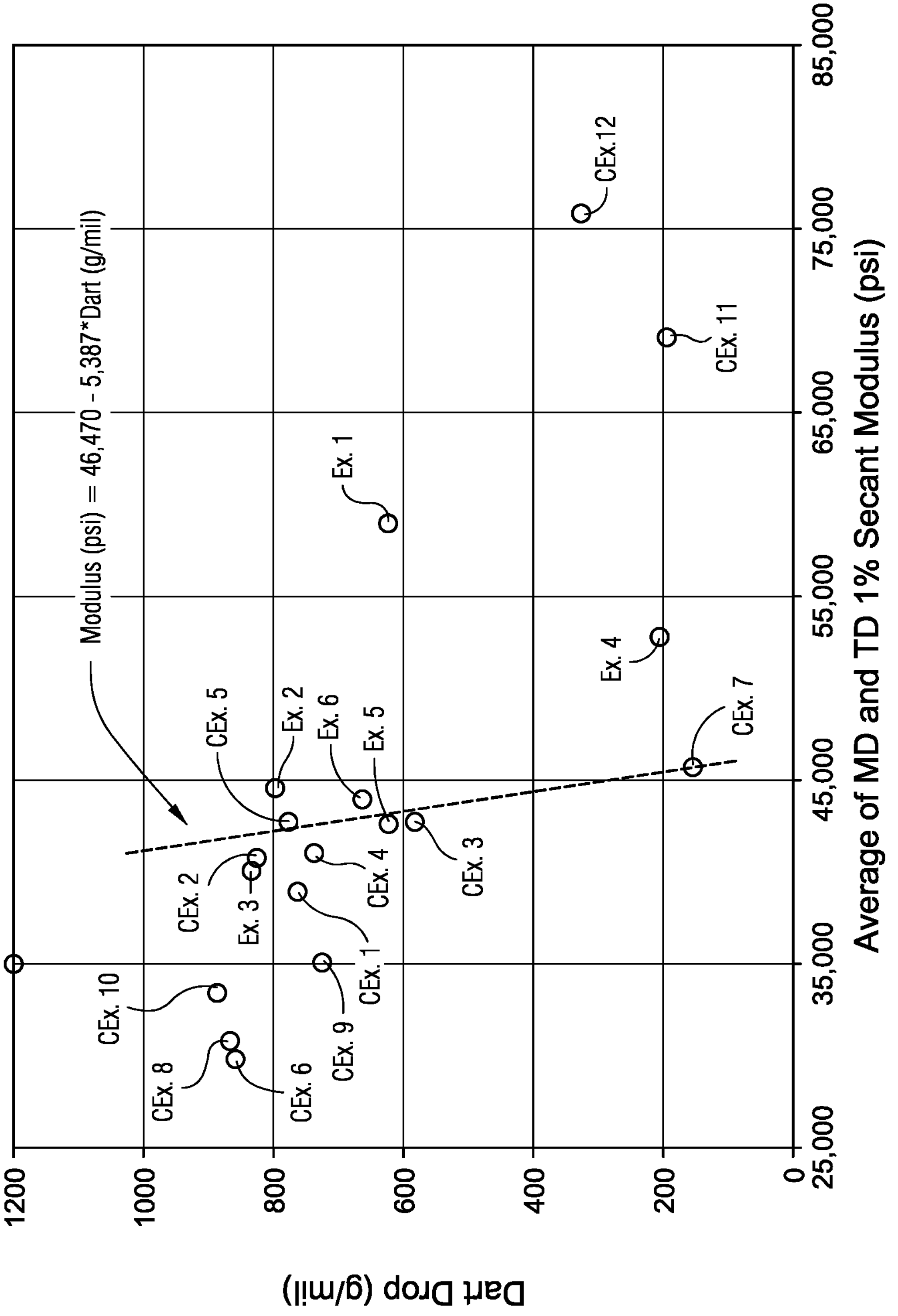
FIG. 6 is a plot of the average of MD and TD 1% secant modulus of comparatives and examples of the present disclosure against film dart impact strength.

FIG. 6 plots the average of MD and TD 1% secant modulus of comparatives and examples of the present disclosure against film dart impact strength. In general, the dart drop impact strength of comparative examples 1 through 10 are high; however, the modulus of comparative examples 1 through 10 are low compared with that of the examples 1 through 6. The Modulus, specifically the average of MD and TD 1% secant modulus, of comparative examples 1 through 10 are at points below the following equation as a function of dart drop impart strength (Dart):

$$\text{Modulus (psi)}=46{,}470-5.387*\text{Dart (g/mil)}$$

where the unit of Modulus is in psi and the unit of Dart is in g/mil.

Comparative example 11 and 12 have high modulus, however, their dart drop impact strength are low, generally less than 400 g/mil.

The examples of the present disclosure have the characteristics of high Modulus and high Dart. Specifically, their average of MD and TD 1% secant modulus is higher than the above equation as a function of dart drop impart strength (Dart), and they have dart drop impact strength above 400 g/min. Thus, they combine high stiffness and toughness, and are advantageous over comparative examples with their unique combination of high stiffness and high toughness.

Overall, films of the present disclosure show a combination of excellent stiffness and toughness and processability. For example, the resulting film of Example 1 exhibited an 1% secant modulus of 52,184 psi in MD, 65,782 psi in TD, and an average of MD and TD 1% secant modulus of about 58,983 psi, with excellent Dart Drop Impact Strength of about 620 g/mil. This film was obtained from a polyethylene composition having a density of about 0.928 g/cm$^3$ and an MIR of about 24.

As another example, the film of Example 5 exhibited an 1% secant modulus of 39,096 psi in MD, 46,438 psi in TD and an average of MD and TD 1% secant modulus of about 42,767 psi with excellent Dart (phenolic method A) of about 620 g/mil. This film was obtained from a polyethylene composition having a density of about 0.923 g/cm$^3$ and an MIR of about 20. Trimming using iron catalyst 2 further enhanced the toughness and stiffness. For Example, Example 6 exhibited an 1% secant modulus of 40,087 psi in MD, 47,778 psi in TD and an average of 1% secant modulus of about 43,933 psi, with excellent Dart (phenolic method A) of about 659 g/mil. This film was obtained from a polyethylene composition having a density of about 0.923 g/cm$^3$ and an MIR of about 21.

Polyethylene compositions of the present disclosure can be formed by catalyst systems and processes of the present disclosure to provide ethylene polymers having medium density with comonomer content. The polyethylene compositions of the present disclosure show that for a given density, the polymer can be stiffer than conventional polyethylenes. The density can provide a stiff polymer (like a high density material) but is tougher because of the comonomer content. The mixed catalyst systems disclosed herein provide good catalytic activity and can also provide ethylene polymers having the unique properties of high stiffness, high toughness, and good processability. Processes of the present disclosure can provide control of polymer properties by adjusting the catalyst ratio.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process for producing a polyethylene composition, comprising:

introducing, under first polymerization conditions, ethylene and a $C_3$-$C_{40}$ alpha-olefin to a catalyst system in a reactor, the catalyst system comprising a first catalyst compound, a second catalyst compound, and an activator; and forming a polyethylene composition, the first catalyst compound being represented by Formula (I)

(I)

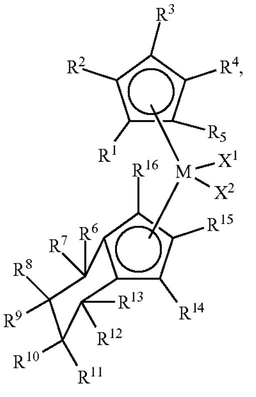

wherein:

M is Ti, Hf, or Zr;

each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;

each of $R^1$, $R^2$, $R^3$, $R^4$, $R^5$, $R^6$, $R^{14}$, $R^{15}$, and $R^{16}$ is independently selected from hydrogen, halogen, $C_1$-$C_{40}$ hydrocarbyl, substituted $C_1$-$C_{40}$ hydrocarbyl, —NR'$_2$, —SR', —OR', —OSiR'3, or —PR'2, wherein each R' is independently hydrogen, halogen, $C_1$-$C_{10}$ alkyl, or $C_6$-$C_{10}$ aryl, or one or more of $R^1$ and $R^2$, $R^2$ and $R^3$, $R^3$ and $R^4$, $R^4$ and $R^5$, $R^1$ and $R^5$, $R^{14}$ and $R^{15}$, and $R^{15}$ and $R^{16}$ join together to form a $C_4$ to $C_{62}$ cyclic or polycyclic ring structure;

each of $R^7$, $R^8$, $R^9$, $R^{10}$, $R^{11}$, $R^{12}$, $R^{13}$ is independently selected from hydrogen, halogen, $C_1$-$C_{40}$ hydrocarbyl, substituted $C_1$-$C_{40}$ hydrocarbyl, aryl, substituted aryl, —NR'$_2$, —SR', —OR', —OSiR'$_3$, or —PR'$_2$, wherein each R' is independently hydrogen, halogen, $C_1$-$C_{10}$ alkyl, or $C_6$-$C_{10}$ aryl, or one or more of $R^7$ and $R^8$, $R^8$ and $R^{10}$, and $R^{10}$ and $R^{12}$ are joined to form a saturated ring, unsaturated ring, substituted saturated ring, or substituted unsaturated ring;

and the second catalyst compound being represented by Formula (IIa) or Formula (IIb):

(IIa)

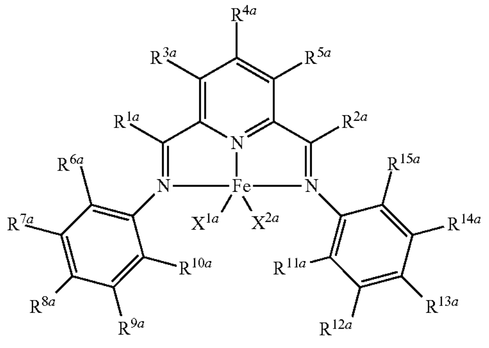

or (IIb)

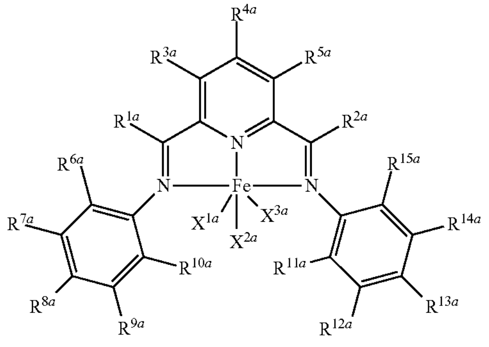

wherein:

each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), NR'2, —OR', —SiR"$_3$ or five-, six- or seven-membered heterocyclyl comprising at least one atom selected from N, P, O and S;

each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocycle comprising at least one atom selected from N, P, O and S, wherein each of $R^{1a}$ and $R^{2a}$ is optionally substituted by halogen, —NR'$_2$, —OR' or —SiR"3, wherein $R^{1a}$ optionally bonds with $R^{3a}$, and $R^{2a}$ optionally bonds with $R^{5a}$ in each case to independently form a five-, six- or seven-membered ring;

each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from N, P, O and S; and each of $X^{1a}$ and $X^{2a}$ is independently hydrogen, halogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —$SO_3$R', —OC(O)R', —CN, —SCN, β-diketonate, —CO, —$BF_4^-$, —$PF_6^-$ or bulky non-coordinating anion, or $X^{1a}$ and $X^{2a}$ optionally bond to form a five- or six-membered ring;

wherein the catalyst system is formed by steps including first adding the catalyst compound represented by Formula (IIa) or Formula (IIb) to a silica support with a first solvent to form a pre-treated iron silica support, then contacting the pre-treated iron silica support with the activator, and then contacting the pre-treated iron silica support with the catalyst compound represented by Formula (I) with a second solvent, wherein the first solvent and the second solvent are optionally different or same.

2. The process of claim 1, further comprising introducing, under second polymerization conditions, a third catalyst compound to the reactor, the third catalyst compound being represented by Formula (I), Formula (IIIa), or Formula (IIIb):

(IIIa)

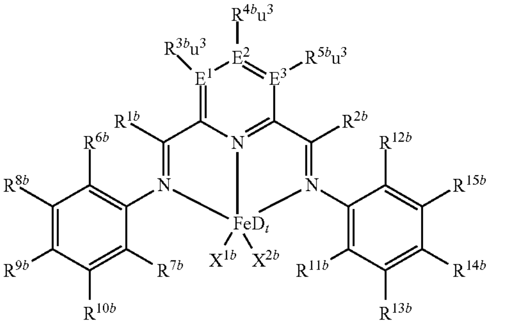

or (IIIb)

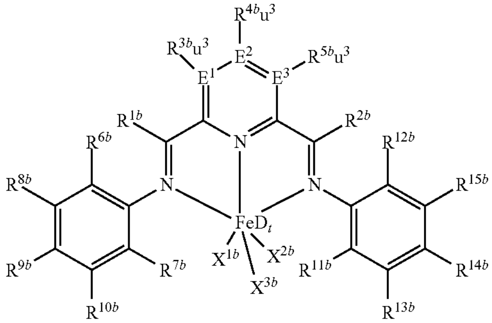

wherein:

each of $R^{1b}$, $R^{2b}$, $R^{3b}$, $R^{4b}$, $R^{5b}$, $R^{8b}$, $R^{9b}$, $R^{10b}$, $R^{13b}$, $R^{14b}$, and $R^{15b}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16b}$, —$NR^{17b}_2$, halogen, —$SiR^{18b}_3$ or five-, six- or seven-membered heterocyclic ring comprising at least one atom selected from the group consisting of N, P, O and S;

each of $R^{6b}$, $R^{7b}$, $R^{11b}$, and $R^{12b}$, is independently $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16b}$, —$NR^{17b}_2$, halogen, —$SiR^{18b}_3$ or five-, six- or seven-membered heterocyclic ring comprising at least one atom selected from the group consisting of N, P, O and S;

each of $R^{16b}$, $R^{17b}$, and $R^{18b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19b}_3$, wherein each $R^{16b}$, $R^{17b}$, and $R^{18b}$ is independently optionally substituted by halogen, or two $R^{16b}$ radicals optionally bond to form a five- or six-membered ring, or two $R^{17b}$ radicals optionally bond to form a five- or six-membered ring, or two $R^{18b}$ radicals optionally bond to form a five- or six-membered ring;

each $R^{19b}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;

each of $X^{1b}$ and $X^{2b}$ is independently substituted hydrocarbyl, and the radicals $X^{1b}$ and $X^{2b}$ can be bonded with one another;

D is a neutral donor; and t is 0 to 2.

3. The process of claim 2, wherein the third catalyst compound is

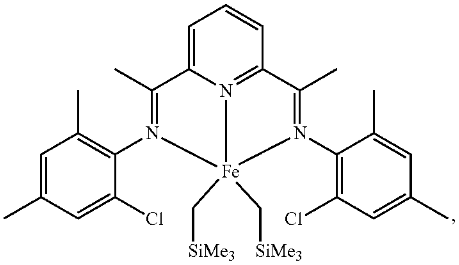

,

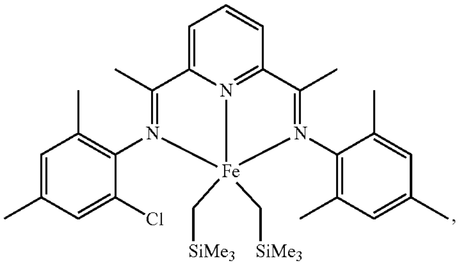

,

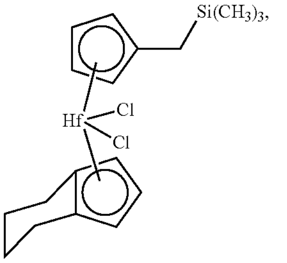

,

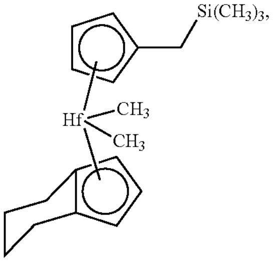

-continued

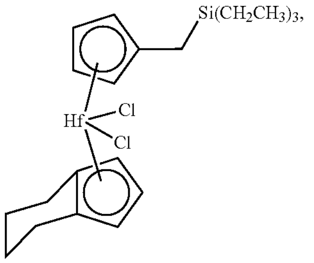

or

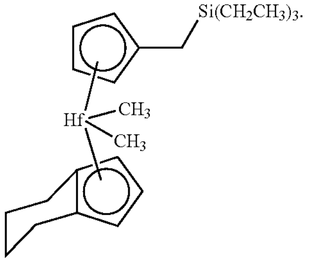

4. The process of claim 2, wherein a molar ratio of second catalyst to third catalyst can be from 95:5 to 5:95, from 80:20 to 20:80, from 70:30 to 30:70, from 60:40 to 40:60.

5. The process of claim 1, wherein each of $X^1$ and $X^2$ is independently hydrogen or halogen.

6. The process of claim 1, wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, halide, alkoxide, $C_1$ to $C_{12}$ substituted or unsubstituted hydrocarbyl, or —R"—SiR'$_3$ or —R"—CR'$_3$ where R" is $C_1$ to $C_4$ hydrocarbyl.

7. The process of claim 1, wherein M is hafnium.

8. The process of claim 1, wherein the first catalyst compound is one or more of:

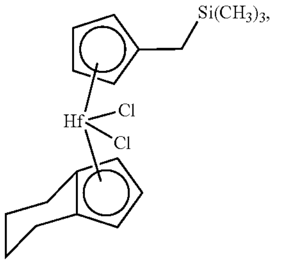

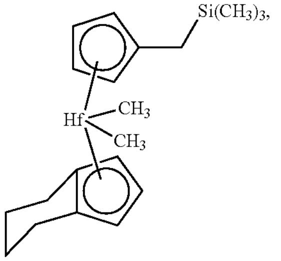

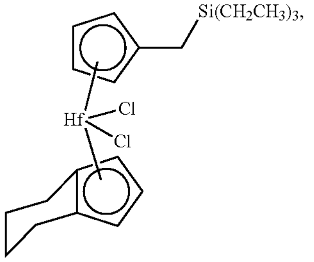

or

-continued

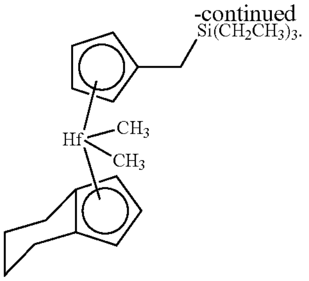

9. The process of claim 1, wherein the first catalyst compound is

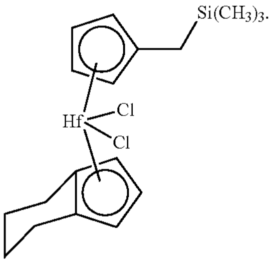

10. The process of claim 1, wherein:

each of $X^{1a}$ and $X^{2a}$ is independently halogen; and each of $R^{6a}$ and $R^{15a}$ is independently halogen.

11. The process of claim 1, wherein:

each of $R^{1a}$ and $R^{2a}$ is independently $C_1$-$C_{20}$ hydrocarbyl;

each of $R^{3a}$, $R^{4a}$, and $R^{5a}$ is independently hydrogen;

each of $R^{8a}$, $R^{10a}$, $R^{11a}$ and $R^{13a}$ is $C_1$-$C_{20}$ hydrocarbyl;

each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —NR'$_2$, —OR', —SiR"$_3$ or five-, six- or seven-membered heterocycle comprising at least one atom selected from the group consisting of N, P, O and S;

R' is optionally substituted by halogen, or two R' radicals bond to form a five- or six-membered ring; and each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

12. The process of claim 1, wherein the second catalyst compound is one or more of:

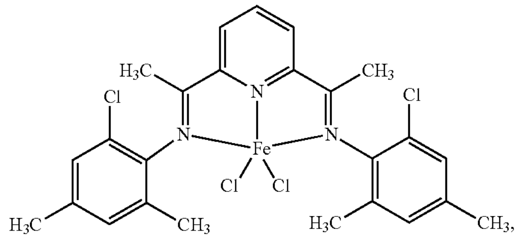

-continued
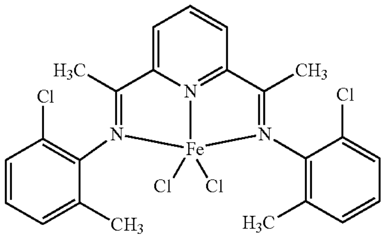
,
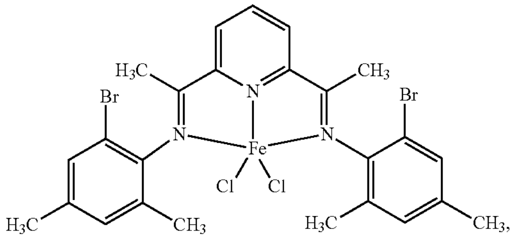
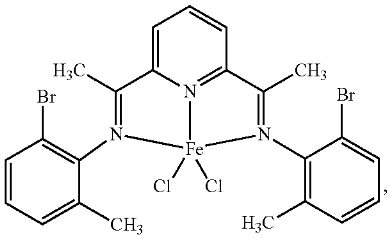
, or
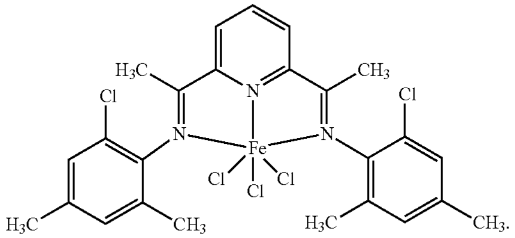
13. The process of claim 1, wherein the second catalyst compound is
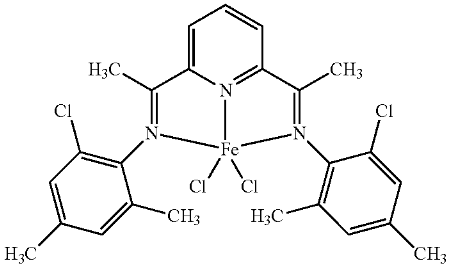
or
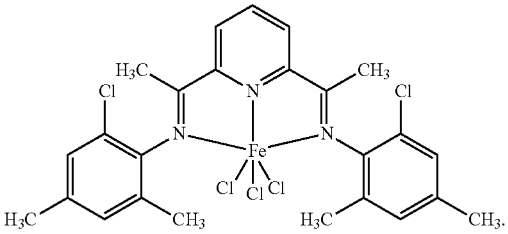
14. The process of claim 1, wherein a molar ratio of first catalyst compound to second catalyst compound is from 1:1 to 5:1, or from 0.6:0.4 to 0.9:0.2.
* * * * *